United States Patent
Jun et al.

(10) Patent No.: US 11,717,792 B2
(45) Date of Patent: Aug. 8, 2023

(54) MATERIALS AND METHODS FOR PHOTOTHERMAL MEMBRANE DISTILLATION

(71) Applicant: WASHINGTON UNIVERSITY, St. Louis, MO (US)

(72) Inventors: Young-Shin Jun, St. Louis, MO (US); Srikanth Singamaneni, St. Louis, MO (US); Xuanhao Wu, St. Louis, MO (US); Qisheng Jiang, St. Louis, MO (US)

(73) Assignee: Washington University, St. Louis, MO (US)

( * ) Notice: Subject to any disclaimer, the term of this patent is extended or adjusted under 35 U.S.C. 154(b) by 337 days.

(21) Appl. No.: 16/939,761

(22) Filed: Jul. 27, 2020

(65) Prior Publication Data

US 2021/0023505 A1 Jan. 28, 2021

Related U.S. Application Data

(60) Provisional application No. 62/878,907, filed on Jul. 26, 2019.

(51) Int. Cl.
*B01D 67/00* (2006.01)
*B01D 71/34* (2006.01)
(Continued)

(52) U.S. Cl.
CPC ....... *B01D 67/0093* (2013.01); *B01D 61/364* (2013.01); *B01D 69/02* (2013.01);
(Continued)

(58) Field of Classification Search
CPC .......... B01D 2323/38; B01D 2325/22; B01D 2325/38; B01D 61/364; B01D 67/0088;
(Continued)

(56) References Cited

U.S. PATENT DOCUMENTS

| | | |
|---|---|---|
| 2003/0032681 A1 | 2/2003 | Coronado et al. |
| 2010/0282680 A1 | 11/2010 | Su et al. |

(Continued)

FOREIGN PATENT DOCUMENTS

| | | | | |
|---|---|---|---|---|
| CN | 108722200 A | * | 11/2018 | ........... B01D 61/364 |
| WO | 2017203281 A1 | | 11/2017 | |
| WO | 2019053638 A1 | | 3/2019 | |

OTHER PUBLICATIONS

Wu et al., "Localized Heating by a Photothermal Polydopamine Coating Facilitates a Novel Membrane Distillation Process", Journal of Materials Chemistry A, Aug. 2018, 27 pages.

*Primary Examiner* — Latosha Hines
(74) *Attorney, Agent, or Firm* — Armstrong Teasdale LLP

(57) ABSTRACT

A photothermal distillation membrane comprising a tridecafluoro-1,1,2,2-tetrahydrooctyl-trichlorosilane (FTCS) fluoro-silanized, polydopamine (PDA) coated, polyvinylidene fluoride (PVDF) membrane is disclosed, as well as a process for synthesizing a FTCS-PDA-PVDF membrane. A tridecafluoro-1,1,2,2-tetrahydrooctyl-trichlorosilane (FTCS) fluoro-silanized, polydopamine (PDA) containing bacterial nanocellulose (BNC) aerogel membrane is also disclosed, as well as a process for synthesizing a FTCS-PDA/BNC aerogel membrane.

19 Claims, 59 Drawing Sheets

(51) Int. Cl.
    *B01D 69/02*     (2006.01)
    *B01D 61/36*     (2006.01)
    *C02F 1/44*      (2023.01)
    *B01D 69/14*     (2006.01)

(52) U.S. Cl.
    CPC ........... *B01D 69/144* (2013.01); *B01D 71/34* (2013.01); *C02F 1/447* (2013.01); *B01D 2325/38* (2013.01)

(58) Field of Classification Search
    CPC .... B01D 67/0093; B01D 69/02; B01D 69/12; B01D 69/144; B01D 71/34; B01D 71/70; B01D 71/82; C02F 1/447; Y02W 10/37
    See application file for complete search history.

(56) References Cited

U.S. PATENT DOCUMENTS

| | | |
|---|---|---|
| 2015/0353385 A1 | 12/2015 | Wang et al. |
| 2017/0246592 A1* | 8/2017 | Li ...................... B01D 67/0088 |
| 2018/0043278 A1* | 2/2018 | Singamaneni ....... B01D 1/0035 |

\* cited by examiner

| | FTIR peak positions (cm$^{-1}$) | | | | |
|---|---|---|---|---|---|
| N-H bending vibrations | 1510 | 1490 | 1506 | 1540 | 1520 |
| C=C resonance vibrations in the aromatic ring | 1600 | 1610 | 1600 | 1645 | 1610 |
| O-H and NH$_2$ stretching vibrations | 3100-3600 | 3100-3600 | 3100-3600 | 3000-3700 | 3100-3600 |
| Reference | Jiang et al., 2011[10] | Cao et al., 2014[11] | Shao et al., 2014[12] | Sun et al., 2017[13] | This study |

FIG. 10

| Materials | MD system[a] | Efficiency | $T_{top}$[b] (°C) | Thickness of H2O on top (mm) | Flux (kg/m²h) | Energy source | Hydrophobicity | Paper |
|---|---|---|---|---|---|---|---|---|
| PVDF-PVA-5.5wt%BC | DCMD | 21.45% | 20.8 | 1.5 | 0.22 | solar | NA | Dongare et al., 2017[9] |
| PVDF-25%Ag NPs | VMD | 29.6% | 54.3 | NA | 25.7 | UV | 80.3°±3.6° | Politano et al., 2017[14] |
| Millipore nitrocellulose membrane | AGMD | 31.8% | 42–72[c] | 4 | 0.35 | solar | NA | Summers et al., 2013[15] |
| FTCS-PDA-PVDF | DCMD | 45% | 26 | 8 | 0.49 | solar | 126.1°±1.6° | This study |

[a] VMD stands for vacuum membrane distillation. AGMD stands for air gap membrane distillation.

[b] Water temperatures of feed inlet and distillate for Dongare et al. and this study are 20 °C. Politano et al. used an inlet of ~28 °C. Summers et al. used an inlet of 26–30 °C and a distillate of 20 °C.

[c] Summers et al. used an electric heater besides the solar system.

FIG. 30

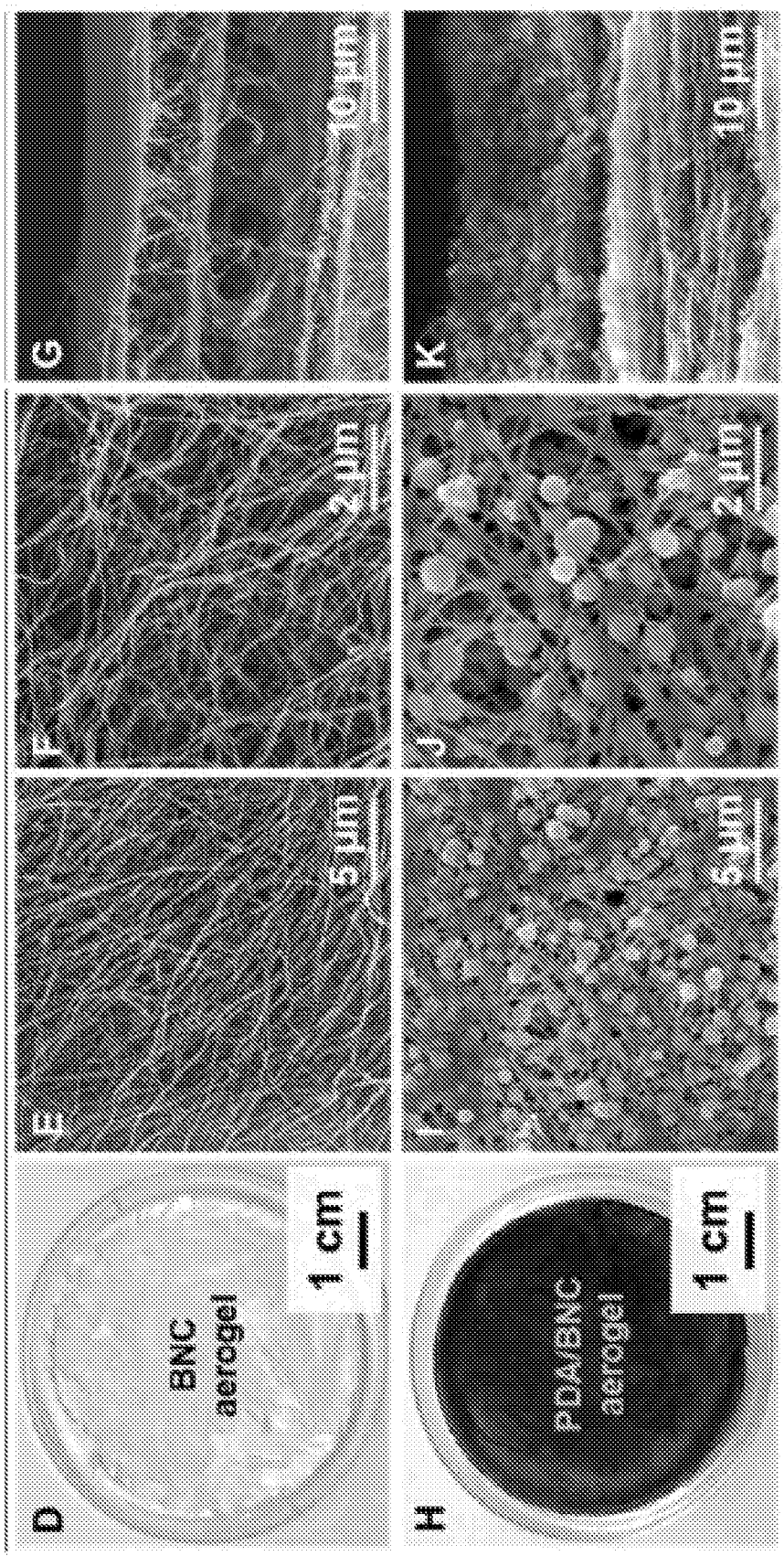

MATERIALS AND METHODS FOR PHOTOTHERMAL MEMBRANE DISTILLATION

CROSS-REFERENCE TO RELATED APPLICATIONS

This application claims priority to U.S. Provisional Application No. 62/878,907, filed Jul. 26, 2019, the content of which is incorporated herein by reference in its entirety.

GOVERNMENT SUPPORT CLAUSE

This invention was made with government support under CBET-1604542 awarded by the National Science Foundation. The government has certain rights in the invention.

FIELD OF THE DISCLOSURE

The field of the disclosure relates generally to photothermal membranes and photothermal membrane distillation. More specifically, the field of the disclosure relates to novel photothermal membranes and photothermal membrane distillation utilizing the novel photothermal membranes.

BACKGROUND OF THE DISCLOSURE

In many remote areas, rural communities, and developing countries, lack of clean water still remains as one of the biggest problems for society. Current water treatment techniques include chlorination, solar disinfection, and filtration. However, these processes cannot ensure that 100% of bacteria are killed or that all contaminants are removed. There remains a need therefore, for methods and systems to produce potable water that is free of bacteria and/or other contaminants.

BRIEF DESCRIPTION OF THE DISCLOSURE

In one aspect, a photothermal membrane comprising a fluorine-containing organic molecule, polydopamine (PDA) coated, polyvinylidene fluoride (PVDF) membrane is provided. In some embodiments, the photothermal membrane is hydrophobic, has a solar efficiency of at least about 10%, and/or has a permeate flux of at least about 0.40 kg m$^{-2}$ h$^{-1}$.

In another aspect, a process for synthesizing a photothermal membrane is provided. The process comprises coating a polyvinylidene fluoride (PVDF) membrane with polydopamine (PDA), and fluorinating the PDA-coated PVDF membrane by coating the PDA-coated PVDF membrane with a fluorine-containing organic molecule. In some embodiments, the coating is achieved via in situ oxidative polymerization of dopamine or adsorption of pre-synthesized PDA, and/or the fluorination is achieved via fluoro-silanization with tridecafluoro-1,1,2,2-tetrahydrooctyl-trichlorosilane (FTCS).

In yet another aspect, a photothermal aerogel membrane comprising a fluorine-containing organic molecule and polydopamine (PDA)-containing bacterial nanocellulose (BNC) is provided. In some embodiments, the membrane is hydrophobic, is a bilayer membrane, comprises a photothermal layer wherein the photothermal layer is a PDA-loaded BNC layer and a heat insulating layer wherein the heat insulating layer is a pristine BNC layer, is self-disinfecting, has a solar efficiency of at least about 10%, and/or has a permeate flux of at least about 1.0 kg m$^{-2}$ h$^{-1}$.

In yet another aspect, a process for synthesizing a photothermal aerogel membrane is provided. The process comprises incorporating polydopamine (PDA) particles into a bacterial nanocellulose (BNC) hydrogel, and fluorinating the PDA-containing BNC hydrogel by coating the PDA-containing BNC hydrogel with a fluorine-containing organic molecule. In some embodiments, the BNC hydrogel is synthesized from a *Gluconacetobacter hansenii* culture, the PDA particles are spherical, the process further comprises freeze-drying the PDA-containing BNC hydrogel prior to the fluorination, and/or the fluorination is achieved via a fluoro-silanization with tridecafluoro-1,1,2,2-tetrahydrooctyl-trichlorosilane (FTCS).

BRIEF DESCRIPTION OF THE DRAWINGS

The drawings described below illustrate various aspects of the disclosure.

FIG. 10 is a table of FTIR peak positions in accordance with the present disclosure.

FIG. 30 is a table of membrane materials and properties in accordance with the present disclosure.

FIG. 41 is an exemplary embodiment of an optical image of pristine BNC aerogel in accordance with the present disclosure.

FIG. 42 is an exemplary embodiment of a top surface SEM image of pristine BNC aerogel in accordance with the present disclosure.

FIG. 43 is an exemplary embodiment of another top surface SEM image of a pristine BNC aerogel in accordance with the present disclosure.

FIG. 44 is an exemplary embodiment of a cross-section SEM image of pristine a BNC aerogel in accordance with the present disclosure.

FIG. 45 is an exemplary embodiment of an optical image of a FTCS-PDA/BNC aerogel in accordance with the present disclosure.

FIG. 46 is an exemplary embodiment of a top surface SEM image of a FTCS-PDA/BNC aerogel in accordance with the present disclosure.

FIG. 47 is an exemplary embodiment of another top surface SEM image of a FTCS-PDA/BNC aerogel in accordance with the present disclosure.

FIG. 48 is an exemplary embodiment of a cross-section SEM image of a FTCS-PDA/BNC aerogel in accordance with the present disclosure.

DETAILED DESCRIPTION OF THE DISCLOSURE

Figure 1:
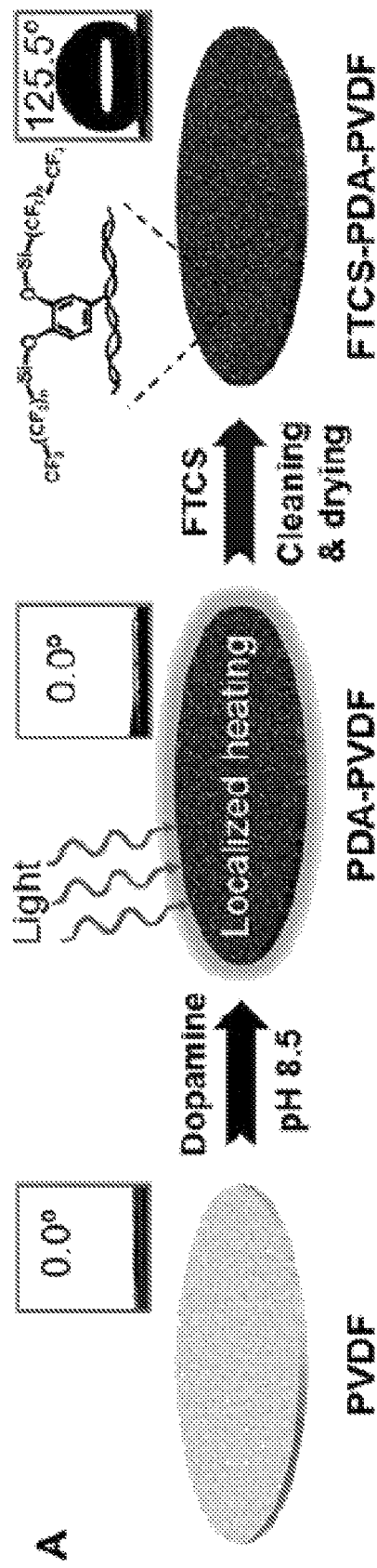
FIG. 1 is an exemplary embodiment of a schematic depicting the synthesis of the FTCS-PDA-PVDF membrane in accordance with the present disclosure.

In contrast to current water treatment processes which cannot ensure that 100% of bacteria are killed or that all contaminants are removed, the FTCS-PDA-PVDF and FTCS-PDA/BNC membranes disclosed herein cure these deficiencies. In the photothermal membrane distillation (PMD) process disclosed herein, only water vapor can penetrate the hydrophobic membrane, while bacteria and contaminants remain in the feed water. Such a performance allows cleaning highly polluted water for human use. In addition, the photothermal activity of the membrane helps to kill bacteria.

In some embodiments, the FTCS-PDA-PVDF and FTCS-PDA/BNC membranes disclosed herein are used in portable devices (e.g., through simple air gap membrane distillation), which are passive and do not require electricity. In some embodiments, the FTCS-PDA-PVDF and FTCS-PDA/BNC membranes disclosed herein are used in portable devices that require electricity. Such portable devices are applicable for personal use, in disaster areas, on ships, in households, and in decentralized clean water generation. PVDF membranes and BNC hydrogels are industrially produced in large quantities every day, making the commercial production of the membranes disclosed herein both easy and scalable. Similar to the proteins found in mussels in natural systems, PDA is environmental friendly, making the product even more attractive for commercial use.

Membrane distillation (MD) is a thermally-driven membrane separation process for water purification. In MD, two channels, which respectively contain hot feed water and the cooler distillate, are separated by a hydrophobic membrane. The temperature difference ($\Delta T$) between the two sides of the membrane induces a vapor pressure difference ($\Delta P$). Therefore, water vaporizes on the hot feed side, passes through the porous membrane, and condenses on the cold distillate side. In conventional MD, which uses hot feed water, the membrane surface temperature gradient is always smaller than the temperature difference between the bulk feed and distillate. Such a phenomenon is known as temperature polarization (TP), and it impairs the overall MD performance.

Recently, photothermal materials using sunlight have been incorporated into MD membranes to increase the driving force of water evaporation. This process is called photothermal membrane distillation (PMD). In PMD, a photothermal membrane harvests solar energy at the water-membrane interface, generates localized heating on the membrane's top surface, and induces a higher transmembrane temperature gradient. The locally high surface temperature can alleviate temperature polarization effects. Moreover, feed water at room temperature can be used in PMD, minimizing the energy needed to heat the bulk feed water. Unlike traditional pressure-driven desalination processes, such as reverse osmosis (RO), the thermally-driven desalination process of PMD, which is not pressure-driven, helps to minimize fouling on membrane surfaces. The reduced concern over membrane fouling also makes PMD suitable for treating hypersaline brines or highly polluted wastewater, including flowback water from unconventional oil and gas recovery systems.

Disclosed herein are two photothermal or PMD membranes using new materials and new synthesis methods. For the first membrane, polydopamine (PDA) was coated on a commercially available polyvinylidene fluoride (PVDF) membrane via in situ oxidative polymerization of dopamine. The PDA-coated PVDF membrane was made hydrophobic via a facile fluoro-silanization method using (tridecafluoro-1,1,2,2-tetrahydrooctyl)-trichlorosilane (FTCS), leading to a water contact angle of 125.5° for the FTCS-PDA-PVDF membrane. For the second membrane, a bacterial nanocellulose (BNC) hydrogel was synthesized by culturing *Gluconacetobacter hansenii*. Later, PDA particles were incorporated/loaded into the hydrogel while the bacteria were still growing, resulting in a PDA/BNC hydrogel. The PDA particle size was optimized for improved light absorption.

After cleaning, freeze-drying, and fluoro-silanization using FTCS, FTCS-PDA/BNC aerogel was synthesized.

The unique features of the photothermal membranes disclosed herein include easy synthesis, scalability, low cost, long-term chemical and mechanical stability, biodegradability, low environmental impact, and high performance in generating clean water. Previous photothermal or PMD membranes have used such materials as carbon black, silver nanoparticles, graphene oxides, and organic dyes. Their synthesis methods have included electrospinning and phase transformation, both of which are energy- and cost-intensive. In contrast, creating the PDA coating on PVDF requires less time, manpower, and electricity input. Based on the fact that both PVDF and BNC membranes have been commercialized in industry, the production of FTCS-PDA-PVDF and FTCS-PDA/BNC is scalable.

PDA has been shown to be biodegradable by adding proper enzymes upon its disposal, making the membrane environmentally-friendly. The strong adhesion of PDA on the PVDF surface makes the membrane highly stable when interacting with chemicals and during mechanical turbulence. Their reduced environmental impact and long-term stability enable PDA composite membranes highly suitable for real applications. In contrast, other photothermal materials are prone to delamination or leakage from membranes into water, which leads to performance impairment and environmental concerns. More importantly, the FTCS-PDA-PVDF and FTCS-PDA/BNC achieved high water generation fluxes under solar irradiation, with >99.9% salt rejection. They also exhibited excellent solar energy efficiencies, among the highest efficiencies from reported photothermal or PMD membranes at this time.

In some embodiments, a photothermal membrane is disclosed. The photothermal membrane comprises a fluorine-containing organic molecule and a photothermal material-coated, polyvinylidene fluoride (PVDF) membrane. In some embodiments, the fluorine-containing organic molecule is selected from tridecafluoro-1,1,2,2-tetrahydrooctyl-trichlorosilane (FTCS) and/or fluoropolymers. In some embodiments, the photothermal material is polydopamine (PDA). In some embodiments, the photothermal membrane is hydrophobic.

In some embodiments, the photothermal membrane has a solar efficiency of at least about 10%, at least about 20%, at least about 30%, at least about 40%, at least about 50%, at least about 60%, or greater. In some embodiments, the photothermal membrane has a permeate flux of at least about 0.40 kg m$^{-2}$ h$^{-1}$, at least about 0.50 kg m$^{-2}$ h$^{-1}$, at least about 0.60 kg m$^{-2}$ h$^{-1}$, or greater.

In some embodiments of the present disclosure, a process for synthesizing a photothermal membrane is disclosed. The process comprises coating a polyvinylidene fluoride (PVDF) membrane with a photothermal material; and fluorinating the photothermal material-coated PVDF membrane by coating the photothermal material-coated PVDF membrane with a fluorine-containing organic molecule. In some embodiments, the photothermal material is polydopamine (PDA). In some embodiments, the fluorine-containing organic molecule is selected from tridecafluoro-1,1,2,2-tetrahydrooctyl-trichlorosilane (FTCS) and/or fluoropolymers.

In some embodiments, the coating is achieved via in situ oxidative polymerization of dopamine or via adsorption of pre-synthesized photothermal materials. In some embodiments, the fluorination is achieved via fluoro-silanization with tridecafluoro-1,1,2,2-tetrahydrooctyl-trichlorosilane (FTCS). In some embodiments, the fluorination is achieved via at least one of a fluoropolymer spin-coating, a fluoropolymer, dip-coating, a fluoropolymer blade coating, a fluoropolymer spray coating, and a chemical vapor deposition of fluoropolymer.

In some embodiments of the present disclosure, a photothermal aerogel membrane is disclosed. The photothermal aerogel membrane comprises a fluorine-containing organic molecule and a photothermal material-containing foam. In some embodiments, the fluorine-containing organic molecule is selected from tridecafluoro-1,1,2,2-tetrahydrooctyl-trichlorosilane (FTCS) and/or fluoropolymers. In some embodiments, the photothermal material is polydopamine (PDA). In some embodiments, the foam is a three dimensional foam or hydrogel, such as a bacterial nanocellulose (BNC) hydrogel. In some embodiments, the photothermal material is embedded into the foam or adsorbed onto the foam. In some embodiments, the photothermal aerogel membrane is hydrophobic. In some embodiments, the photothermal aerogel membrane is self-disinfecting.

In some embodiments, the photothermal aerogel membrane is a bilayer membrane. In some embodiments, the bilayer membrane comprises a photothermal layer and a heat insulating layer. In some embodiments, the photothermal layer is a PDA-loaded BNC layer and the heat insulating layer is a pristine BNC layer.

In some embodiments, the photothermal aerogel membrane has a solar efficiency of at least about 10%, at least about 20%, at least about 30%, at least about 40%, at least about 50%, at least about 60%, at least about 70%, at least about 80%, or greater. In some embodiments, the photothermal aerogel membrane has a permeate flux of at least about 1.0 kg m$^{-2}$ h$^{-1}$, at least about 2.0 kg m$^{-2}$ h$^{-1}$, at least about 5.0 kg m$^{-2}$ h$^{-1}$, or greater.

In some embodiments of the present disclosure, a process for synthesizing a photothermal aerogel membrane is disclosed. The process comprises incorporating photothermal material particles into a foam; and fluorinating the photothermal material-containing BNC hydrogel by coating the photothermal material-containing BNC hydrogel with a fluorine-containing organic molecule. In some embodiments, the fluorine-containing organic molecule is selected from tridecafluoro-1,1,2,2-tetrahydrooctyl-trichlorosilane (FTCS) and/or fluoropolymers. In some embodiments, the photothermal material is polydopamine (PDA). In some embodiments, the foam is a three dimensional foam or hydrogel, such as a bacterial nanocellulose (BNC) hydrogel. In some embodiments, the photothermal material is embedded into the foam or adsorbed onto the foam. In some embodiments, the BNC hydrogel is synthesized from a *Gluconacetobacter hansenii* culture. In some embodiments, the PDA particles are spherical.

In some embodiments, the process further comprises freeze-drying the PDA-containing BNC hydrogel prior to the fluorination. In some embodiments, the fluorination is achieved via a fluoro-silanization with tridecafluoro-1,1,2,2-tetrahydrooctyl-trichlorosilane (FTCS). In some embodiments, the fluorination is achieved via at least one of a fluoropolymer spin-coating, a fluoropolymer, dip-coating, a fluoropolymer blade coating, a fluoropolymer spray coating, and a chemical vapor deposition of fluoropolymer.

EXAMPLES

The following examples illustrate various aspects of the disclosure.

Example 1: Localized Heating with a Photothermal Polydopamine Coating Facilitates a Novel Membrane Distillation Process Solar-driven membrane distillation using photothermal membranes is of considerable interest for future water desalination systems. However, the low energy efficiency, complex synthesis, and instability of current photothermal materials hinder their further development and practicability. A simple, stable, and scalable polydopamine (PDA)-coated polyvinylidene fluoride (PVDF) membrane is demonstrated herein for highly efficient solar-driven membrane distillation (MD). This membrane shows the best energy efficiency among existing photothermal MD membranes (45%) and the highest water flux (0.49 kg m$^{-2}$ h$^{-1}$) using a direct contact membrane distillation (DCMD) system under 0.75 kW m$^{-2}$ solar irradiation. Such a performance was facilitated by the PDA coating, whose broad light absorption and outstanding photothermal conversion properties enable higher transmembrane temperature and increased driving force for vapor transport. In addition, the excellent hydrophobicity achieved by fluoro-silanization gives the membrane great wetting resistance and high salt rejection. More importantly, the robustness of the disclosed membrane, stemming from the excellent underwater adhesion of the PDA, makes the composite membrane an outstanding candidate for real-world applications.

Broader Context

The rapidly increasing population, economic development, and water contamination have resulted in unprecedented global fresh water demands. To augment the freshwater supply and alleviate water scarcity, desalination of seawater and brackish water, which comprise 97.5% of the total water on Earth, has been extensively implemented by many countries in the past few decades. Over 19,000 water desalination plants have been built globally, reaching an estimated capacity of 100 million m$^3$ per day by 2017. Water desalination technologies include those without phase change processes, such as reverse osmosis (RO) and electrodialysis (ED), and those that involve phase change processes, such as thermal distillation (i.e., boiling) and membrane distillation (MD).

Membrane distillation, an advantageous thermally driven membrane technology, generates clean water based on the vapor pressure difference between the two sides of a porous hydrophobic membrane. In direct contact membrane distillation (DCMD), the most common MD configuration, water evaporates on the hot feed water side of the membrane surface, diffuses across the microporous membrane, and condenses on the cold distillate side. MD can be operable under conditions with lower temperatures than boiling and lower pressures than RO, leading to a decreased electricity input and less fouling or corrosion problems. Moreover, less sophisticated equipment and pretreatment systems facilitate MD to possess small footprint, compactness, and high modularity. The use of renewable energy sources to heat feed saline water, such as waste heat from power plants and solar energy by implementing solar thermal collection systems, further incentivizes the application of MD in sustainable water desalination. However, one of the main challenges of conventional MD is temperature polarization, which results in a lowered surface temperature at the membrane-feed water interface with respect to its bulk water value. Consequently, the cross-membrane temperature difference is decreased, reducing the driving force for mass transport and undermining the overall MD performance.

Light-driven localized heating at membrane surfaces that incorporate photothermal materials (e.g., Ag nanoparticles, carbon black, and nitrocellulose) has provided a means to alleviate the concerns brought by the influence of temperature polarization. With the integration of photothermal materials, localized heating can be efficiently generated from incident light (especially, renewable solar irradiation), which helps to increase and maintain the membrane surface temperature at the membrane-feed water interface. The MD system using photothermal membranes can significantly reduce the electricity input, while possessing other advantages of conventional MD processes, such as less fouling problems and the modularity to combine with other systems. However, the photothermal materials demonstrated so far have several limitations which hinder their further development and commercial practicability. For example, Ag nanoparticles are prone to delamination or leakage from membranes into water. The dissolution of photothermal materials will restrict its utilization for certain MD configurations (e.g., vacuum membrane distillation) and also lead to the potential impairment of the photothermal performance of the membrane during long term applications. On the other hand, the bilayer structure of the carbon black coating on the membrane surface makes the carbon black membrane exhibit low photothermal conversion efficiency. Also, the synthesis methods of these composite membranes are often complex, involving phase inversion or electrospinning processes, which may be cost and energy intensive.

Overview

In this example, a simple, stable, and highly effective PDA-coated polyvinylidene fluoride (PVDF) membrane is demonstrated for solar-driven membrane distillation. Polydopamine, as a mussel-inspired polymer, has been extensively applied in surface modifications owing to its inherent and robust adhesive properties and hydrophilic nature. Polydopamine is easily coated on surfaces, regardless of their initial surface energy, making the synthesis simple and cost effective. The PDA coating on organic substrates is extremely stable under harsh conditions, including ultrasonication or acidic pH (<1), which makes the long-term commercial application of PDA-coated materials viable. Similar to naturally occurring eumelanin, PDA also exhibits broad light absorption and remarkable photothermal conversion properties, which ensures its potential for application in highly efficient solar-based seawater desalination. Moreover, the biocompatibility, low toxicity and biodegradable nature of PDA make it an environmentally benign material for water purification and biomedical applications. The present disclosure provides methods to utilize PDA for solar-driven seawater desalination applications due to, in part, its superb photothermal properties, especially in solar-driven MD. The solar-driven MD system using PDA described herein has shown the best thermal efficiency to date among conventional photothermal MD systems and the highest water flux using a DCMD system. The simple, stable, and highly effective photothermal membrane introduced herein extends the application of PDA and provides a promising option to alleviate global fresh water scarcity problems.

Results and Discussion

Figure 2:
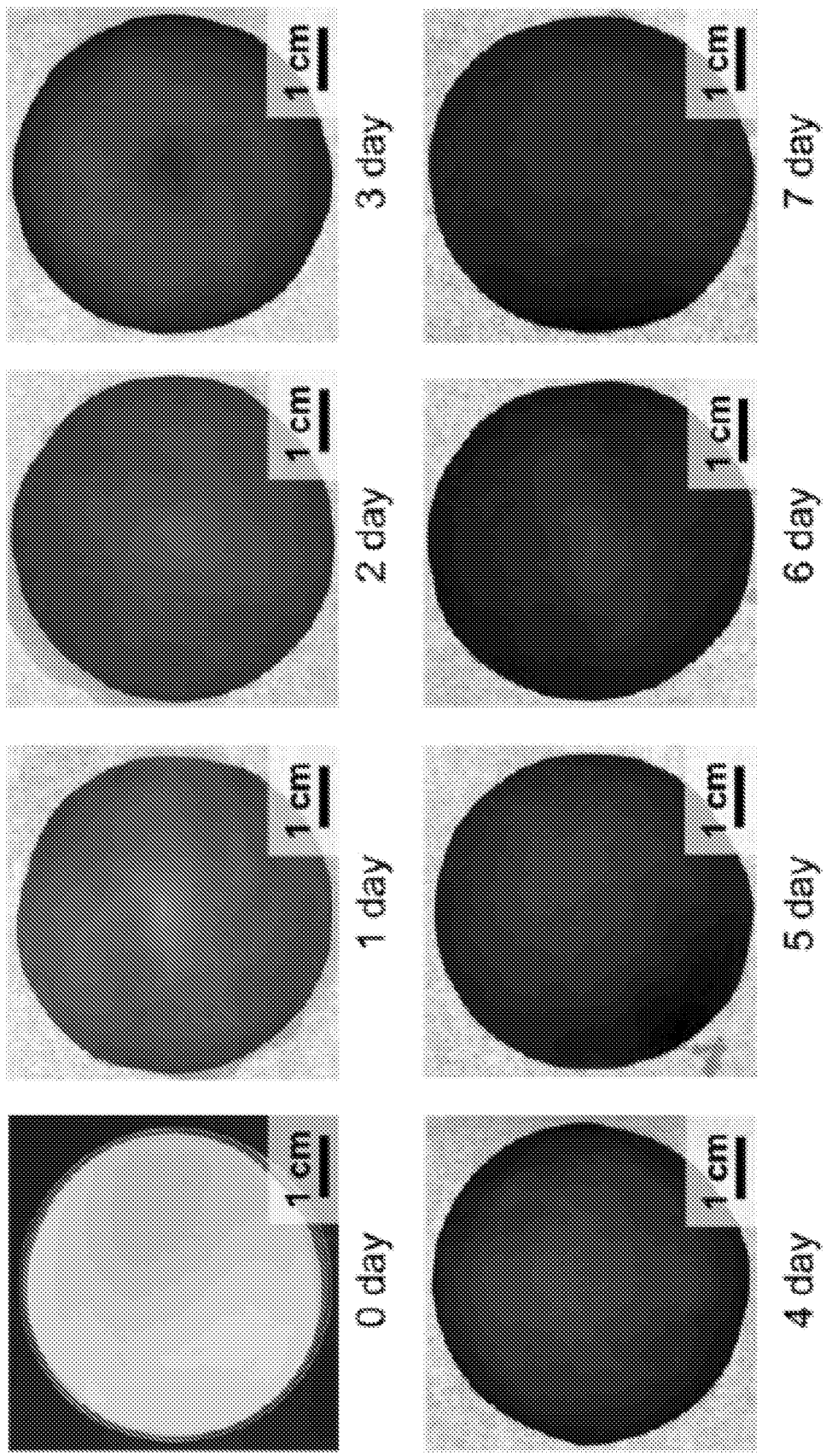
FIG. 2 is an exemplary embodiment of optical images showing the color change of the PVDF surface during the 7-day PDA self-polymerization process in accordance with the present disclosure.
Figures 3, 4, 5:
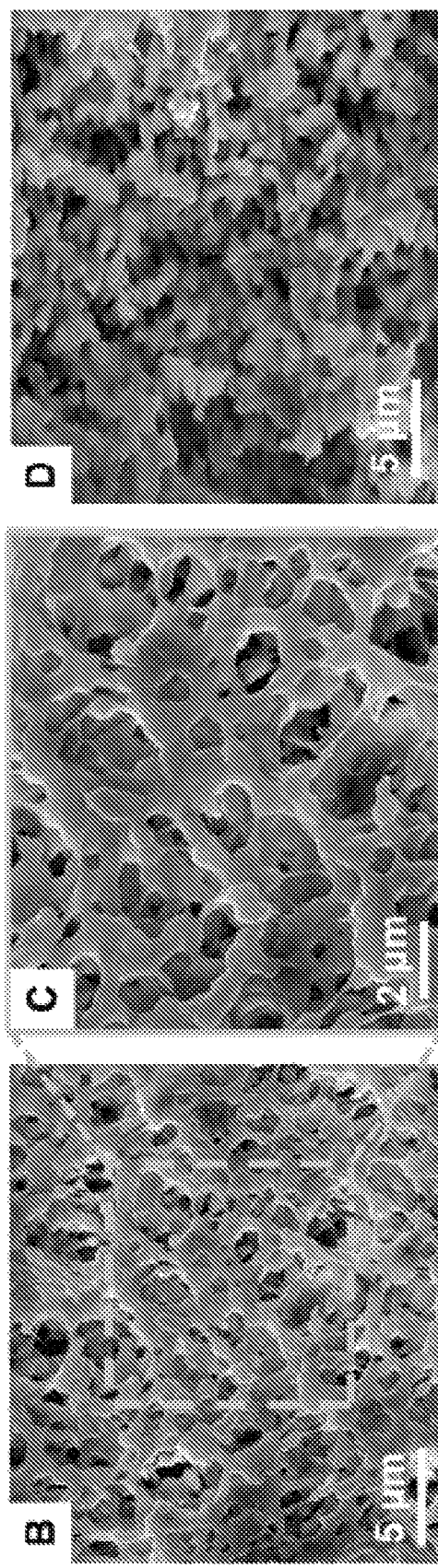
FIG. 3 is an exemplary embodiment of an SEM image of a pristine PVDF membrane surface in accordance with the present exemplary disclosure.
FIG. 4 is an exemplary embodiment of a zoomed-in SEM image of a pristine PVDF membrane surface in accordance with the present disclosure.
FIG. 5 is an exemplary embodiment of a cross-section SEM image of a pristine PVDF membrane surface in accordance with the present disclosure.
Figures 6, 7, 8:
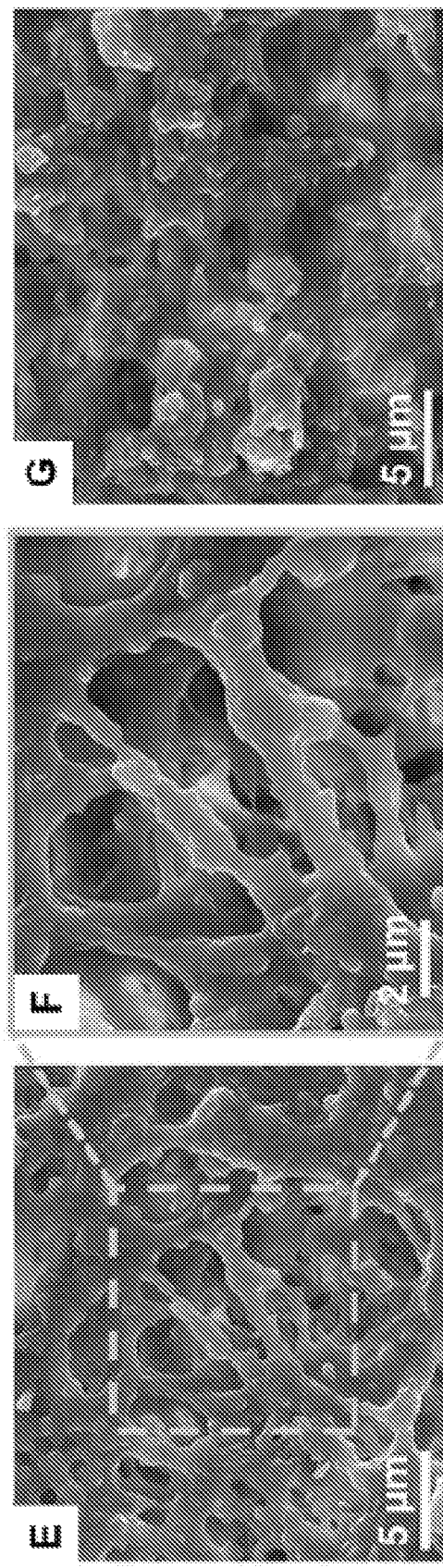
FIG. 6 is an exemplary embodiment of an SEM image of a FTCS-PDA-PVDF membrane surface in accordance with the present disclosure.
FIG. 7 is an exemplary embodiment of a zoomed-in SEM image of a FTCS-PDA-PVDF membrane surface in accordance with the present disclosure.
FIG. 8 is an exemplary embodiment of a cross-section SEM image of a FTCS-PDA-PVDF membrane surface in accordance with the present disclosure.

A polydopamine coating on a commercial hydrophilic PVDF membrane (0.45 mm pore size; MilliporeSigma) was achieved via a self-polymerization process (FIGS. 1 and 2). The PVDF membrane has been widely used for conventional MD systems. As disclosed, hydrophilic PVDF was chosen to achieve easier and more efficient PDA coating owing to the hydrophilic nature of PDA. With 2 mg/mL dopamine (DA) in 10 mM Tris-HCl (pH 8.5) solution, the self-polymerization process was repeated for 7 days to ensure that the entire surface of the PVDF was uniformly coated with PDA (FIG. 2). The uniform coating of PDA on the PVDF surface minimizes the influence of light illumination spot on the photothermal reactivity of the membrane. The amount of the PDA coating is tuned by varying the number of coating cycles, and the final weight percentage of PDA on PVDF after 7 cycles was quantified to be 9.7±0.5 wt % by measuring the weight difference of the membrane before and after polymerization. With an additional coating of PDA, the porosity (3) of the PDA-PVDF membrane decreased slightly (73.2% 2.6%, compared with 82.1% 4.2% for a pristine PVDF membrane, measured by a gravimetric method). On the other hand, hydrophobicity is important for MD membranes because it resists pore wetting, ensures the passage of only the vapor phase through the membrane pores, and enhances the salt rejection performance of the membrane. The hydrophobicity of the PDA-coated PVDF membrane was increased by a facile fluoro-silanization method using (tridecafluoro-1,1,2,2-tetrahydrooctyl)-trichlorosilane (FTCS), leading to a water contact angle of 125.5°. The above processes are evident in a morphological investigation carried out by scanning electron microscopy (SEM) and contact angle measurements, which clearly show a uniform and dense coating of PDA on the microporous PVDF surface and its cross-section (FIGS. 3-8), and the successful hydrophobic modification of FTCS, respectively (inset in FIG. 1). Image analysis of surface SEM images (5000 magnification) indicates that the average surface pore size of the FTCS-PDA-PVDF membrane was 0.96±0.42 μm by taking measurements of 100 pores. The average pore size of the FTCS-PDA-PVDF membrane became larger compared with that of the pristine PVDF membrane (0.46±0.13 μm, confirmed by SEM images), which can be due to the fact that the PDA coating closed the smaller pores rather than the bigger pores, causing the average pore size to increase (FIGS. 3 and 6). Consequently, the pore numbers calculated from the SEM images also decreased from $2.6 \times 10^7$ $cm^{-2}$ for the pristine PVDF membrane to $1.1 \times 10^6$ $cm^{-2}$ for the FTCS-PDA-PVDF membrane.

Figure 9:
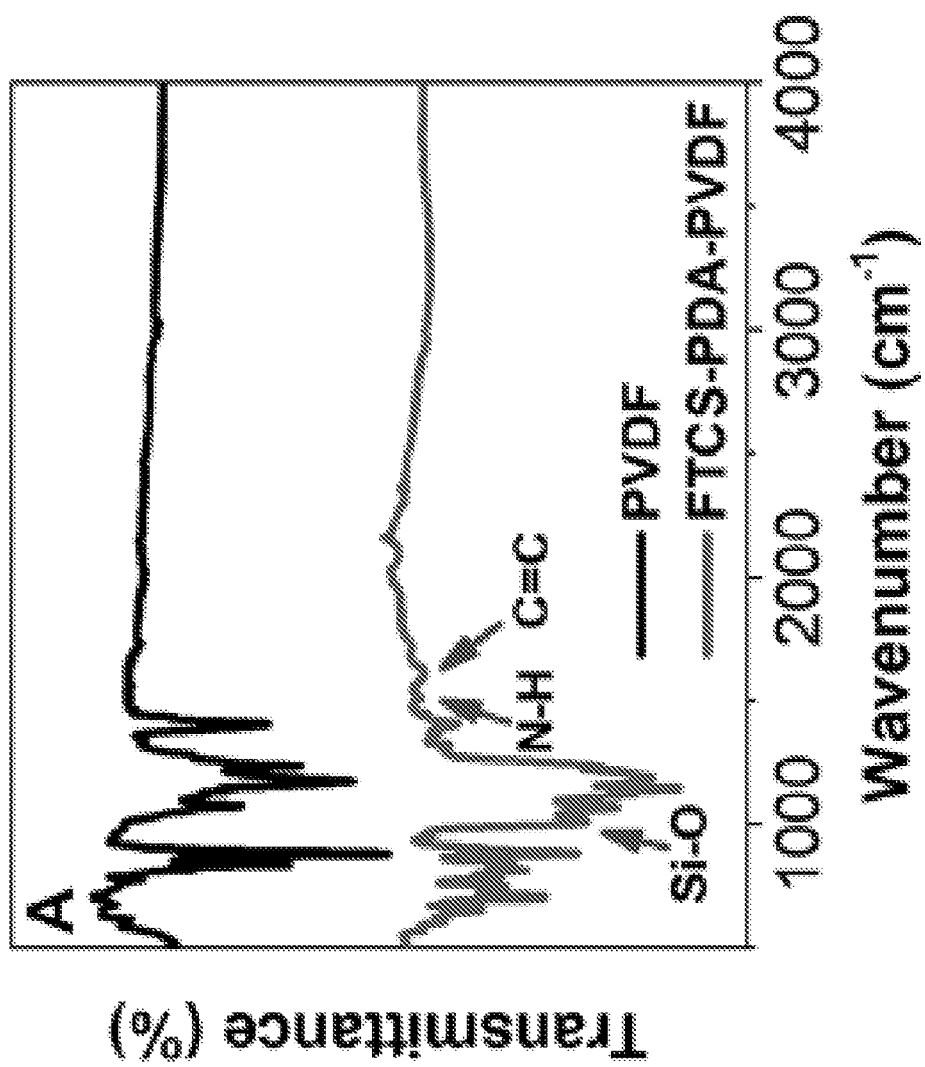
FIG. 9 is an exemplary embodiment of ATR-FTIR spectra of a pristine PVDF and FTCS-PDA-PVDF membranes in accordance with the present disclosure.
Figure 11:
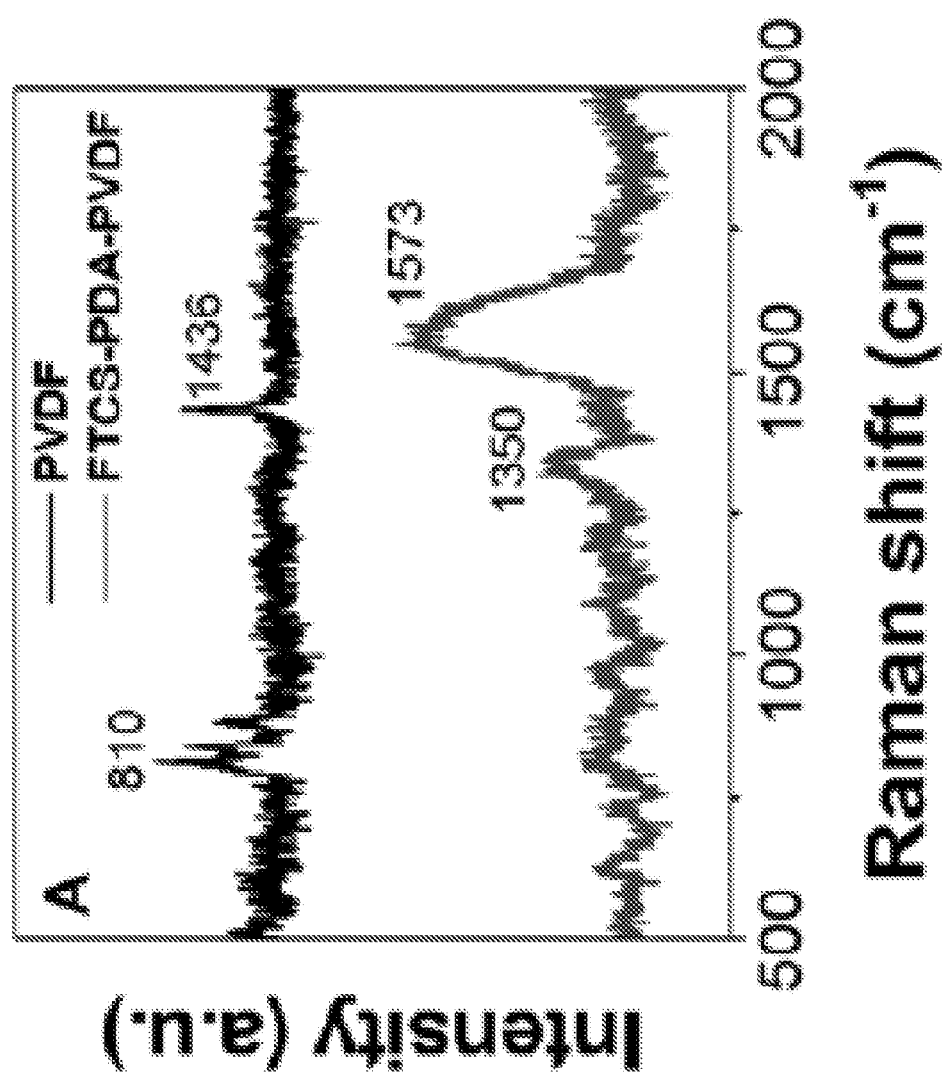
FIG. 11 is an exemplary embodiment of Raman spectra of pristine PVDF and FTCS-PDA-PVDF membranes in accordance with the present disclosure.
Figure 13:
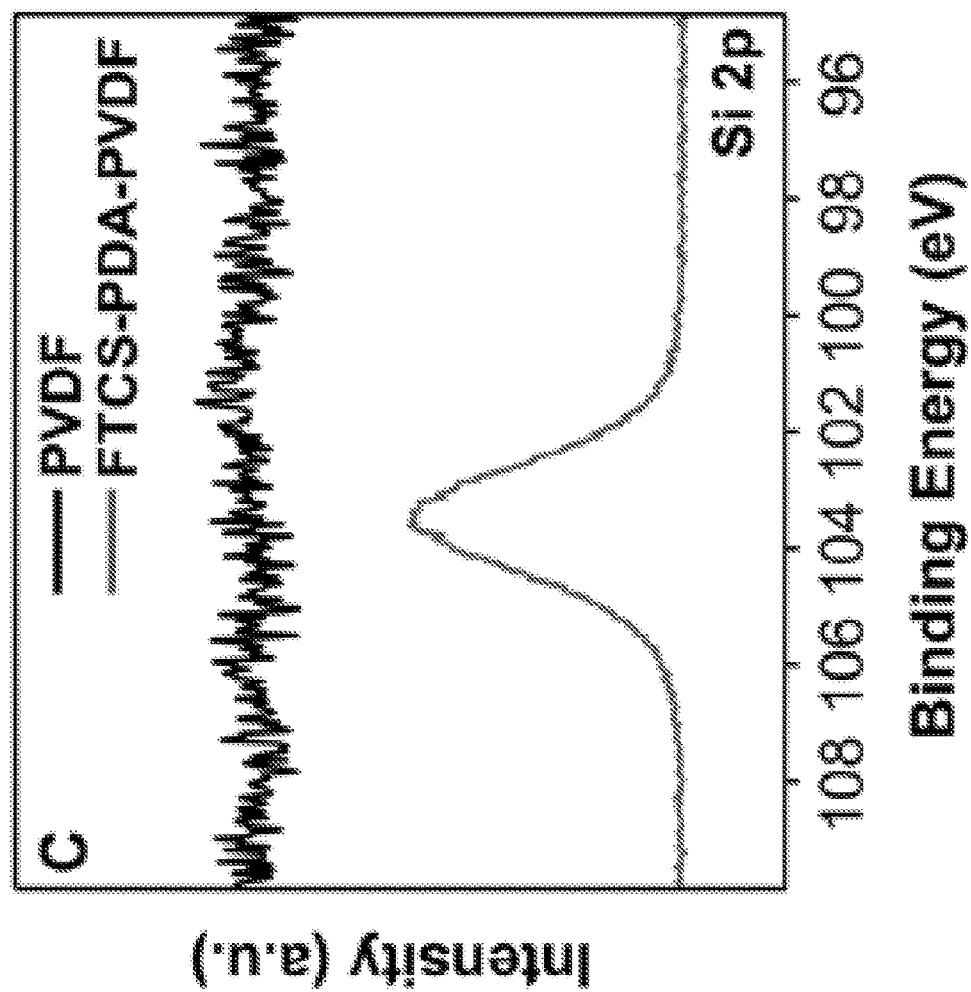
FIG. 13 is an exemplary embodiment of XPS spectra of pristine PVDF and FTCS-PDA-PVDF membranes showing the Si 2p peaks in accordance with the present disclosure.
Figure 14:
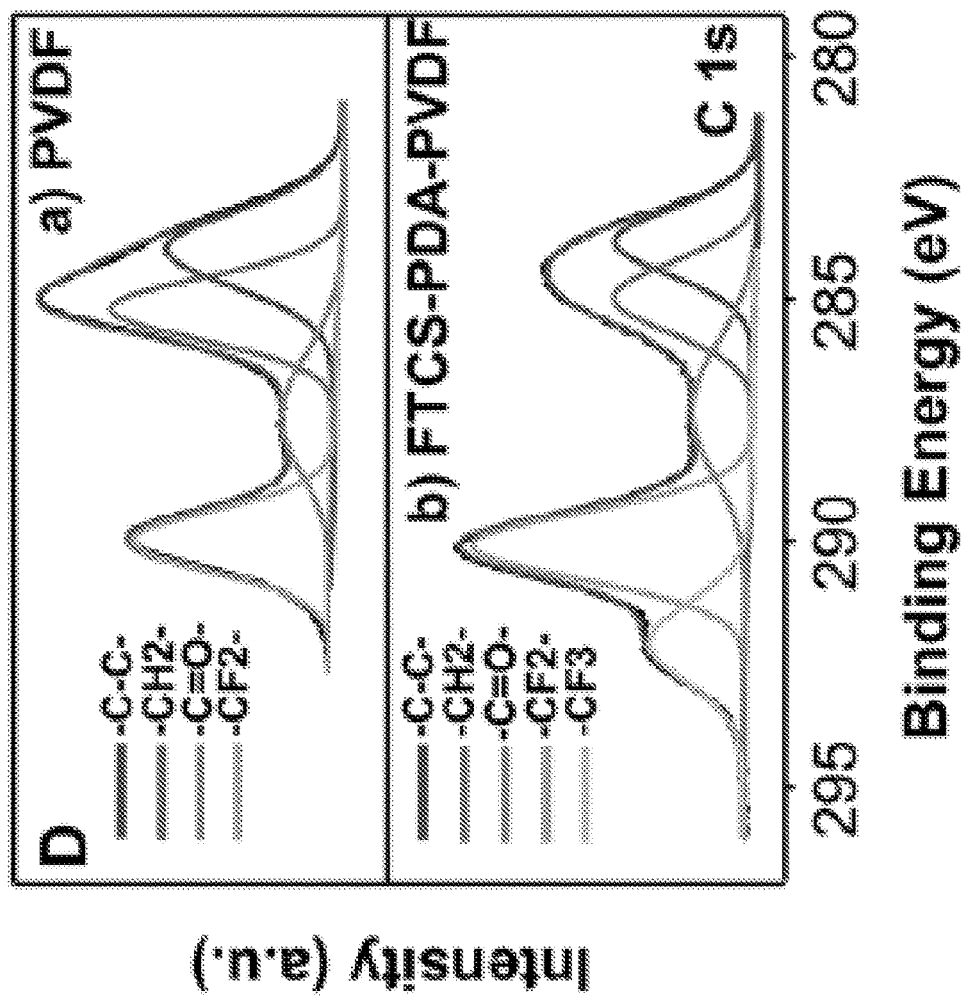
FIG. 14 is an exemplary embodiment of XPS spectra of pristine PVDF and FTCS-PDA-PVDF membranes showing the C 1s peaks in accordance with the present disclosure.

To further understand the chemical composition of the synthesized FTCS-PDA-PVDF membrane, attenuated total reflection Fourier transform infrared (ATR-FTIR) spectroscopy measurements were performed (FIG. 9). The characteristic N—H and C=C peaks of PDA on PVDF at 1520 and 1610 $cm^{-1}$, and the Si—O peak of FTCS at 1010 $cm^{-1}$, respectively, indicated the successful coating of PDA and the FTCS modification. The ATR-FTIR reference peaks of the PDA coating on PVDF are summarized in FIG. 10. Raman spectroscopy also showed peaks of PDA at 1350 and 1573 $cm^{-1}$ (FIG. 11), corresponding to the stretching and deformation of the catechol groups of PDA, respectively. X-ray photoelectron spectroscopy (XPS) revealed the chemical composition difference between pristine PVDF and FTCS-PDA-PVDF, based on the N 1s, Si 2p, and C 1s peaks (FIG. 12-14).

Figure 12:
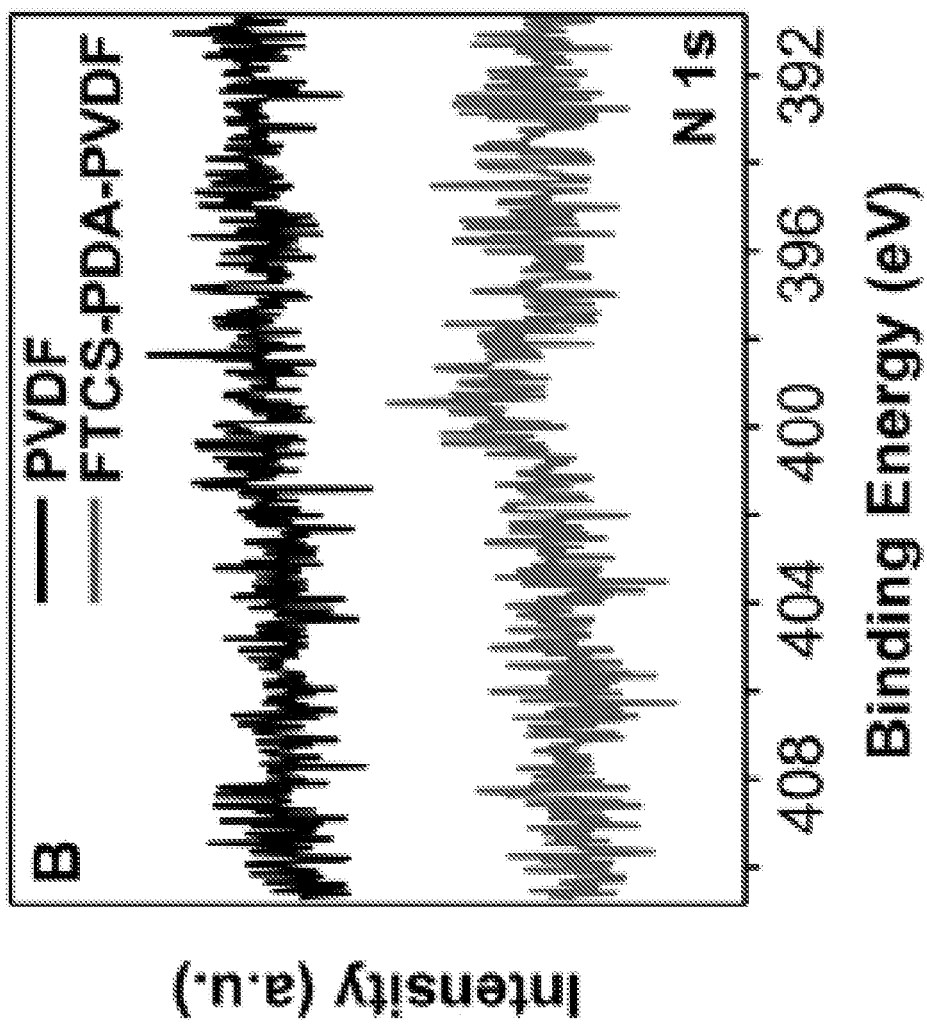
FIG. 12 is an exemplary embodiment of XPS spectra of pristine PVDF and FTCS-PDA-PVDF membranes showing the N 1s peaks in accordance with the present disclosure.
Figure 15:
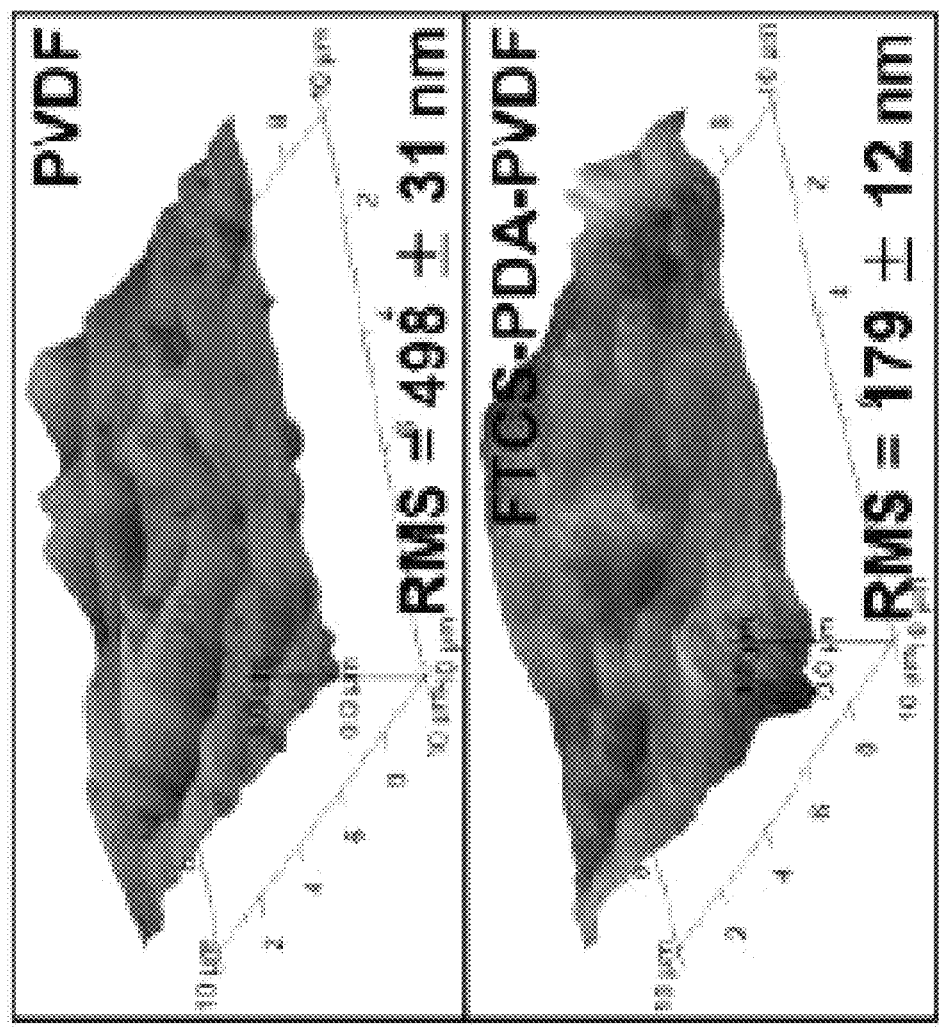
FIG. 15 is an exemplary embodiment of tapping mode AFM images (10 μm×10 μm) showing the surface roughness (RMS) of pristine PVDF and FTCS-PDA-PVDF membranes in accordance with the present disclosure.

As shown in FIG. 12, a new N 1s peak emerged at 398-402 eV for the FTCS-PDA-PVDF, corresponding to the N—C and N—H bonds of PDA layers on the surface of the PVDF membrane. The new emerging Si 2p peak of FTCS-PDA-PVDF membrane at 103.8 eV (FIG. 13) is attributed to the Si—O bond of FTCS on the PDA-PVDF surface. Within the broad C is peak (FIG. 14), the increased relative ratio of —CF2- (290.2 eV) to —CH2- (285.2 eV) and the newly appeared —CF3 peak (292.3 eV) of FTCS-PDA-PVDF membrane were attributed to the fluorinated tails of FTCS on the PVDF surface. Further, to evaluate the PDA coating effects on surface roughness, the root-mean-square (RMS) roughness's of both FTCS-PDA-PVDF (179±12 nm) and pristine PVDF (498±31 nm) membranes were acquired by recording tapping mode atomic force microscopy (AFM) images (FIG. 15). The lowered surface roughness after PDA coating is attributed to the partial filling of the large pores in the PVDF membrane with PDA, which is also observed in the SEM images.

Figure 16:
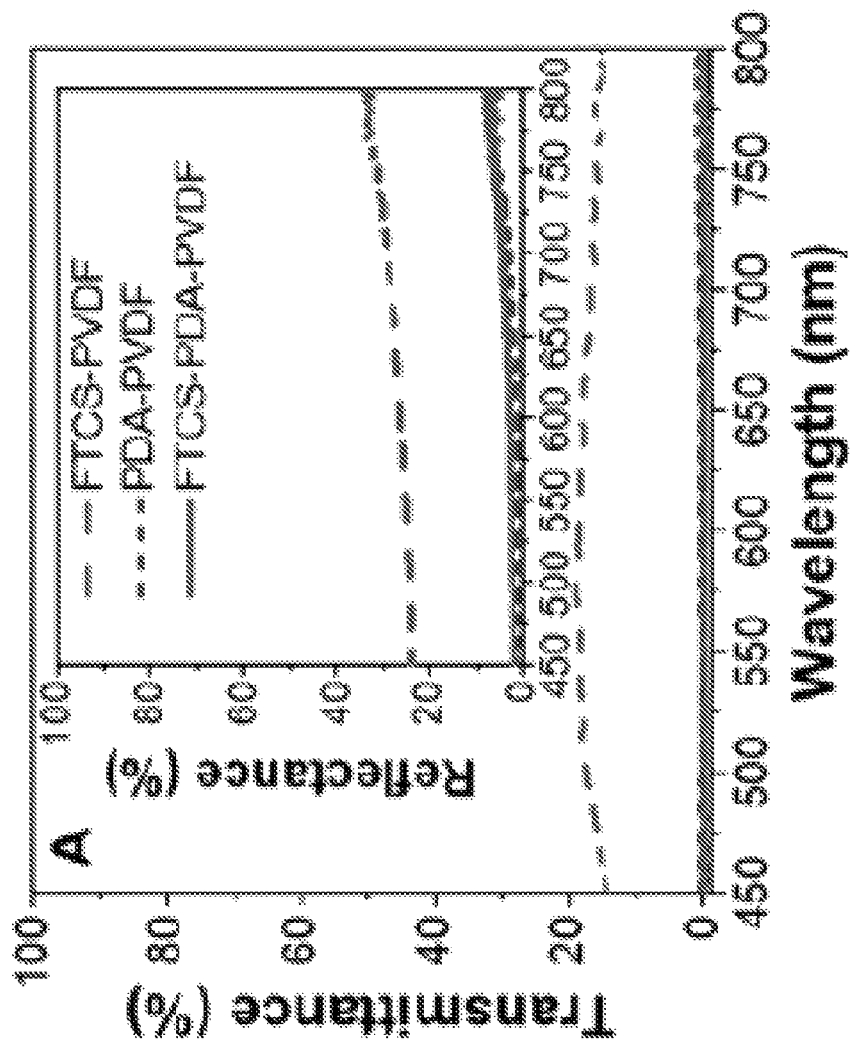
FIG. 16 is an exemplary embodiment of transmittance and (inset) reflectance spectra of FTCS-PVDF, PDA-PVDF, and FTCS-PDA-PVDF membranes in accordance with the present disclosure.
Figure 17:
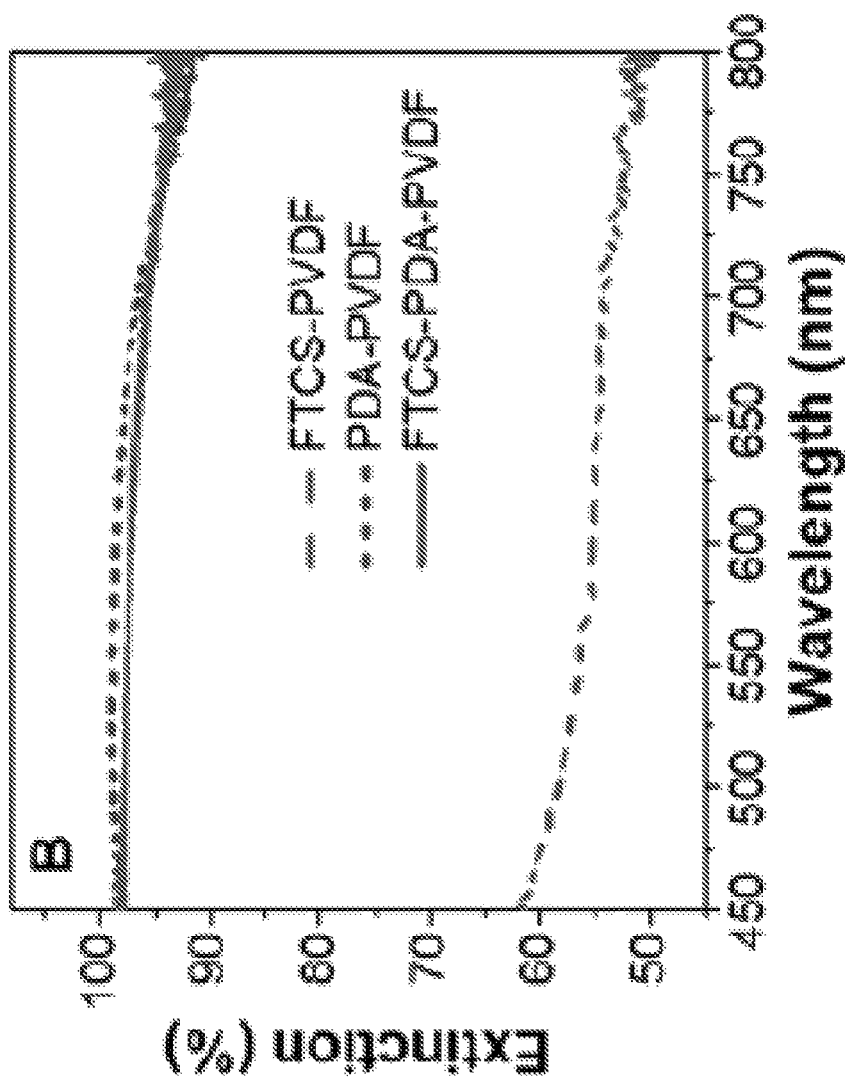
FIG. 17 is an exemplary embodiment of light extinction spectra of FTCS-PVDF, PDA-PVDF, and FTCS-PDA-PVDF membranes in accordance with the present disclosure.

In light-to-heat conversion by photothermal materials, light absorption properties are of crucial importance. Hence, following the chemical characterization, the transmittance and reflectance measurements of the FTCS-PDA-PVDF membrane were carried out in the range of 450-800 nm, using a microspectrophotometer (FIGS. 16 and 17). The light absorption properties of pristine PVDF membranes modified only with FTCS (FTCS-PVDF) and with PDA (PDA-PVDF) were also measured for comparison. The FTCS-PVDF membrane showed high transmittance (17.1%) and reflectance (27.6%) in the visible region, which indicated relatively low light extinction (55.3%). On the other hand, after PDA coating, the PDA-PVDF and FTCS-PDA-PVDF membranes exhibited extremely small optical transmittance (0.4% for PDA-PVDF and 0.1% for FTCS-PDA-PVDF) and reflectance (2.6% for PDA-PVDF and 3.7% for FTCS-PDA-PVDF) in the visible region, indicating large optical extinction (97.0% for PDA-PVDF, and 96.2% for FTCS-PDA-PVDF) by these membranes. This excellent light extinction property, which was mainly attributed to light absorption by the PDA coating and light scattering by the porous structure of the membrane, underlies the light-to-heat conversion of the FTCS-PDA-PVDF membrane.

Figure 18:
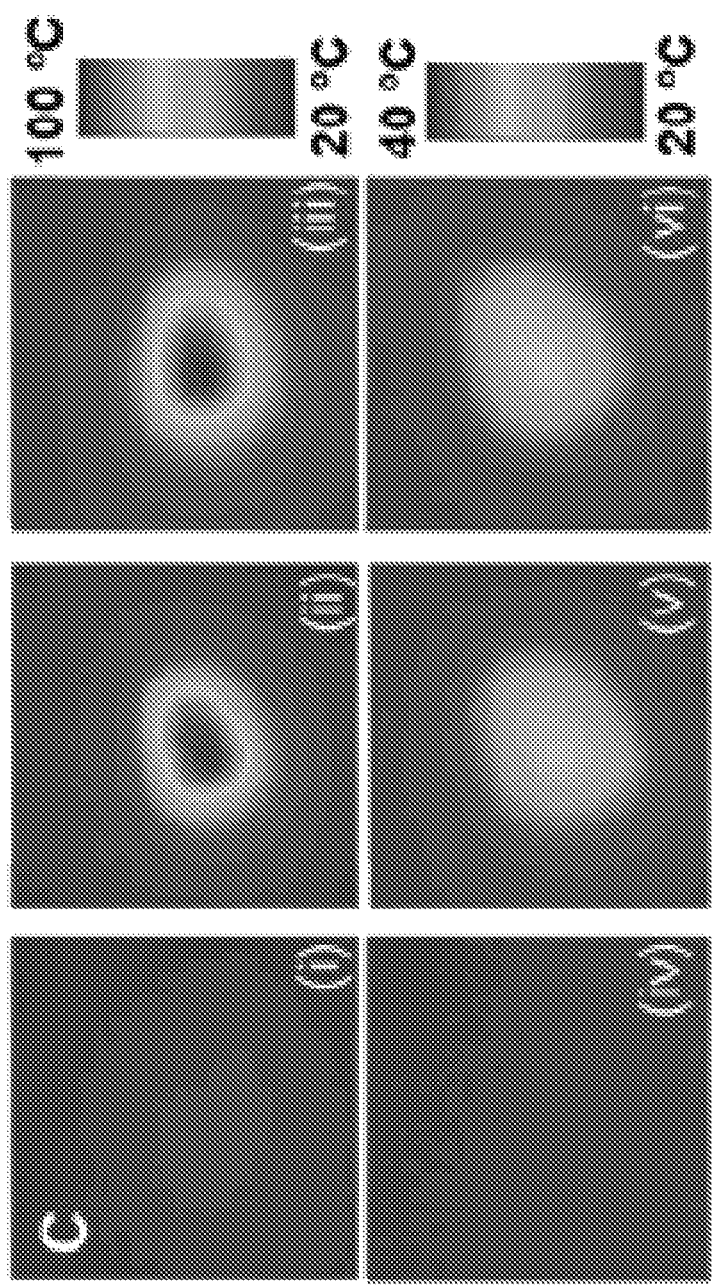
FIG. 18 is an exemplary embodiment of IR camera images of a FTCS-PVDF membrane under an illumination of 7.0 kW/m$^2$ (i) and 0.75 kW/m$^2$ (iv), a PDA-PVDF membrane under an illumination of 7.0 kW/m$^2$ (ii) and 0.75 kW/m$^2$ (v), and a FTCS-PDA-PVDF membrane under 7.0 kW/m$^2$ (iii) and 0.75 kW/m$^2$ (vi) after 600 seconds illumination in accordance with the present disclosure.
Figure 19:
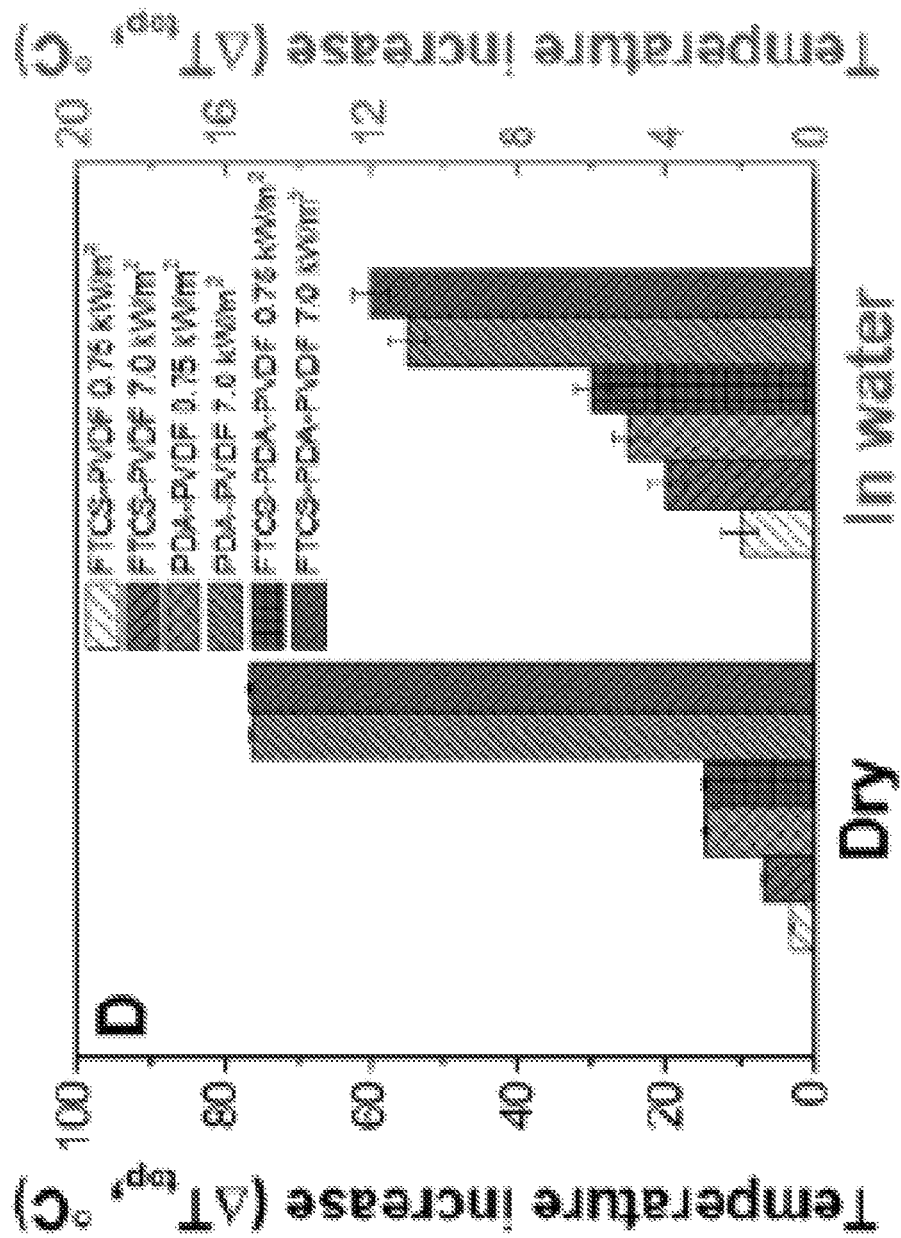
FIG. 19 is an exemplary embodiment of surface temperature increase (ΔT, ° C.) from room temperature (20° C.) of FTCS-PVDF, PDA-PVDF, and FTCS-PDA-PVDF membranes, after 600 seconds illumination at 7.0 kW/m$^2$ and 0.75 kW/m$^2$, both under dry conditions and under water (water thickness ¼ 8 mm) in accordance with the present disclosure.
Figure 20:
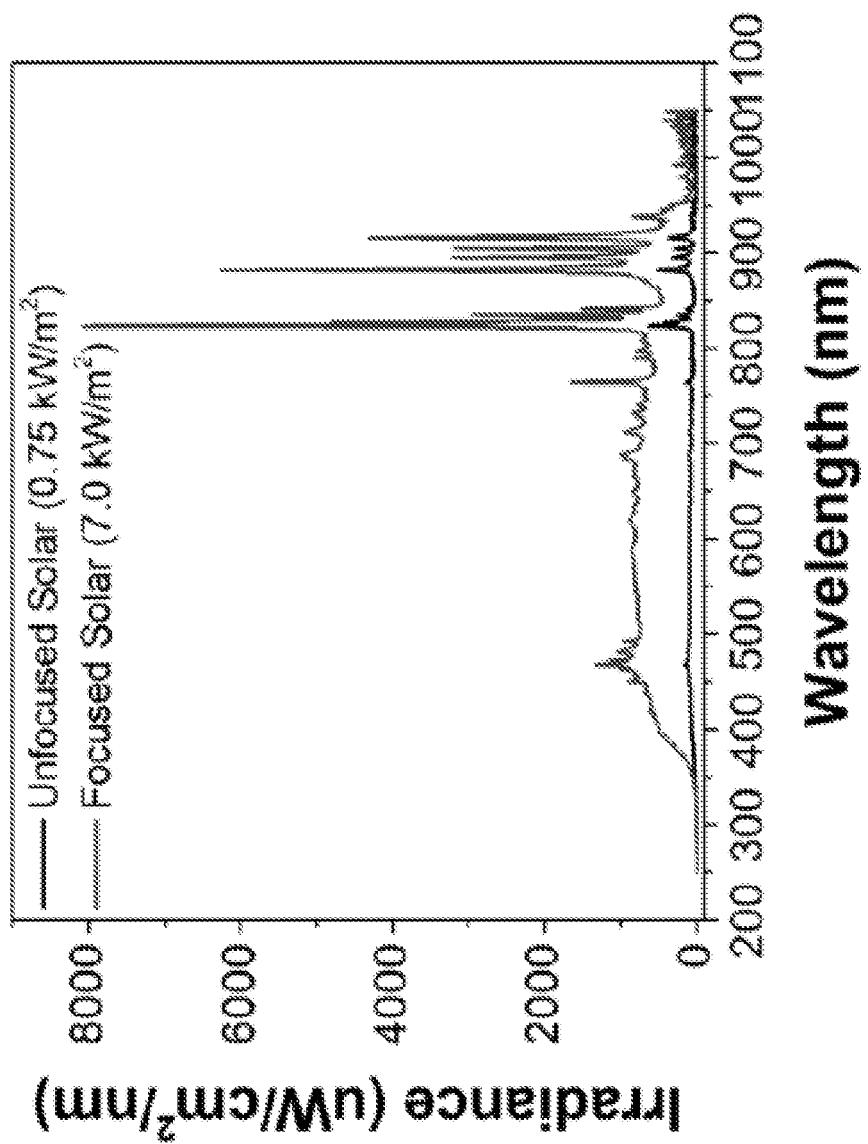
FIG. 20 is an exemplary embodiment of solar irradiance spectra of the solar simulator for unfocused (0.75 kW/m$^2$) and focused (7.0 kW/m$^2$) conditions in accordance with the present disclosure.

Further, to probe the photothermal conversion performance of the FTCS-PDA-PVDF membrane, the surface temperatures of dry FTCS-PVDF, PDA-PVDF, and FTCS-PDA-PVDF membranes were measured using an infrared (IR) camera under light illumination from a solar simulator (FIGS. 18 and 19). Two light intensities were used to represent unfocused and focused illumination, and the power densities were measured to be 0.75 (0.7 sun) and 7.0 kW/m$^2$ (7 sun), respectively, using a spectroradiometer (FIG. 20). After 600 seconds of illumination, the surface equilibrium temperature of dry FTCS-PDA-PVDF membranes increased from room temperature (20° C.) to ~35° C. (at 0.75 kW m$^{-2}$) and to 97° C. (at 7.0 kW m$^{-2}$). The surface temperature of the dry PDA-PVDF membrane also increased from 20° C. to 35° C. (0.75 kW m$^{-2}$) and to 96° C. (7.0 kW m$^{-2}$). In comparison, the surface temperature of the dry FTCS-PVDF membrane increased only from 20° C. to 23° C. (0.75 kW m$^{-2}$) and to 27° C. (7.0 kW m$^{-2}$) under the same irradiation conditions. To evaluate the photothermal conversion properties of these membranes under water, the surface temperatures of the membranes with water on top (8 mm distance from the membrane to the air/water interface) were also monitored using a benchtop controller thermocouple probe. For the membranes immersed in water, the temperature increases on the top of the membrane surface were smaller than those of the dry membranes. Under water, after 600 seconds illumination, the surface equilibrium temperature of the FTCS-PDA-PVDF membrane increased from 20° C. to 26° C. (0.75 kW m$^{-2}$) and to 32° C. (7.0 kW m$^{-2}$), and the temperature of the PDA-PVDF membrane increased from 20° C. to 25° C. (0.75 kW m$^{-2}$) and to 31° C. (7.0 kW m$^{-2}$), while the temperature of the FTCS-PVDF membrane increased only from 20° C. to 22° C. (0.75 kW m$^{-2}$) and to 24° C. (7.0 kW m$^{-2}$). The water on top of the membrane absorbed and scattered the photons passing through, thus reducing the number of photons absorbed by the PDA coating on the membrane. The above results confirmed that the PDA coating on the PVDF surface exhibited high photothermal conversion and can be utilized for localized heating under solar irradiation.

Figure 21:
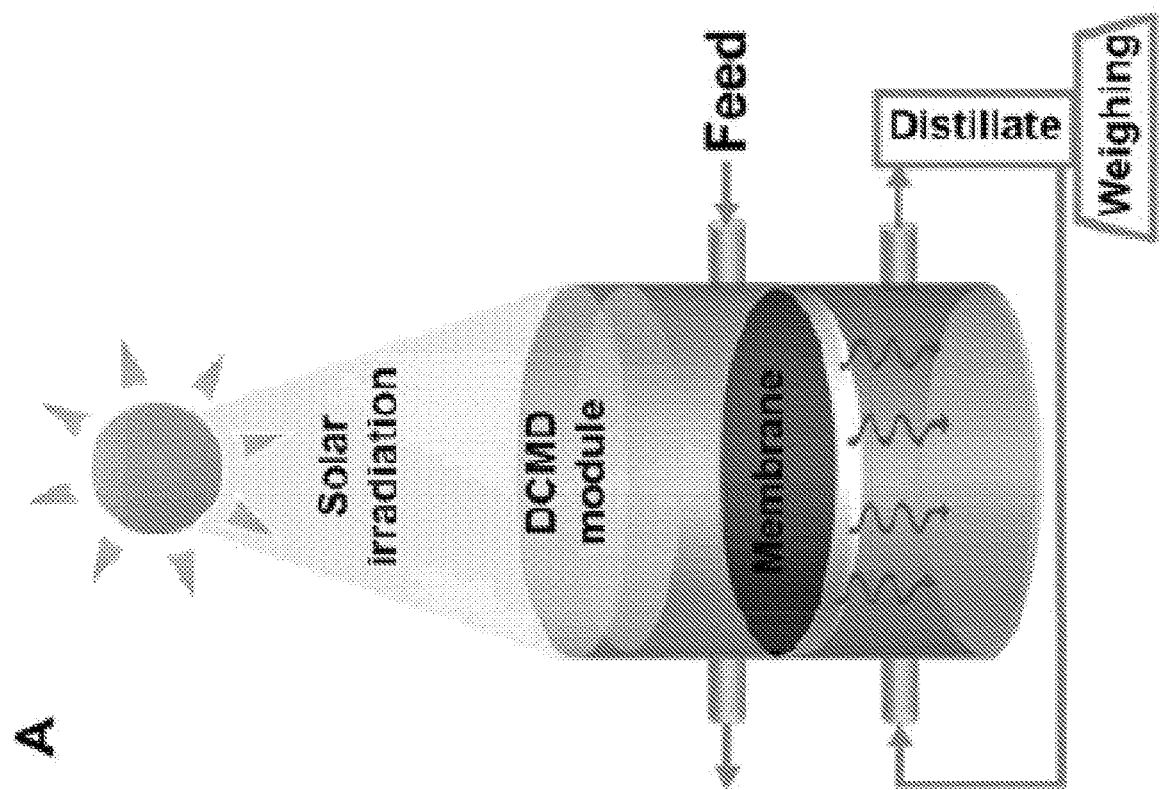
FIG. 21 is an exemplary embodiment of a schematic depicting a solar-driven DCMD system in accordance with the present disclosure.
Figure 22:
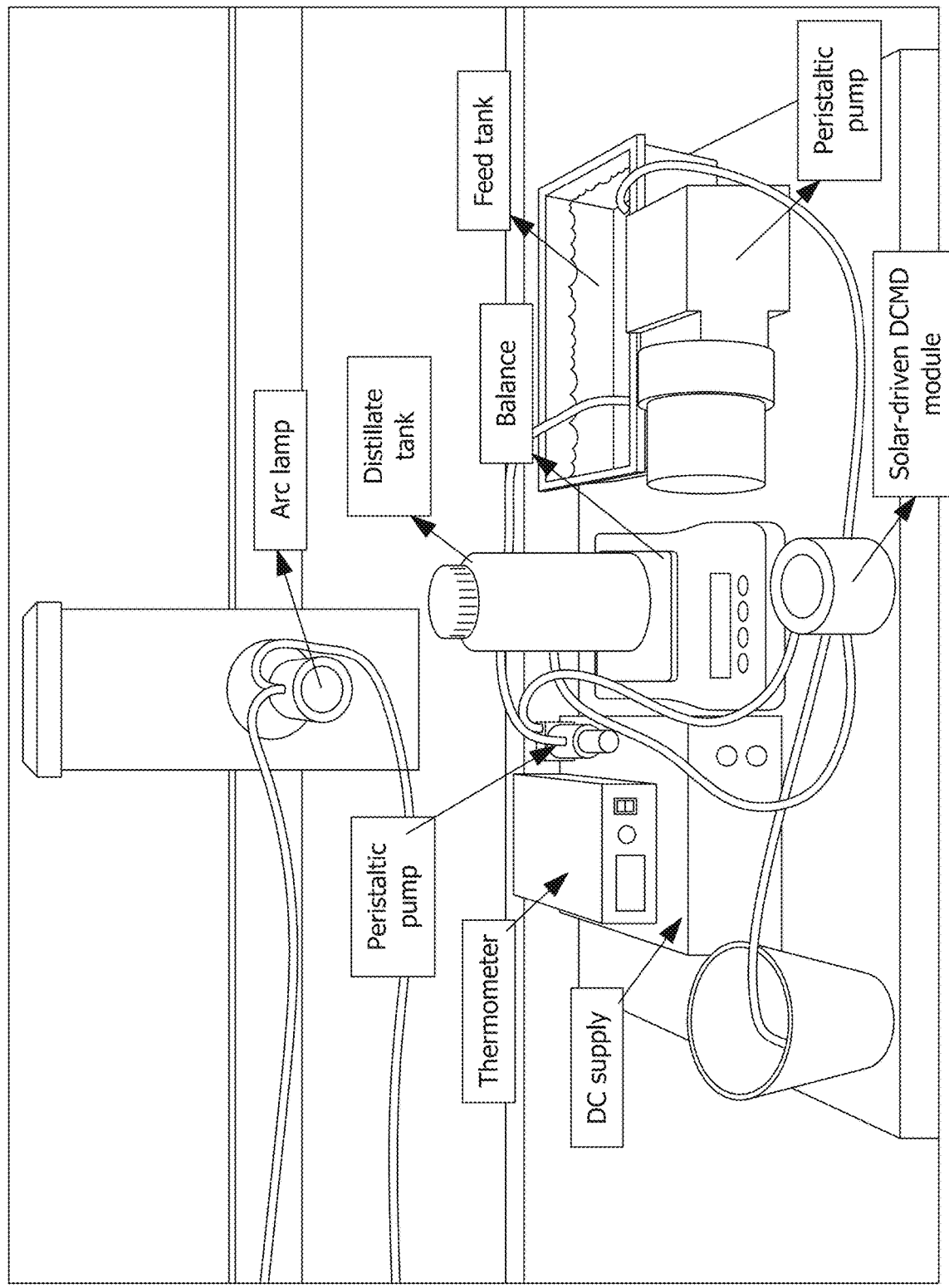
FIG. 22 is an exemplary embodiment of a photo of the portable solar-driven direct contact membrane distillation system in accordance with the present disclosure.
Figure 23:
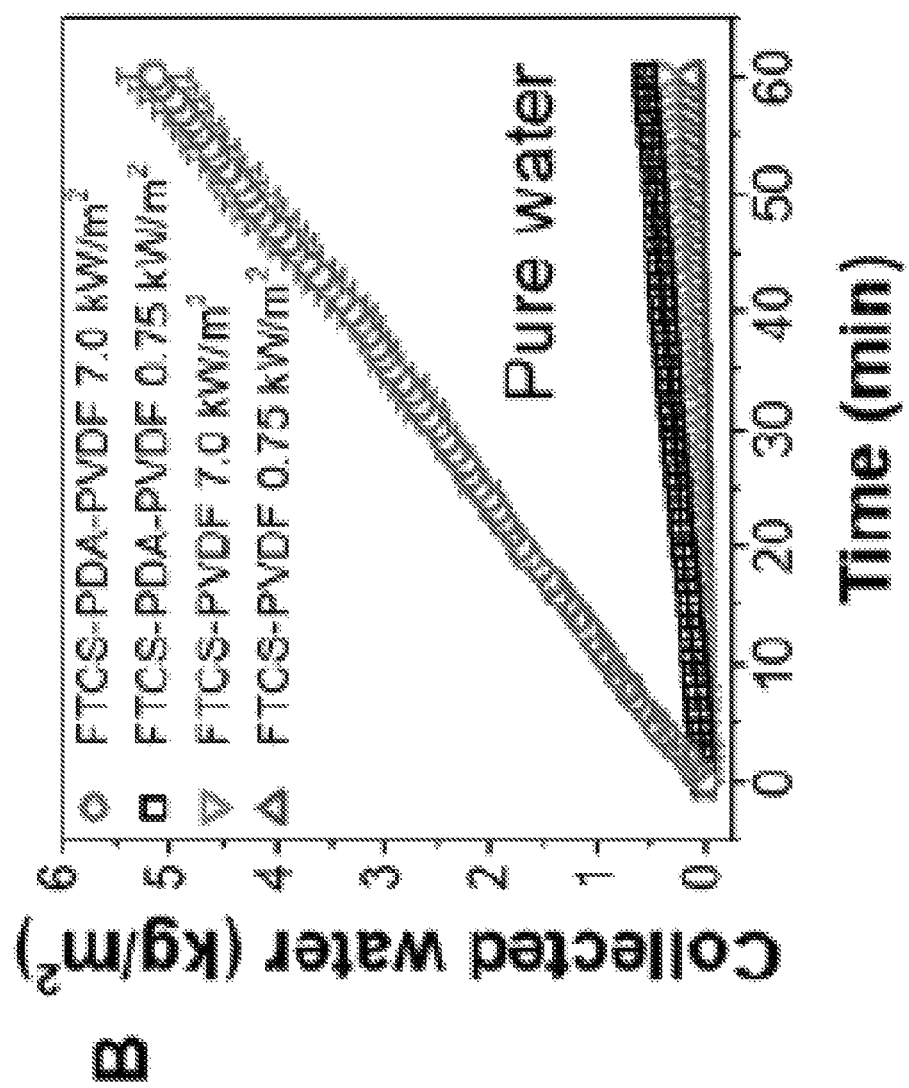
FIG. 23 is an exemplary embodiment of collected water (kg/m$^2$) using a FTCS-PVDF and a FTCS-PDA-PVDF membrane, using pure water under different solar irradiation in accordance with the present disclosure. Triplicate membrane samples were tested in all cases.
Figure 24:
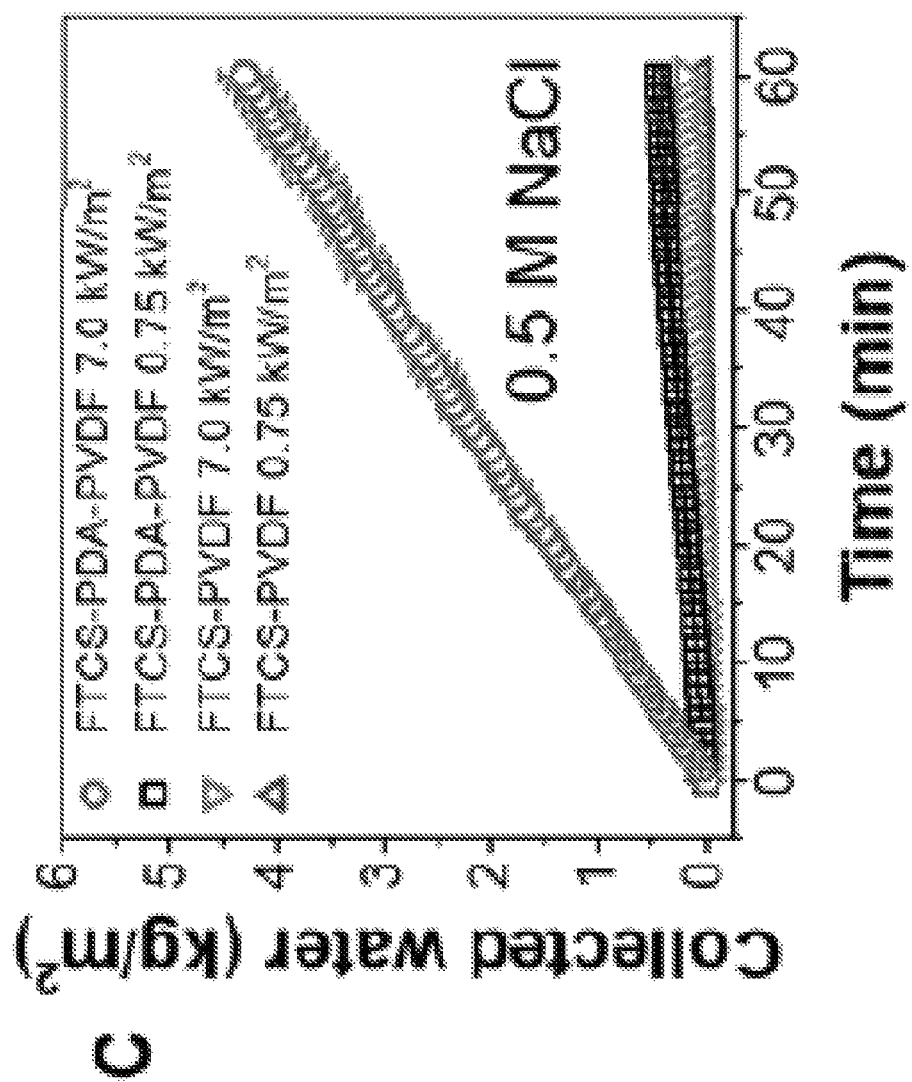
FIG. 24 is an exemplary embodiment of collected water (kg/m$^2$) using a FTCS-PVDF and a FTCS-PDA-PVDF membrane, using 0.5 M NaCl saline water under different solar irradiation in accordance with the present disclosure. Triplicate membrane samples were tested in all cases.
Figure 25:
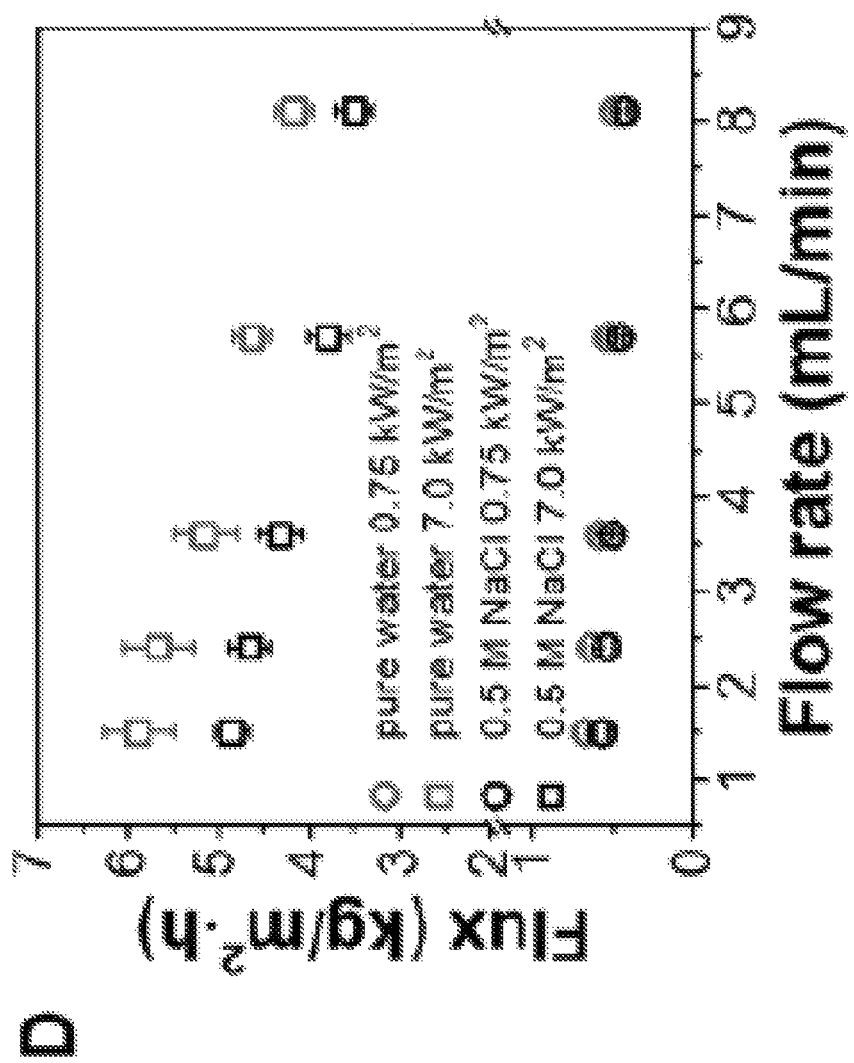
FIG. 25 is an exemplary embodiment of flux of the solar driven DCMD system using a FTCS-PDA-PVDF membrane with varying feed flow rates, using both pure water and 0.5 M NaCl saline water under different solar irradiation in accordance with the present disclosure. Triplicate membrane samples were tested in all cases.

The solar-driven MD performance of the FTCS-PDA-PVDF membrane was tested in a specially designed DCMD module (FIGS. 21 and 22). The distillate (DI water, 20° C.) was circulated with a flow rate of 16.2 mL min$^{-1}$, and the increasing weight of the distillate was measured continuously using a balance to quantify the amount of collected water. To test the MD performance within 60 minutes (FIGS. 23 and 24) at different salinities, both pure water and highly saline water (0.5 M NaCl) were used as the feed water (20° C.) with a flow rate of 3.6 mL min$^{-1}$. Here, 0.5 M salinity was chosen to mimic the average salinity of seawater. The FTCS-PVDF membrane was used as a control membrane for comparison. For the FTCS-PDA-PVDF membrane with pure water, the water flux was 0.58 kg m$^{-2}$ h$^{-1}$ under 0.75 kW m$^{-2}$ irradiation. For the FTCS-PVDF membrane, the water flux was only 0.12 kg m$^{-2}$ h$^{-1}$ under identical irradiation, which is 3.8 times lower than that of the FTCS-PDA-PVDF membrane. With higher irradiation intensity (7.0 kW m$^{-2}$), the water flux of the FTCS-PDA-PVDF membrane increased to 5.17 kg m$^{-2}$ h$^{-1}$, 12.6 times higher than that of the FTCS-PVDF membrane (0.38 kg m$^{-2}$ h$^{-1}$) under identical irradiation. In comparison, the water flux obtained with saline feed water was lower than that of pure water for both the FTCS-PVDF and FTCS-PDA-PVDF membranes. With saline water, the water fluxes for the FTCS-PDA-PVDF membrane were 0.49 and 4.23 kg m$^{-2}$ h$^{-1}$ under 0.75 and 7.0 kW m$^{-2}$ irradiation, significantly higher than those of the FTCS-PVDF membrane (0.09 and 0.22 kg m$^{-2}$ h$^{-1}$). The lower water flux with saline water was due to the lower vapor pressure being in equilibrium with the feed, resulting in a lower vapor pressure difference across the membrane. To put the FTCS-PDA-PVDF membrane in a real-world use perspective, with saline water, a permeate flux rate of 0.49 kg m$^{-2}$ h$^{-1}$, and an active area of 1×1 m$^2$, the disclosed solar MD system could generate 3.92 L per day under 0.75 kW m$^{-2}$ irradiation, with 8 h of sunlight exposure at 20° C. ambient temperature. This outstanding solar-driven MD performance of the FTCS-PDA-PVDF membrane makes it highly attractive for efficient and sustainable desalination processes.

Figure 27:
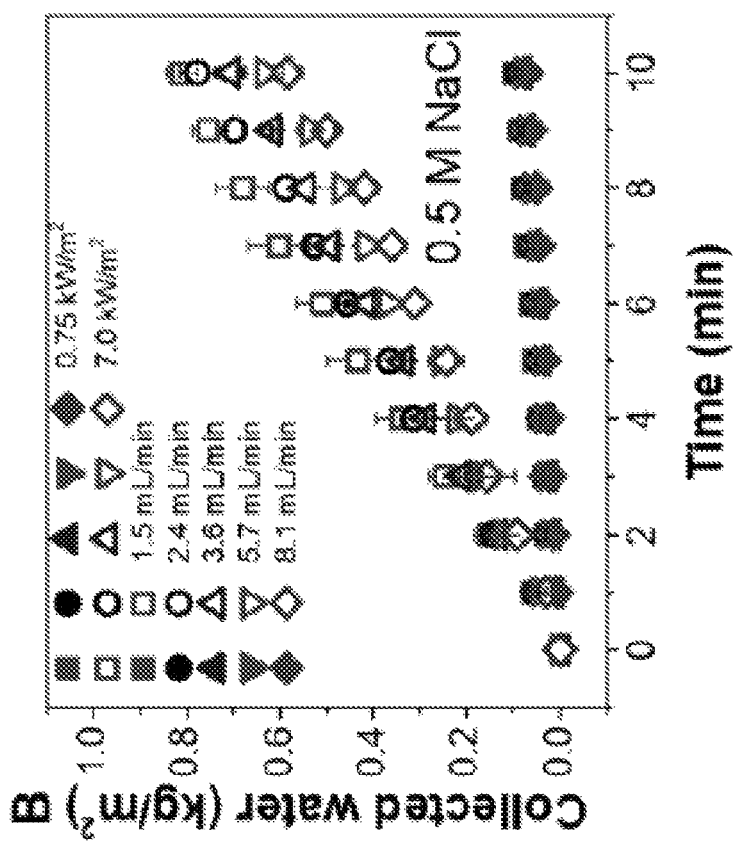
FIG. 27 is an exemplary embodiment of collected water (kg/m$^2$) for DCMD using 0.5 M NaCl with various feed flow rates (1.5-8.1 mL/min) in accordance with the present disclosure.
Figure 26:
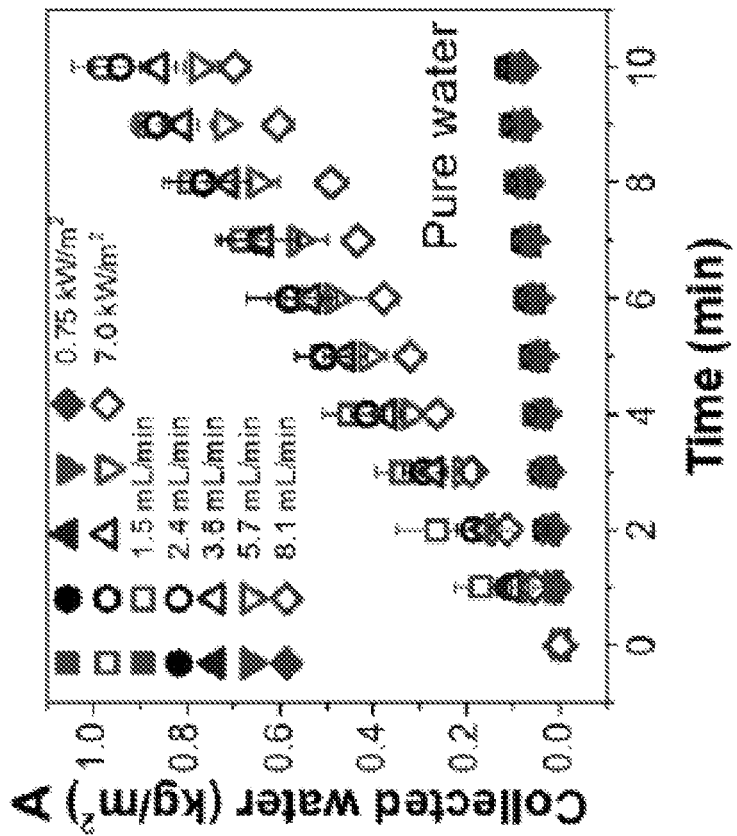
FIG. 26 is an exemplary embodiment of collected water (kg/m$^2$) for DCMD using pure water with various feed flow rates (1.5-8.1 mL/min) in accordance with the present disclosure.

The feed flow rate is crucial for MD efficiency because it affects the heat transfer in the feed channel and the temperature polarization effects on the membrane surface. Therefore, to evaluate the influence of feed flow rate on the solar-driven MD performance, the permeate water flux was also measured with varied feed flow rates (1.5-8.1 mL min$^{-1}$) for the FTCS-PDA-PVDF membranes (FIGS. 25-28) with simulated solar irradiation. The tests were conducted in triplicate, using a new membrane each time. With 0.75 kW m$^{-2}$ irradiation, the fluxes with pure water and saline water decreased from 0.66 and 0.57 kg m$^{-2}$ h$^{-1}$ to 0.49 and 0.43 kg m$^{-2}$ h$^{-1}$, respectively, when the feed flow rate increased from 1.5 to 8.1 mL min$^{-1}$. With 7.0 kW m$^{-2}$ irradiation, the fluxes with pure water and saline water decreased from 5.89 and 4.87 kg m$^{-2}$ h$^{-1}$ to 4.18 and 3.51 kg m$^{-2}$ h$^{-1}$, respectively (FIGS. 26 and 27).

Figure 28:
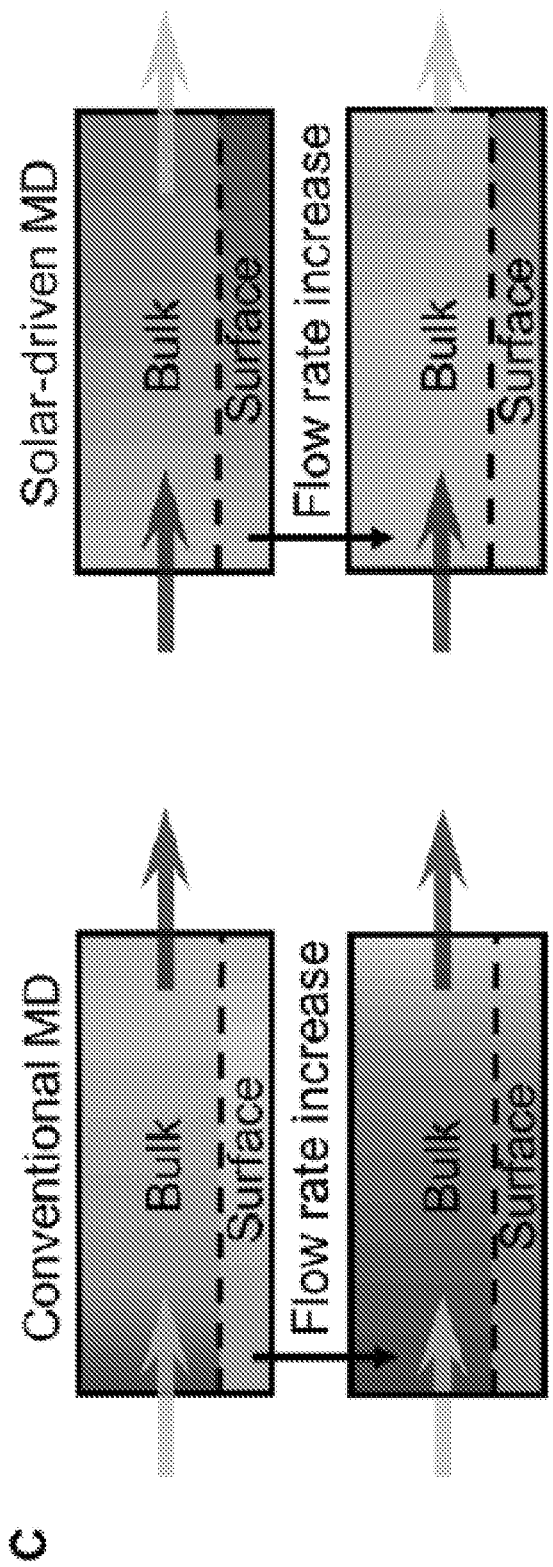
FIG. 28 is an exemplary embodiment of a schematic illustration depicting the temperature change in the feed side of a conventional MD system and solar-driven MD system with different feed flow rates in accordance with the present disclosure, depicting low and high temperatures.

As shown in the schematic diagram comparing conventional MD and solar driven MD in FIG. 28, for conventional MD systems, the permeate water flux increases with the increasing feed water flow rate, owing to better mixing in the flow channel and decreased temperature polarization effects. In contrast, in the solar-driven MD system, the permeate water flux decreased with the increasing feed water flow rate. With a higher feed flow rate, the heat loss from the heated membrane top surface to the bulk feed water was faster, leading to a smaller temperature gradient across the membrane. Similar trends have been observed using carbon black as the photothermal material. However, with feed low rates of 1.5-8.1 mL min$^{-1}$ and irradiation of 0.75 kW m$^{-2}$, the permeate flux with saline feed water (0.5 M NaCl) of the disclosed membrane (0.43-0.57 kg m$^{-2}$ h$^{-1}$) was about twice as high as that reported for the carbon black membrane (0.21-0.27 kg m$^{-2}$ h$^{-1}$) under similar conditions.

Figure 29:
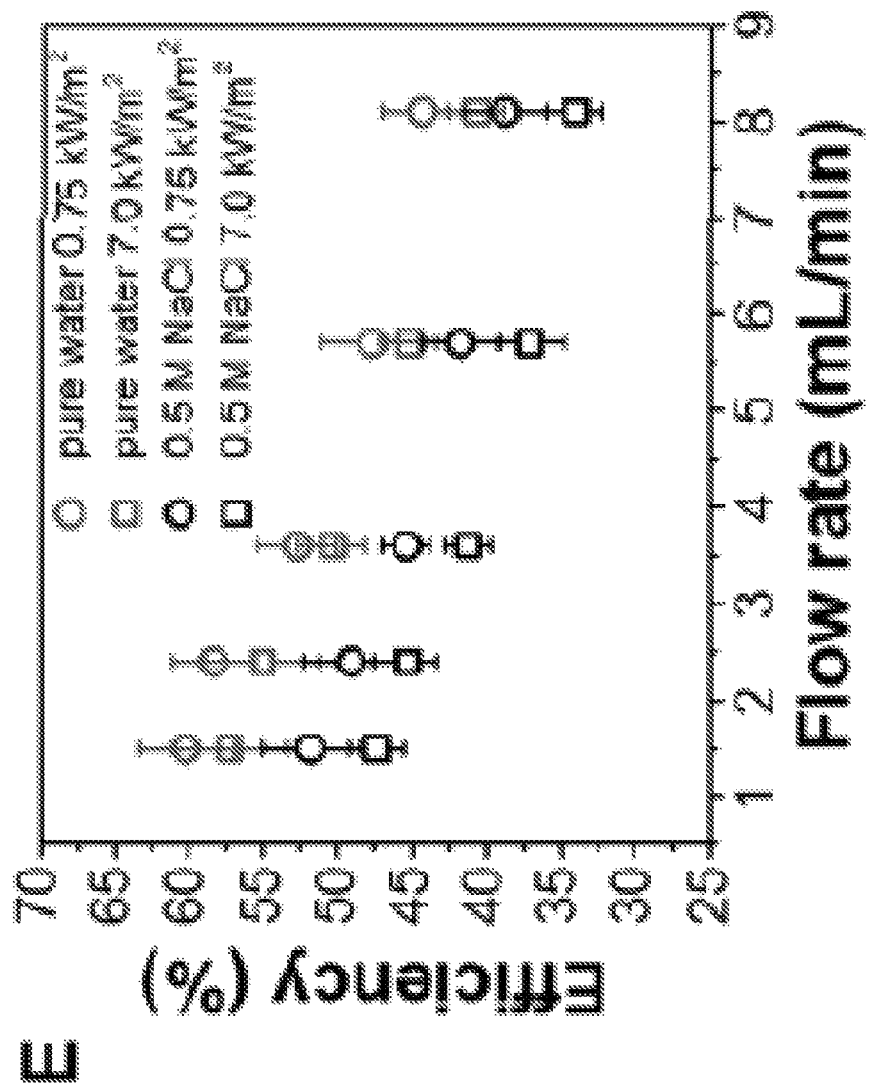
FIG. 29 is an exemplary embodiment of efficiency of a solar driven DCMD system using a FTCS-PDA-PVDF membrane with varying feed flow rates, using both pure water and 0.5 M NaCl saline water under different solar irradiation in accordance with the present disclosure. Triplicate membrane samples were tested in all cases.

The solar conversion efficiency ($\eta$), which describes the overall membrane thermal efficiency, was defined as the ratio of the energy needed to generate permeate flux to the total energy input by solar irradiation (I, kJ m$^{-2}$ h$^{-1}$) (same as the gained output ratio, as described herein elsewhere). The energy needed for generating permeate flux was calculated by multiplying the permeate flux ($\dot{m}$, kg m$^{-2}$ h$^{-1}$) with the evaporation enthalpy change (H$_{vap}$, 2454 kJ kg$^{-1}$) of water. As shown in FIG. 29, with a pure water flow rate of 3.6 mL min$^{-1}$, the solar conversion efficiency of the FTCS-PDA-PVDF membrane was calculated to be 53% under 0.75 kW m$^{-2}$ irradiation, much higher than the 10% of FTCS-PVDF under identical irradiation. When the feed flow rates were adjusted from 1.5 to 8.1 mL min$^{-1}$, the solar efficiencies decreased from 60% to 44%. At a flow rate of 3.6 mL min$^{-1}$ with saline water, the solar conversion efficiencies of the FTCS-PDA-PVDF membranes were 45% and 41% under 0.75 and 7.0 kW m$^2$ irradiation, respectively. For both pure water and saline water, the solar efficiencies decreased when using larger feed flow rates.

Conventional light-driven MD systems have used silver nanoparticles, nitrocellulose, and carbon black as photothermal materials with excellent flux penetration and solar conversion efficiencies. However, the disclosed FTCS-PDA-PVDF membrane exhibited an even higher solar conversion efficiency (45% for saline water under 0.75 kW m$^{-2}$ irradiation) than membranes using silver nanoparticles (36.9%), nitrocellulose (31.8%) and carbon black (21.5%) (FIG. 30). This outstanding solar conversion efficiency of the FTCS-PDA-PVDF membrane compared with those of conventional membranes is mainly attributed to three factors: (i) the superior light absorption properties of PDA—polydopamine has a wider light absorption range than Ag nanoparticles, which absorb light mainly in the UV range; (ii) the high surface temperature on the top of the membrane owing to the excellent photothermal conversion properties of PDA, even with a thick water layer on top of the membrane surface—PDA is known to convert 99% of the absorbed photon energy into heat within 50 nps; and, (iii) the high density and uniformity of the PDA coating on the PVDF membrane surface as shown in the SEM images. The uniform self-polymerization of dopamine and the excellent adhesion of PDA to a multitude of surfaces foster 'proximal' photothermal conversion activity. Such proximal photothermal conversion leads to an increased transmembrane temperature and a larger vapor pressure difference across the membrane. In contrast, for a carbon black layer on top of the conventional PVDF membrane, the light-absorbing layer is far from the PVDF membrane surface, decreasing the transmembrane temperature and the driving force for vapor transport.

In terms of solar conversion efficiency, while the disclosed membrane achieved the highest efficiency among existing photothermal MD membranes, it is relatively lower than those of photothermal steam generation membranes. The main reasons behind the lower efficiency in photothermal MD are the top water layer interference and conductive heat loss. With water thicknesses ranging from 1.5 mm to 8 mm in existing photothermal MD systems (FIG. 30), this top water layer can reduce the number of photons absorbed by the photothermal membrane and thus lead to a lower membrane surface temperature. In addition, the floating feed water system further increases the conductive heat loss, while for photothermal steam generation, the untreated water under the evaporators is often stagnant. Although the efficiencies of current photothermal steam generation are higher, the steam collection still remains a challenge for its large scale application. Furthermore, photothermal MD is more advantageous when it is used for flowback water treatment from unconventional oil and gas recovery systems, which already contain high temperature water (e.g., 60-70° C.). The high temperature feed water, along with the photothermal temperature rise, makes the overall MD process more efficient.

Figure 31:
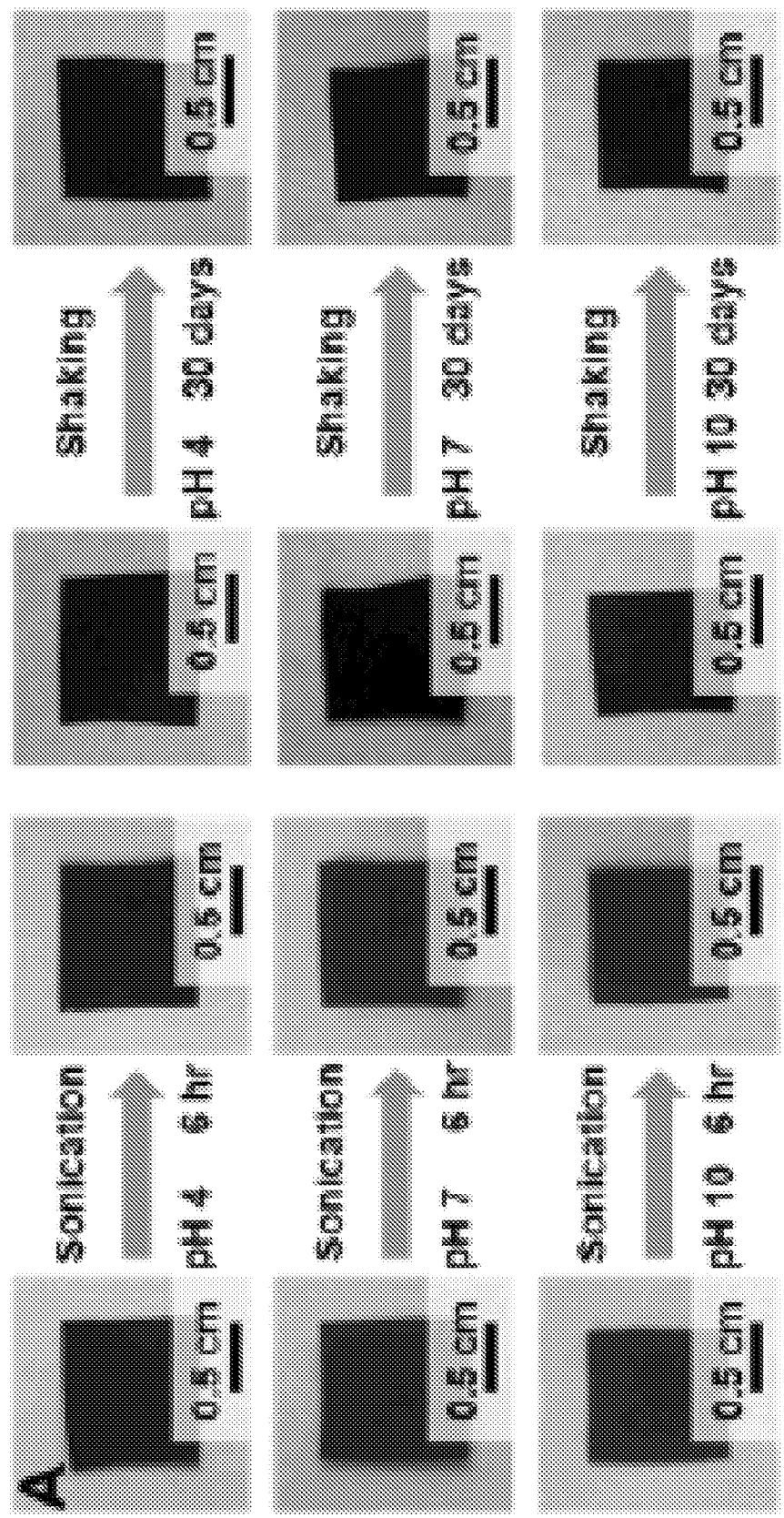
FIG. 31 is an exemplary embodiment of photographs showing the chemical and mechanical stability of a FTCS-PDA-PVDF membrane with ultra-sonication and shaking for an extended duration in accordance with the present disclosure. Sample membranes were tested in triplicate.
Figure 33:
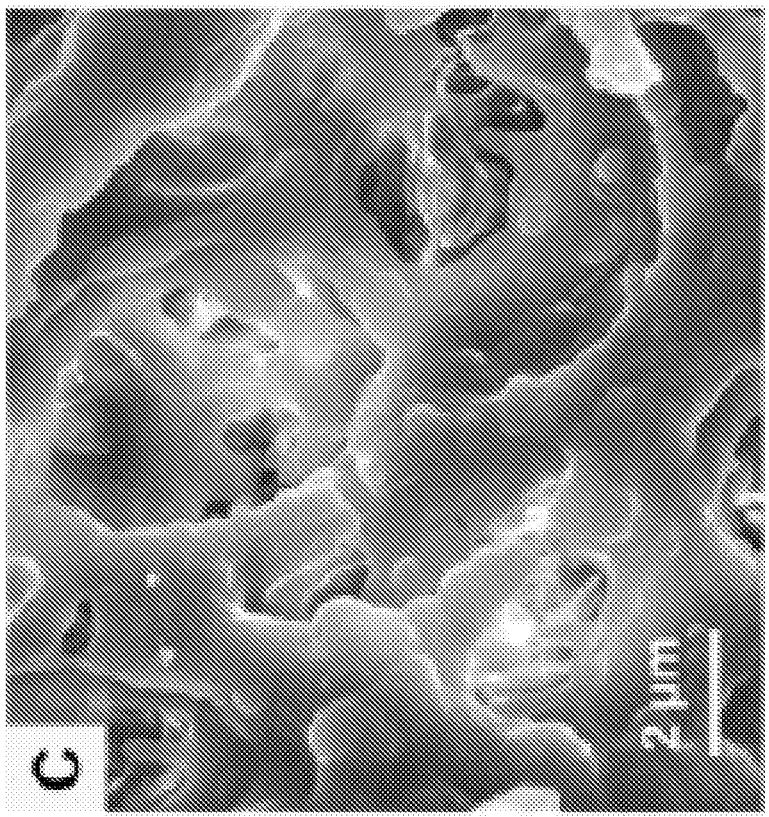
FIG. 33 is an exemplary embodiment of an SEM image of a FTCS-PDA-PVDF membrane surface after 10 cycles using 0.5 M NaCl in accordance with the present disclosure. Sample membranes were tested in triplicate.
Figure 32:
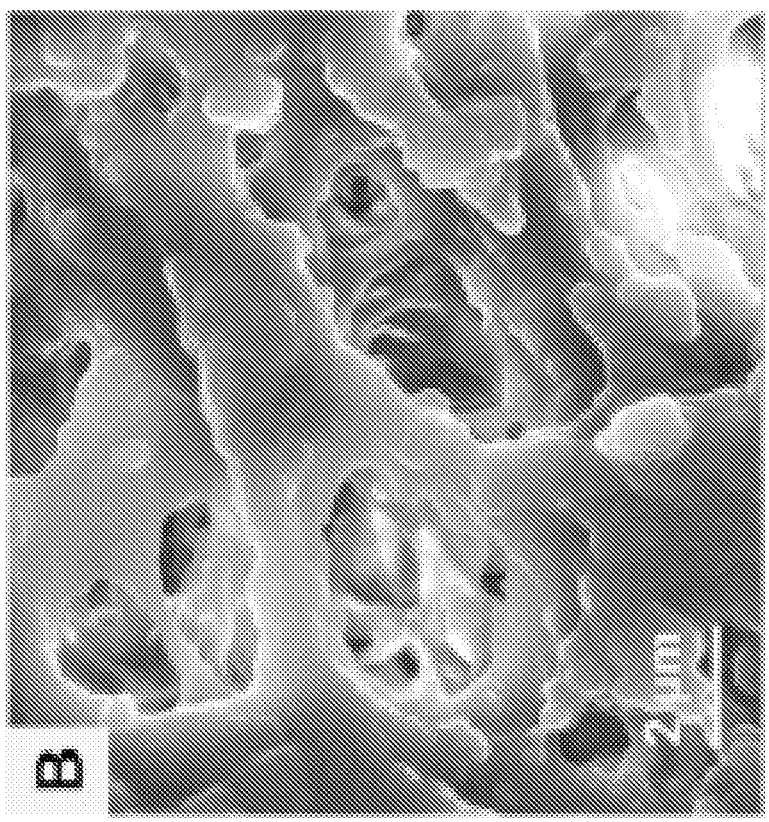
FIG. 32 is an exemplary embodiment of an SEM image of a FTCS-PDA-PVDF membrane surface after 10 cycles using pure water in accordance with the present disclosure. Sample membranes were tested in triplicate.
Figure 34:
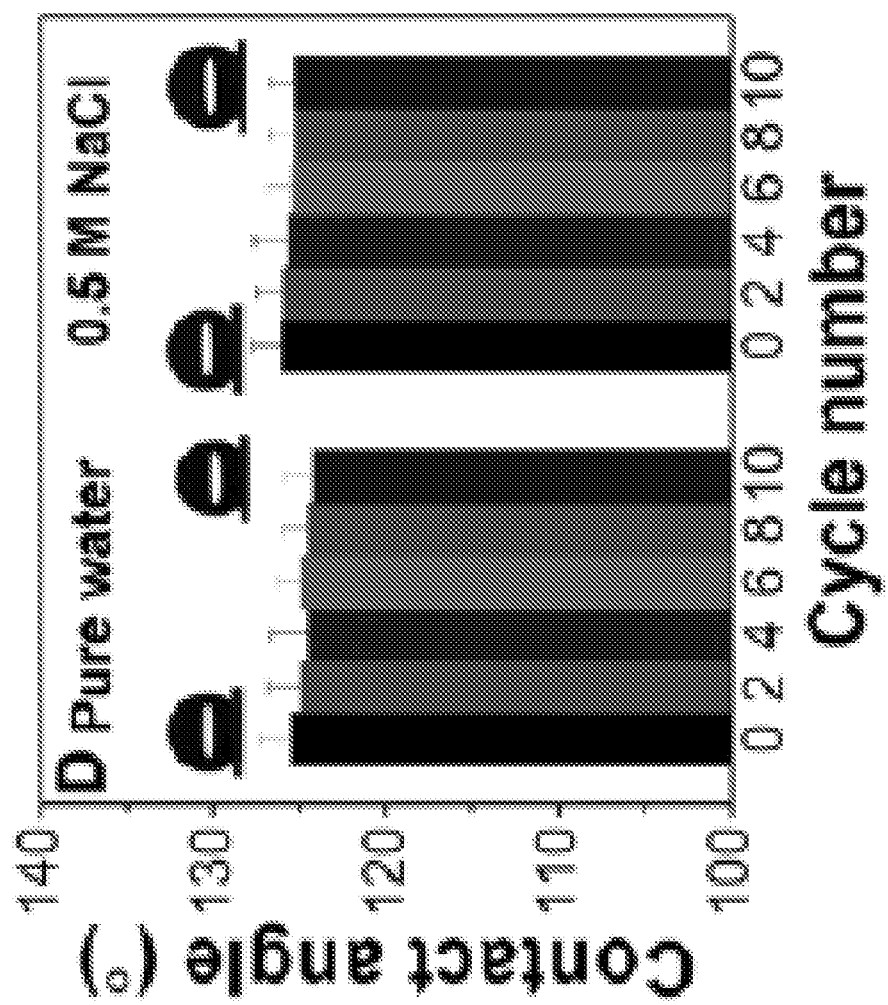
FIG. 34 is an exemplary embodiment of contact angles of a FTCS-PDA-PVDF membrane over 10 cycles of MD tests using pure water and 0.5 M NaCl in accordance with the present disclosure. Sample membranes were tested in triplicate.

The chemical and mechanical stability of the FTCS-PDA-PVDF membrane was investigated further by subjecting it to both ultrasonic agitation for 6 hours and vigorous shaking for 30 days at three pH values (pH 4, 7, and 10) (FIG. 31). Even after these extreme stress tests, the FTCS-PDA-PVDF membrane did not exhibit discernible signs of disintegration or loss of the PDA coating from the surface. The morphology of the FTCS-PDA-PVDF membrane remained unaltered after 10 cycling tests with pure water and saline water, as shown in the SEM images of the FTCS-PDA-PVDF membrane surface (FIGS. 32 and 33). Then, to evaluate the potential changes in membrane wetting after several MD cycles, the contact angles of pure water and saline water drops on the membrane were measured (FIG. 34). For an unused FTCS-PDA-PVDF membrane, the contact angles were 125.5°±1.9° and 126.1°±1.6° for pure water and saline water, respectively. After 10 cycles of MD tests (1 hour 10 times), the contact angles for pure water and saline water were 124.3°±1.5° and 125.4°±1.3°, indicating less than 1% variation in the contact angle. Pore wetting problems have constrained the use of many MD membranes for long term or large scale applications. However, the excellent and stable hydrophobicity of the FTCS-PDA-PVDF membrane, owing to the covalent and dense FTCS fluoro-silane, provides long-lasting wetting resistance.

Figure 35:
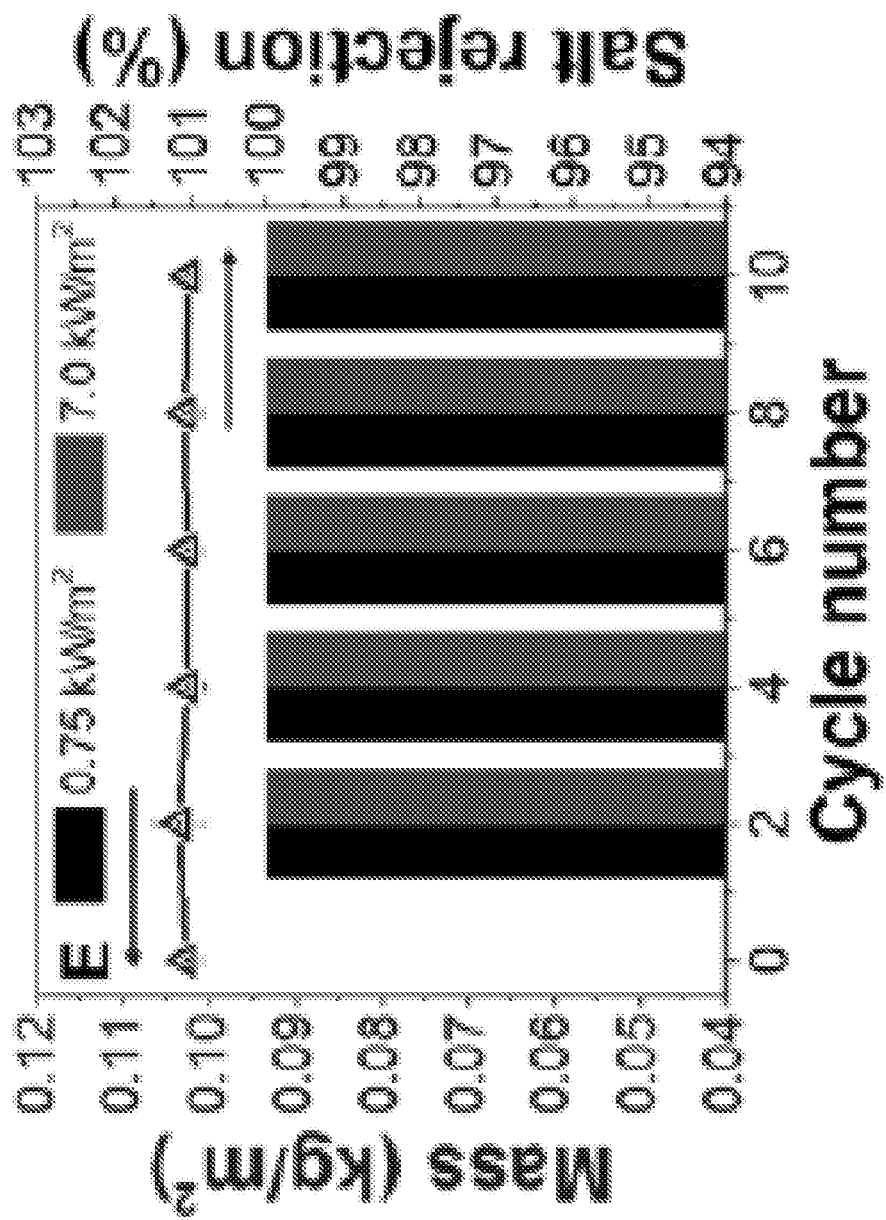
FIG. 35 is an exemplary embodiment of (Left y-axis) mass change of a FTCS-PDA-PVDF membrane over 10 cycles of MD tests using 0.5 M NaCl, with 7.0 kW/m2 irradiation; (right y-axis) salt rejection of a FTCS-PDA-PVDF membrane over 10 cycles of MD tests using 0.5 M NaCl, with both 0.75 and 7.0 kW/m$^2$ irradiations in accordance with the present disclosure. Sample membranes were tested in triplicate.
Figure 36:
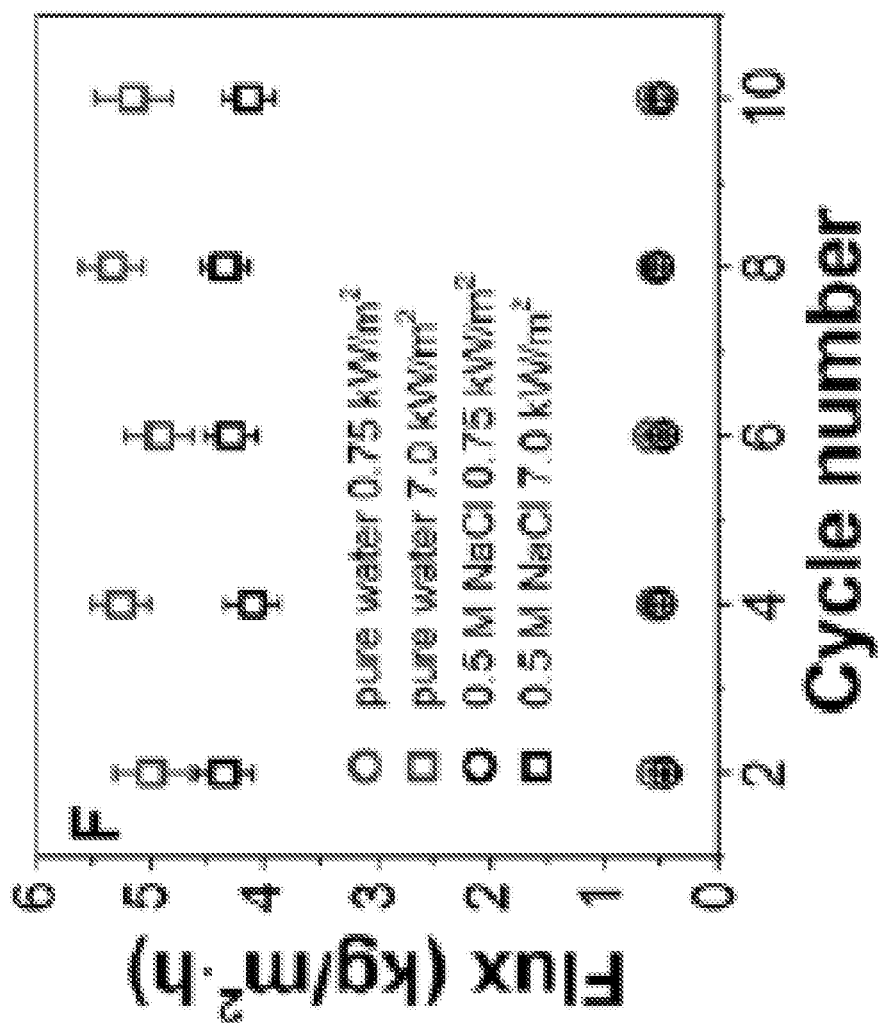
FIG. 36 is an exemplary embodiment of flux performance of a FTCS-PDA-PVDF membrane over 10 cycles of MD tests using pure water and 0.5 M NaCl, with both 0.75 and 7.0 kW/m$^2$ irradiations in accordance with the present disclosure. Sample membranes were tested in triplicate.

The variation of the membrane mass was also smaller than 1% over 10 cycles of MD tests using saline water with focused irradiation (7.0 kW m$^{-2}$) (FIG. 35). The salt rejection was larger than 99.9% over 10 cycles of MD tests using saline water under both unfocused (0.75 kW m$^{-2}$) and focused (7.0 kW m$^{-2}$) irradiation (FIG. 35). This high salt rejection of the FTCS-PDA-PVDF membrane is attributed to the operation conditions of the DCMD (low hydrostatic pressure) and to the excellent hydrophobicity and wetting resistance of the membrane. Furthermore, the flux performance of the FTCS-PDA-PVDF membrane remained stable over 10 cycles of MD tests (less than 5% variation, FIG. 36). The remarkable chemical and mechanical stability of the FTCS-PDA-PVDF membrane, owing to the strong adhesion between PDA and the PVDF surface, can lessen environmental concerns or the need for further treatment caused by the possible detachment of photothermal materials from the membrane surface, and increase the longevity of the membrane for long term solar MD applications.

Conclusions

A simple, stable, and highly effective photothermal membrane is disclosed herein for solar-driven MD. Owing to the remarkable light absorption and outstanding photothermal conversion properties of the PDA coating, the FTCS-PDA-PVDF membrane exhibited an excellent solar membrane distillation performance (efficiency of 45% under 0.75 kW m$^{-2}$ irradiation). The FTCS-PDA-PVDF membrane exhibited a 4.23 kg m$^{-2}$ h$^{-1}$ permeate flux under 7.0 kW m$^{-2}$ irradiation, a 19-fold enhancement over the FTCS-PVDF membrane.

In addition, the proximal polymerization process that leads to strong adhesion between PDA and the PVDF surface resulted in the excellent chemical and mechanical robustness and stability of the FTCS-PDA-PVDF membrane, which allows its utilization in long term solar MD applications. In comparison with conventional photothermal membranes which utilized phase inversion or electrospinning processes, PDA polymerization is a much easier way to achieve proximal photothermal conversion activity. The PDA coating method also makes the membrane attractive for future commercial applications. From engineering perspectives, using built-up systems with multiple industrial-scale tanks, the final coated-membrane area is significantly enhanced compared to other existing membrane modification methods to achieve a similar extent of photothermal performance. Coupled with renewable and sustainable solar irradiation, the highly efficient photothermal membrane introduced here provides the opportunity to alleviate the global water crisis.

Exemplary Materials and Methods

The following materials and methods are exemplary in nature, and the present disclosure is not limited the specific materials and methods described in this section.

Synthesis of FTCS-PDA-PVDF membrane. A PDA coating on a commercial hydrophilic polyvinylidene fluoride (PVDF) membrane (0.45 µm pore size, 110 µm thickness, MilliporeSigma) was achieved via self-polymerization of PDA. Hydrophilic PVDF was chosen for easier PDA coating. Dopamine (DA, 2 mg/mL) was dissolved in 10 mM Tris-HCl (pH 8.5), and PVDF membranes were dipped in the solution. The solution was shaken (VWR Orbital Shaker, Model 3500) for 24 hours before the membrane was taken out and rinsed using deionized (DI) water (18.2 MΩ-cm, Barnstead Ultrapure water systems). The self-polymerization process was repeated for 7 days until the entire surface of the PVDF was uniformly coated by PDA (FIG. 2). Then, the membrane was rinsed with DI water and dried under N$_2$ gas. Next, the PDA-PVDF membrane was exposed to (tridecafluoro-1,1,2,2-tetrahydrooctyl)-trichlorosilane (FTCS) vapor at 70° C. for 3 hours, resulting in a dense coverage of PDA-PVDF by hydrophobic FTCS fluoro-silane.

Characterization of FTCS-PDA-PVDF membrane. Scanning electron microscopy (SEM; OVA NanoSEM 230, FEI) was used to image the morphology and microstructure of the FTCS-PDA-PVDF membrane surface and its cross-section at an acceleration voltage of 10 kV. The chemical composition of PDA and FTCS on the PVDF surface were identified using an attenuated total reflection Fourier transform infrared (ATR-FTIR; Thermo Scientific Nicolet Nexus 470 spectrometer equipped with a diamond crystal) spectroscopy and a Raman spectroscopy (inVia confocal Raman spectroscope, Renishaw, equipped with 514 nm wavelength diode laser). The reference peaks for FTIR are shown in FIG. 10. X-ray photoelectron spectroscopy (XPS, PHI 5000 VersaProbe II, Ulvac-PHI with monochromatic Al Kα radiation (1486.6 eV)) was utilized to identify the N 1s, C 1s, and Si 2p peaks for the PDA-FTCS-PDA membrane. The surface roughness (root-mean-square, RMS) was measured using tapping mode AFM (Veeco Inc., Nanoscope V multimode SPM) and analyzed using the Nanoscope 7.20 software (Veeco Inc.). For each membrane, triplicate locations on the sample surface were measured to determine the roughness.

The gravimetric method was used to quantify the porosity (F) of the PDA-PVDF membrane. Three 2 cm×2 cm pieces were cut from a PDA-PVDF membrane sheet, weighed dry, and then submerged in DI water for 1 week before being taken out and weighed again wet. The porosity was calculated using the equation below to get the average values for triplicate samples:

$$\varepsilon = \frac{w_2 - w_1}{\rho_w V}, \quad (1)$$

where ε is the porosity (%), $w_2$ (g) is the weight of the wet membrane, $w_1$ (g) is the weight of the dry membrane, $\rho_w$ (g/cm$^3$) is the liquid density (DI water), and V (cm$^3$) is the volume of the membrane. ImageJ 1.80 software (National Institutes of Health, Bethesda, Md., USA) was used to determine the average pore diameter of pristine PVDF and FTCS-PDA-PVDF membranes by taking measurements of 100 pores from the SEM top surface images. A mean and a standard deviation were calculated for each size distribution. Considering that both pristine PVDF and PDA-PVDF are hydrophilic (contact angle≈0°, FIG. 1), it is difficult to evaluate the effect of the altered pore size and porosity by PDA coating on the membrane wetting property or MD performance. The actual amount of FTCS on the FTCS-PVDF (contact angle≈120°) and FTCS PDA-PVDF (contact angle≈125°) membranes could be different, which also makes it difficult to attribute the slight wetting resistance increase of FTCS-PDA-PVDF only to the PDA coating.

Measuring the optical properties and surface temperature of FTCS-PDA-PVDF membranes. The transmittance and reflectance of FTCS-PVDF and FTCS-PDA-PVDF membranes were measured using a micro-spectrophotometer (QDI 302, CRAIC Technologies) coupled to a Leica microscope (DM 4000M, Leica Microsystems). The surface temperatures of the FTCS-PVDF and FTCS-PDA-PVDF membranes were measured by an infrared camera (IR camera, Ti 100, FLUKE) after 600 secs light illumination using a solar simulator (Newport 66921 Arc Lamp) under both unfocused and focused irradiations (FIG. 20). Triplicate 1 cm×1 cm pieces were cut from the membranes of interest and measured. The surface temperature of the membrane with water on top (water thickness=8 mm) was monitored using a benchtop controller thermocouple probe (OMEGA CSI32K-C24, US) with a response time of 5 s and resolution of ±0.5° C.

Direct contact membrane distillation experiments. DCMD experiments were carried out using a specially designed membrane distillation module. The setup of the system is shown in FIG. 22. The membrane distillation module consists of a 2-mm-thick quartz window with a diameter of 5 cm on the feed side to allow light illumination. A 1-mm-thick aluminum platform was placed in between the feed side and distillate side to support the membrane. The cross-flow velocities in the feed and distillate channels were 3.6 mL/min and 16.2 mL/min, respectively. Both DI water and 0.5 M NaCl aqueous solution (ACS grade, BDH, PA) were used as feed water, stored in a 500-mL Erlenmeyer flask, and DI water was used for the distillate stream at the bottom of the membrane. The 0.5 M salinity was chosen to mimic the average salinity of seawater. The feed and distillate were continuously circulated through the membrane module using two peristaltic pumps respectively (Welco WPX1-F1 and Stenner 85MHP5). The flow rate of the feed water was changed by monitoring the DC supply (Extech 382203) controlling the feed pump. The distillate reservoir was kept on a weighing balance (Sartorius ELT402) to measure the collected permeate at 1 min intervals. The distillate reservoir was capped during MD tests to reduce the effects of evaporation. During solar MD tests, the light from the solar simulator (Newport 66921 Arc Lamp) was oriented to the membrane surface using a mirror. The light intensities at the membrane surface were measured to be 0.75 (unfocused) and 7.0 kW/m² (focused using a magnifying lens) by a spectroradiometer (SpectriLight ILT 950). The diameters of the active irradiation areas were 5 cm and 1.5 cm for 0.75 kW/m² and 7.0 kW/m² intensities, respectively. The solar efficiency was calculated by the following equation:

$$\eta = \frac{\dot{m} H_{vap}}{I}, \quad (2)$$

where $\eta$ is solar efficiency, $\dot{m}$ is the permeate flux (kg/m²·h), $H_{vap}$ is the enthalpy change (2,454 kJ/kg) from liquid to vapor, and I is the power density of the incident light (kJ/m²·h).

Stability tests of the FTCS-PDA-PVDF membrane. The chemical and mechanical stability of the FTCS-PDA-PVDF membrane was tested at three pH values (pH 4, 7, and 10), using both ultrasonic agitation for 6 hours (Bransonic 3510R, 335W) and vigorous shaking for 30 days (VWR Orbital Shaker, Model 3500) (FIG. 31). Triplicate 1 cm×1 cm pieces were cut from the membrane and measured. The contact angles of the membrane after testing in pure water and saline water, were measured using a contact angle analyzer (Phoenix 300, Surface Electro Optics Co. Ltd) over 10 cycles of MD tests (1 cycle=1 hour) (FIG. 32). After every 2 cycles, the membrane was washed using DI water, dried using $N_2$ gas, and weighed to reveal the mass variation during MD tests. A chloride probe (VWR 89231-632) was used to measure the salt concentration in both the feed and distillate during 0.5 M NaCl MD tests. SEM images were further measured for the FTCS-PDA-PVDF membrane after MD tests to evaluate the morphology and microstructure alteration.

Example 2: Thermally Engineered Polydopamine-Bacterial Nanocellulose Bilayer for Photothermal Membrane Distillation Potable water production for rural areas and developing countries remains problematic due to the lack of large power plants to provide sufficient electricity. Using renewable solar energy, photothermal membrane distillation (PMD) has been introduced recently as a simple, sustainable, low-cost, and less energy intensive water treatment method for decentralized areas. However, the low clean water generation rate and solar conversion efficiency remain as critical challenges that needs to be urgently addressed to further realize PMD's practical application. Herein, the high PMD performance of a bilayered polydopamine (PDA)-bacterial nanocellulose (BNC) aerogel was demonstrated, which achieved a permeate flux of 1.0 kg m⁻² h⁻¹ under 1 sun irradiation, and the highest solar efficiency (68%) among existing PMD membranes for treating unheated saline water. The superb optical and photothermal conversion properties of PDA particles loaded inside BNC matrix offers high transmembrane temperature gradient and driving force for vapor transport. The highly porous, low thermal conductive, and heat insulating BNC microstructure play a critical role in facilitating high vapor permeability and preventing the heat conductive loss from the feed side to the distillate side. In addition, the self-disinfection activity of the bilayered aerogel under solar light effectively resists biofilm growth, lessening the concern of biofouling during long term PMD operation. With a facile fabrication method using biodegradable materials (both PDA and BNC), the bilayered aerogel presented here holds great promise for stable, scalable, energy efficient, and sustainable water purifications, especially for decentralized systems in rural areas or developing countries.

Broader Context

In remote areas and developing countries, water purification still largely rely on chlorination or filtration processes, which cannot fully satisfy the increasing water demands. In recent years, the highly abundant, accessible, and sustainable solar energy has been used as an outstanding energy source for next-generation water purification techniques, including direct solar disinfection, solar steam generation, and photothermal membrane distillation. Photothermal membrane distillation (PMD) is a novel technique based on conventional membrane distillation, while adding photothermal materials on the membrane to offer higher transmembrane temperature gradient and vapor transport driving force. Compared with solar disinfection, PMD can ensure 100% cleaning of bacteria from the untreated water. Compared with solar steam generation, PMD collects clean water in a much more efficient way by using distillate circulation, vacuum, or air gap systems. However, for most of PMD membranes reported, the permeate flux and solar efficiency still remain low. Herein, it is demonstrated that by using a bilayered aerogel combining photothermal PDA particles with highly porous and low thermal conductive BNC microstructures, the permeate flux and solar efficiency have been significantly increased (1.0 kg m⁻² h⁻¹ and efficiency of 68%) when treating cold saline water (20° C.). In addition, the excellent robustness, high salt rejection, and self-disinfection property of the bilayered aerogel validates its use for real PMD applications in remote areas and developing countries.

Overview

Water scarcity problem remains as one of the biggest challenges of human society in the 21st century due to continuous population growth and economic development. Lack of water resources or efficient water treatment facilities has limited people's access to clean drinking water. In developed areas, centralized clean water generation systems have been built in association with technologies most commonly as sedimentation, filtration and disinfection. In places where seawater or brackish water are available, desalination approaches, including reverse osmosis (RO) and thermal distillation, have been employed. Although centralized systems can generate high amount of clean water, they are considered to be energy intensive and expensive in both capital and management. For many areas where large power plants are not available, such as rural communities and developing countries, decentralized water treatment is needed to save energy input and lower the water price. To meet this urgent need, the use of renewable energy sources for water treatment have been considered in recent years.

Direct solar thermal energy represents one of the most competitive but often overlooked renewable energy sources for water purification. To efficiently harvest solar thermal energy, photothermal membranes have been developed and used for anti-biofouling RO/UF membranes, solar-driven steam generation (SSG), and photothermal membrane distillation (PMD). Membrane distillation (MD) is a promising thermally-driven membrane-based water purification technique that can be combined with renewable solar thermal energy source. In MD, two channels, which respectively contain hot saline feed water and the cooler distillate, are separated by a hydrophobic membrane. The temperature difference ($\Delta T$) between the two sides of the membrane induces a vapor pressure difference ($\Delta P$). Therefore, water vaporizes on the hot feed side, passes through the porous membrane, and condenses on the cold distillate side. In conventional MD, which uses hot feed water, the membrane surface temperature gradient is always smaller than the temperature difference between the bulk feed and distillate. Such a phenomenon is known as temperature polarization (TP), and it impairs the overall MD performance.

Recently, photothermal materials using sunlight have been incorporated into MD membranes to increase the driving force of water evaporation. This process is called photothermal membrane distillation (PMD). A photothermal membrane harvests solar energy at the water-membrane interface, generates localized heating on the membrane's top surface, and induces a transmembrane temperature gradient. The locally high surface temperature can alleviate temperature polarization effects. Moreover, feed water at room temperature can be used in PMD, minimizing the energy needed to heat the bulk feed water. Unlike traditional desalination processes, such as RO, the thermally-driven desalination process of PMD, which is not pressure-driven, helps to minimize fouling on membrane surfaces. The reduced concern over membrane fouling also makes PMD suitable for treating hypersaline brines or highly polluted wastewater, including flowback water from unconventional oil and gas recovery systems.

One of the biggest challenges for current PMD membranes is the low solar conversion efficiency ($\eta$), which describes the overall membrane thermal efficiency. The solar conversion efficiency is defined as the ratio of the energy input for generating water flux over the total energy input by solar irradiation (I, kJ m$^{-2}$ h$^{-1}$). The energy input for generating water flux can be calculated by multiplying the permeate flux ($\dot{m}$, kg m$^{-2}$ h$^{-1}$) by the evaporation enthalpy change (H$_{vap}$, 2,454 kJ/kg) of water (equation 2):

$$\eta = \frac{\dot{m} H vap}{I}, \quad (2)$$

The solar conversion efficiencies of current PMD membranes are in the range of 21-45% when treating room temperature saline water, lower than the reported efficiencies of solar evaporators for SSG (~70-80%). Two main mechanisms that lead to the low thermal efficiency of PMD are (i) the feed water interference, which scatters the light penetrating and takes out heat energy generated on the membrane surface, and (ii) the conductive heat loss to distillate, which lowers the transmembrane temperature gradient and the driving force for vapor transport. The feed water interference can be alleviated via decreasing feed water thickness/flow rate on membrane or by using hot water as feed water, which either diminishes system's water treatment capacity or requires additional energy source to heat up the feed water. In contrast, reducing the heat conductive loss from feed to distillate can be achieved via better heat localization and insulation, without compromising the PMD performance or acquiring external energy.

Herein, a bilayered hybrid aerogel is disclosed, composed of polydopamine (PDA) particles and bacterial nanocellulose (BNC) for efficient photothermal membrane distillation. The superb light absorption and photothermal conversion properties of PDA particles offers high transmembrane temperature difference and vapor transport driving force, while the low thermal conductivity of BNC helps to decrease the conductive heat loss from photothermal membrane surface to the distillate. Polydopamine is a mussel-inspired polymer and has been extensively applied for surface modifications based on its robust adhesive property. Moreover, PDA's well-known robustness even under vigorous mechanical agitation or harsh chemical conditions (low and high pH), as well as its biocompatibility and low toxicity, ensure the longevity and low environmentally concern of PDA applications. Due to its superb light absorption and photothermal conversion properties, PDA is an outstanding photothermal material for phototherapy or solar-driven water purifications. Using a PDA coated PVDF membrane for solar-driven membrane distillation is shown to possess advantages including simple synthesis, stability, and effective clean water generation performance. Improvements of the present disclosure include heat insulation and multifunctionality of the heat generated on membrane surface.

In some embodiments of the present disclosure, instead of using a PVDF membrane, bacterial nanocellulose (BNC) aerogel was employed as a thermal insulating layer to increase the solar conversion efficiency of the PMD membrane. Produced from the self-assembly of cellulose fibrils from bacteria, BNC possesses a 3D interconnected nanofiber network, with high porosity and mechanical strength. In addition, as a type of cellulose, BNC exhibits good biocompatibility, hydrophilicity (enclosing up to 99% water), and nontoxicity. BNC has therefore been widely chosen as a base material to fabricate diverse BNC-based composite materials, which have been applied in environmental and biomedical sciences. To meet the needs of BNC for industrial applications, industry-scaled microbial fermentation process has been implemented, which promises the scalability and low cost of BNC production. The high porosity (>98%), low thermal conductivity, and excellent water vapor permeability facilitate BNC's effective water transport and heat management, which inspire the use of BNC aerogel for water purification processes including solar steam generation, and conventional MD.

High performance of the bilayered PDA/BNC composite membrane was demonstrated in photothermal membrane distillation when treating saline water. The fluoro-silanization process helps to increase the membrane's hydrophobicity for vapor transport. The excellent chemical and mechanical robustness of PDA/BNC membrane ensures its long term stability in real applications. Moreover, due to its excellent photothermal properties, the PDA/BNC membrane exhibited effective self-disinfection activity under light illumination, obviating the concern of bio-fouling. The novel PMD membrane introduced in this disclosure produces a decentralized, less energy intensive, low cost, highly efficient, and environmental-friendly water purification method, which is critically important for developing countries and rural communities.

Results and Discussion

Figure 37:
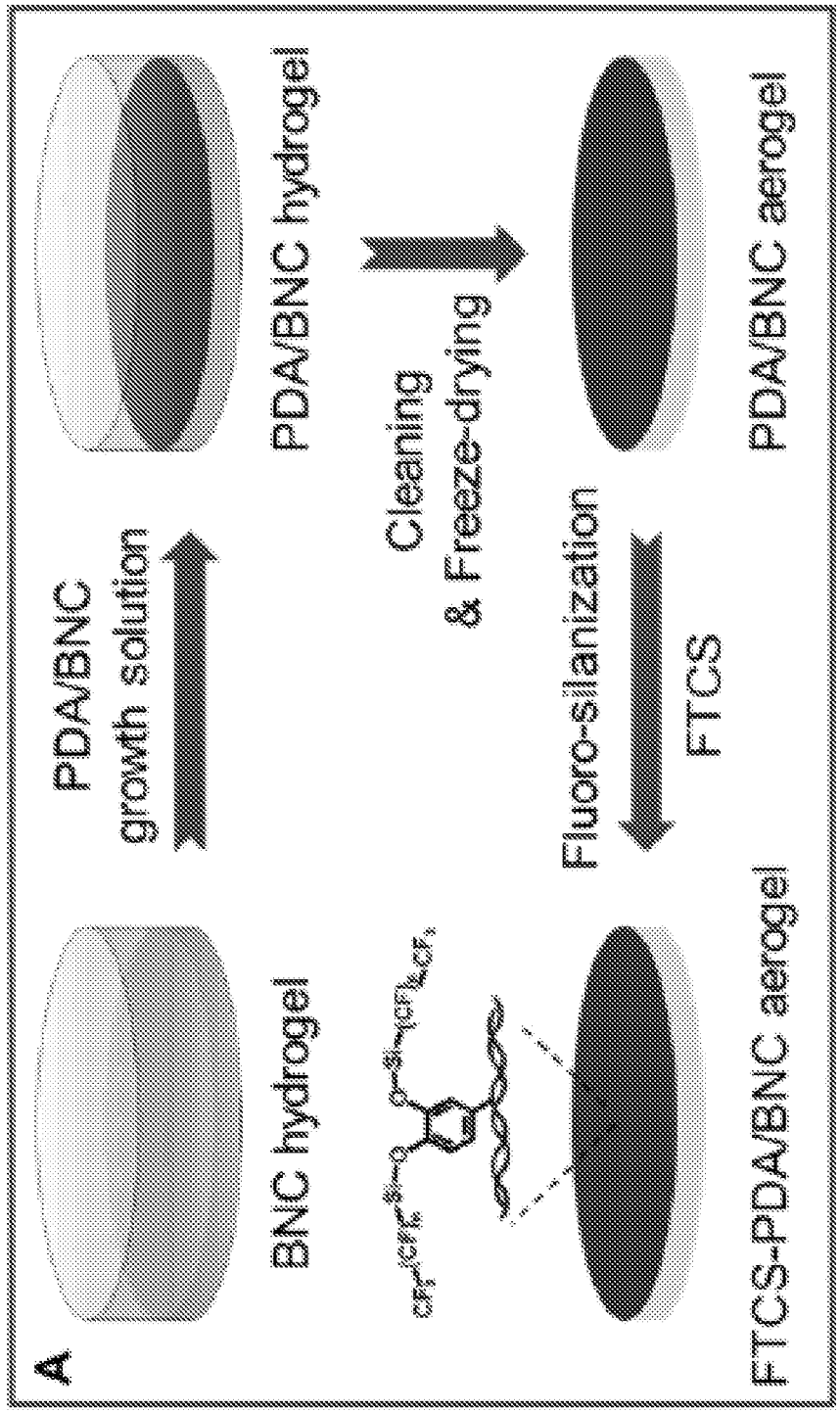
FIG. 37 is an exemplary embodiment of a schematic showing the synthesis processes of a FTCS-PDA/BNC aerogel in accordance with the present disclosure.
Figure 38:
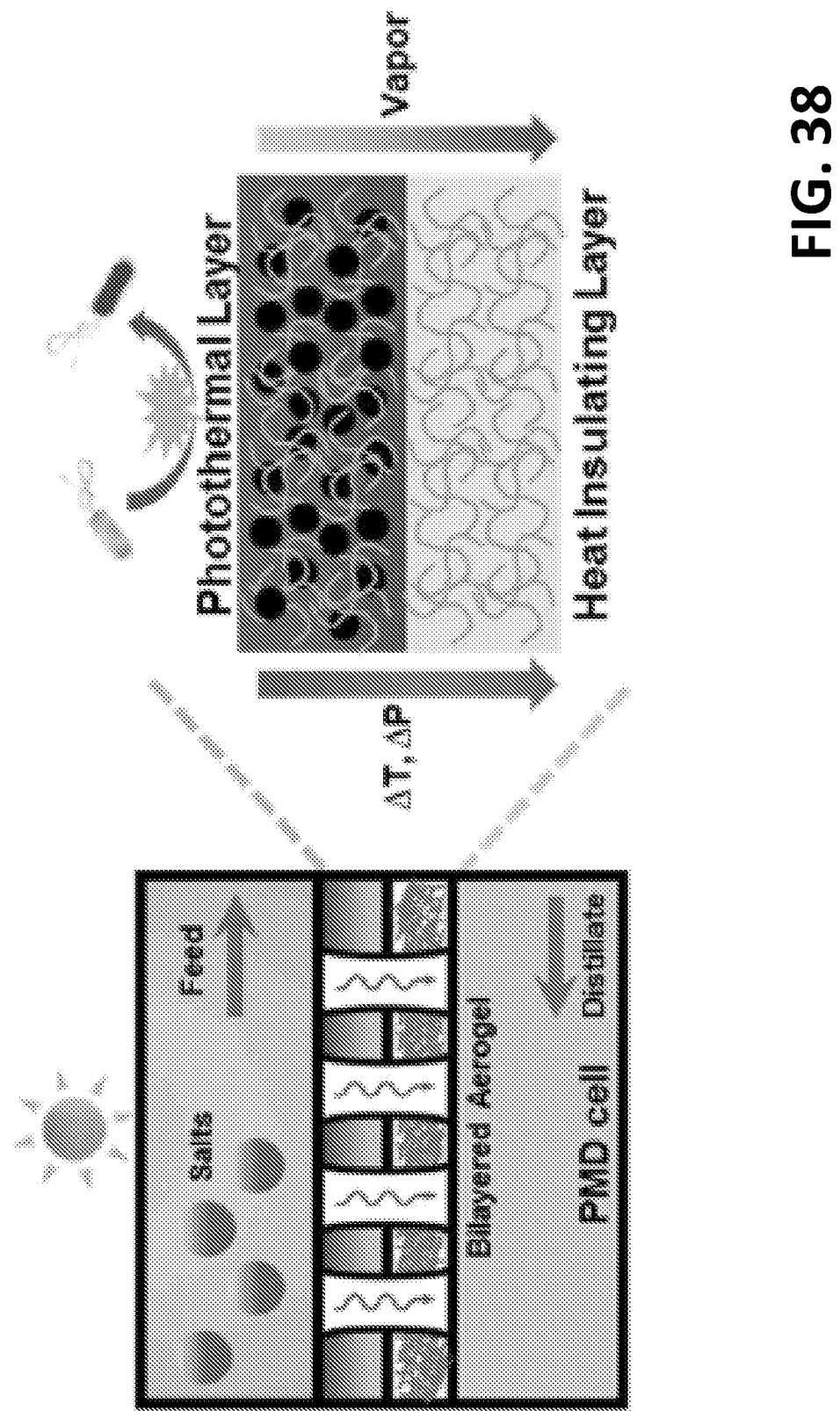
FIG. 38 is an exemplary embodiment of an illustration depicting a photothermal layer and a heat insulating layer of a bilayered aerogel in a PMD cell in accordance with the present disclosure.
Figure 39:
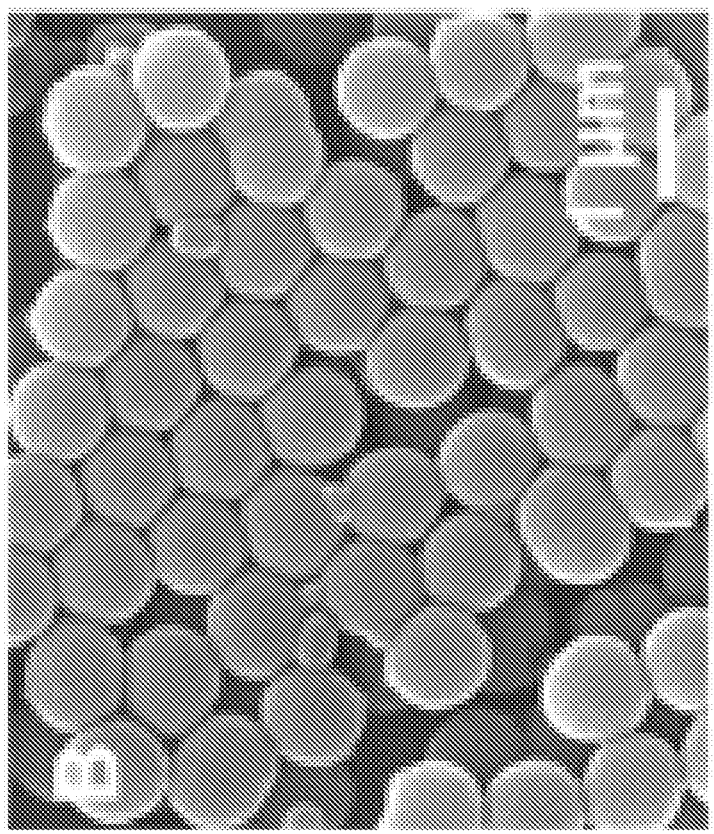
FIG. 39 is an exemplary embodiment of an SEM image of PDA particles with a diameter of ~1 μm in accordance with the present disclosure.

Fabrication and Characterization of the Hydrophobic Bilayered Polydopamine-Bacterial Nanocellulose Aerogel. FIG. 37 demonstrates the fabrication procedures of a hydrophobic bilayered aerogel using BNC and PDA. FIG. 38 illustrates a photothermal layer and a heat insulating layer of the bilayered aerogel in a PMD cell. *Gluconacetobacter hansenii* was cultured to form a BNC hydrogel. PDA particles were prepared, and their size was optimized to ensure the overlap of PDA optical absorption with the solar spectrum in the visible range. As indicated from scanning electron microscopy (SEM) image, the synthesized PDA particles were in spherical shape with an average diameter of ~1 mm (FIG. 39). PDA particles were then dispersed in bacterial growth medium and added onto the top of the BNC layer to form a PDA/BNC layer. The bilayer hydrogel was cleaned and freeze-dried to obtain a bilayer PDA/BNC aerogel.

Figure 40:
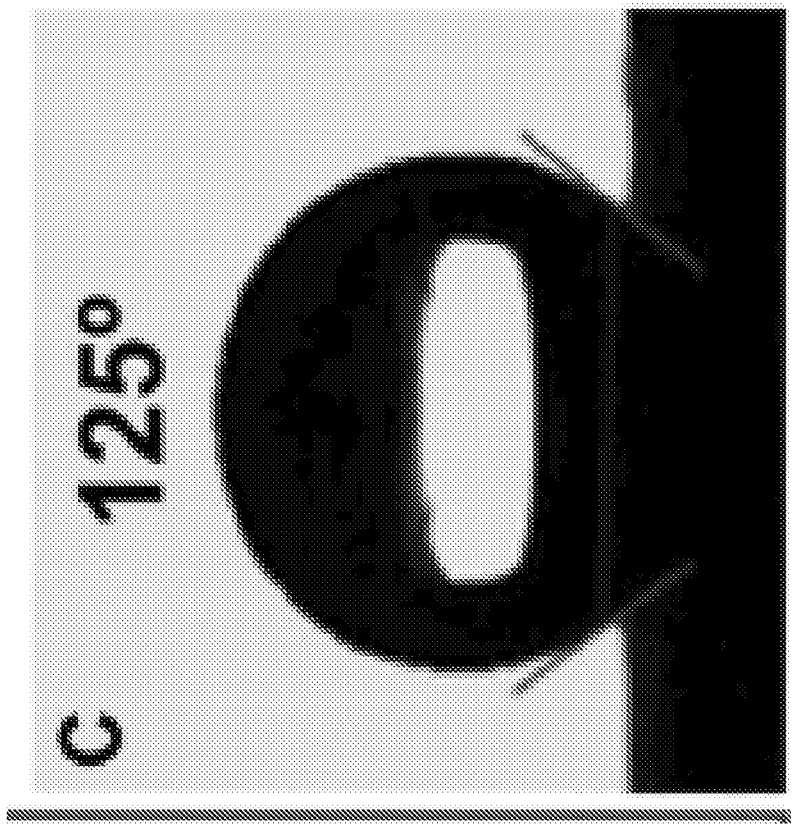
FIG. 40 is an exemplary embodiment of the water contact angle image of a FTCS-PDA/BNC aerogel in accordance with the present disclosure.
Figure 50:
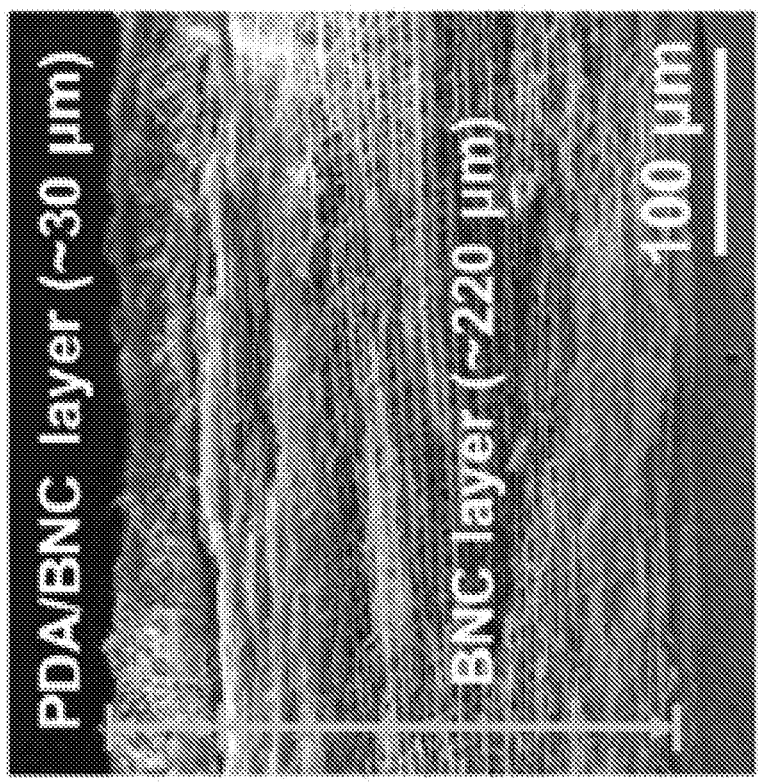
FIG. 50 is an exemplary embodiment of an SEM image showing the cross-section of a PDA/BNC aerogel in accordance with the present disclosure.
Figure 49:
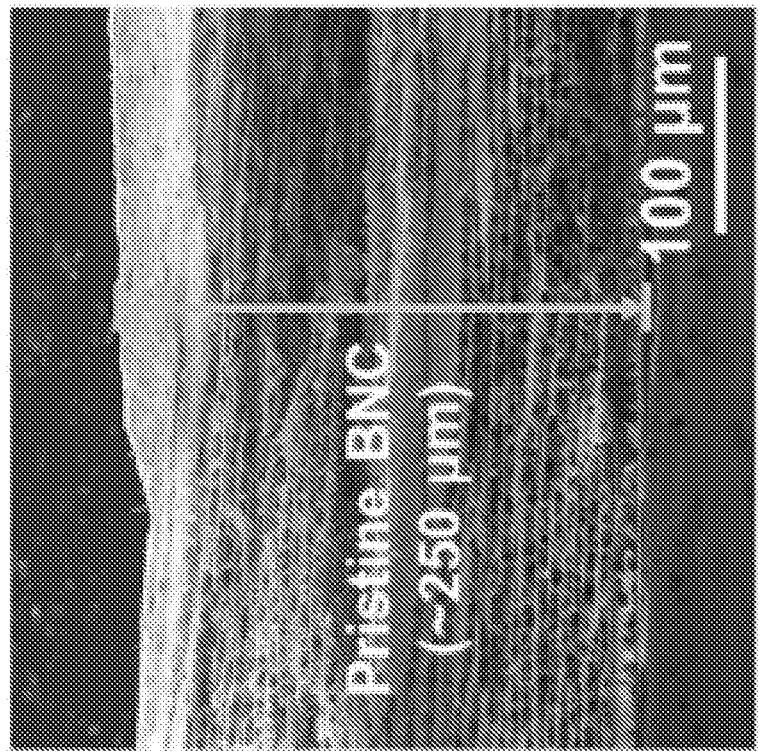
FIG. 49 is an exemplary embodiment of an SEM image showing the cross-section of a pristine BNC aerogel in accordance with the present disclosure.

To make the aerogel hydrophobic, which is essential for MD membranes, the PDA/BNC aerogel was later exposed to (tridecafluoro-1,1,2,2-tetrahydrooctyl)-trichlorosilane (FTCS) vapor, which resulted in a dense coverage of FTCS fluorosilane functional groups on the membrane surface and a water contact angle of 1250 (FIG. 40). FIGS. 41-48 show the optical and SEM images of a BNC aerogel and a bilayered PDA/BNC aerogel. The pristine BNC aerogel contains interconnected nanofibrils with diameters in 20-100 nm (FIGS. 42 and 43). The cross-section SEM image of pristine BNC shows the layered and microporous structure of a BNC aerogel in the z-direction (FIG. 44). Compared with the white BNC aerogel, the bilayered PDA/BNC aerogel is extremely black on top surface after loading PDA particles (FIG. 45). The top surface SEM images of PDA/BNC aerogel (FIGS. 46 and 47) show the spherical shape PDA particles entangled inside the BNC nanofibrils. The cross-section of the PDA/BNC aerogel exhibits a bilayered structure (FIG. 48), with a clear interface between the PDA-loaded BNC and pristine BNC layers. The pristine BNC and PDA/BNC aerogels have a similar thickness (~250 m) (FIGS. 49 and 50). In particular, the PDA/BNC aerogel contains a ~30 μm PDA-loaded BNC layer and a ~220 μm pristine BNC layer (FIG. 50). Confirmed by gravimetric measurements, the porosities ($\varepsilon$) of pristine BNC (98%) and PDA/BNC (93%) are higher than those of the commercially available PVDF membranes (50-70%). It should be noted that the porosity of PDA/BNC is the average porosity of the pristine BNC layer and the PDA-loaded BNC layer. Due to similar synthesis methods, the BNC layer in PDA/BNC has a similar porosity as the pristine BNC. The loading of PDA particles in the bilayered PDA/BNC aerogel was measured to be around 56 wt %, and the PDA wt % in the PDA/BNC layer of the bilayered PDA/BNC aerogel reached 91 wt %.

Figure 51:
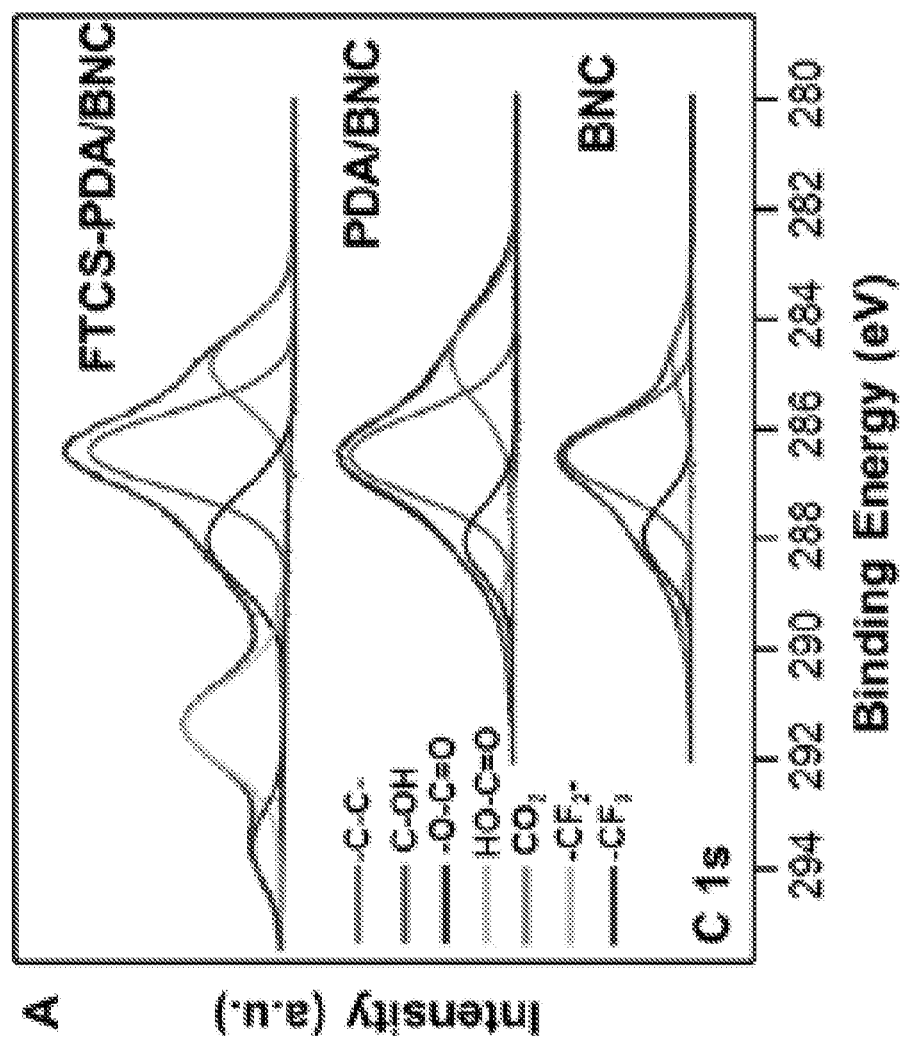
FIG. 51 is an exemplary embodiment XPS spectra of pristine BNC, PDA/BNC, and FTCS-PDA/BNC showing the C 1s peaks in accordance with the present disclosure.
Figure 52:
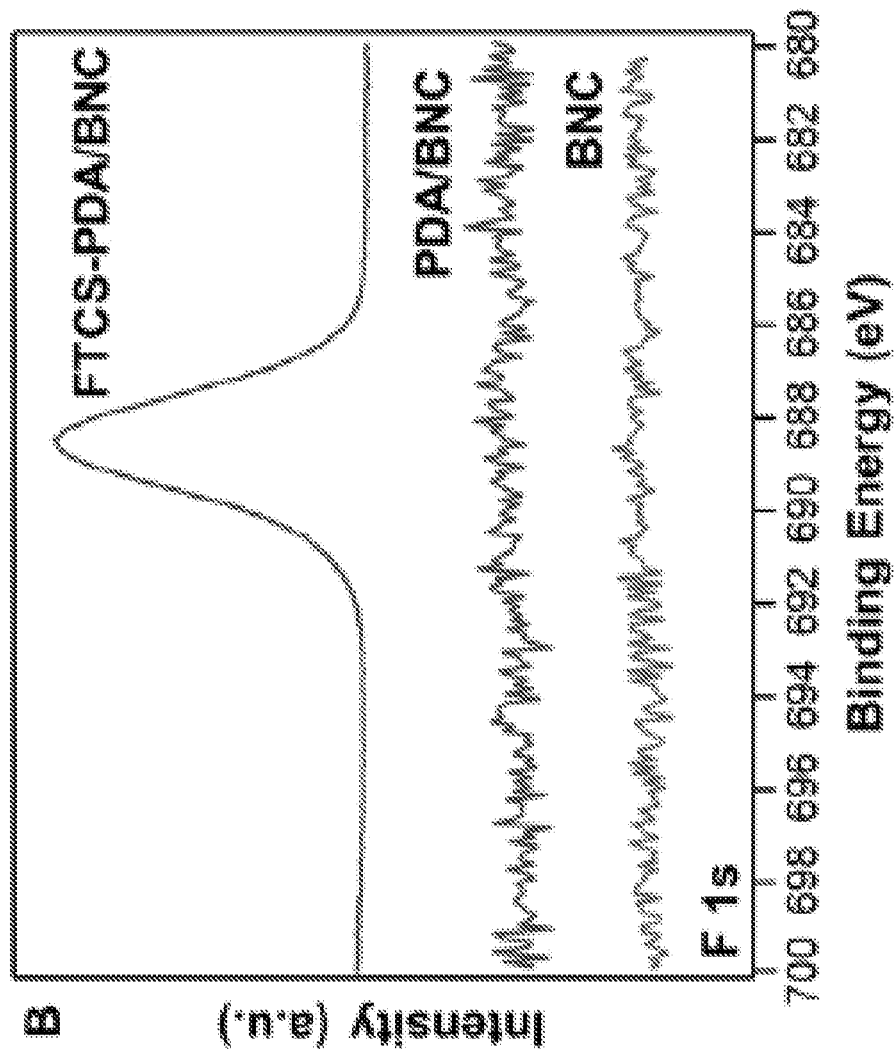
FIG. 52 is an exemplary embodiment XPS spectra of pristine BNC, PDA/BNC, and FTCS-PDA/BNC showing the F 1s peaks in accordance with the present disclosure.
Figure 53:
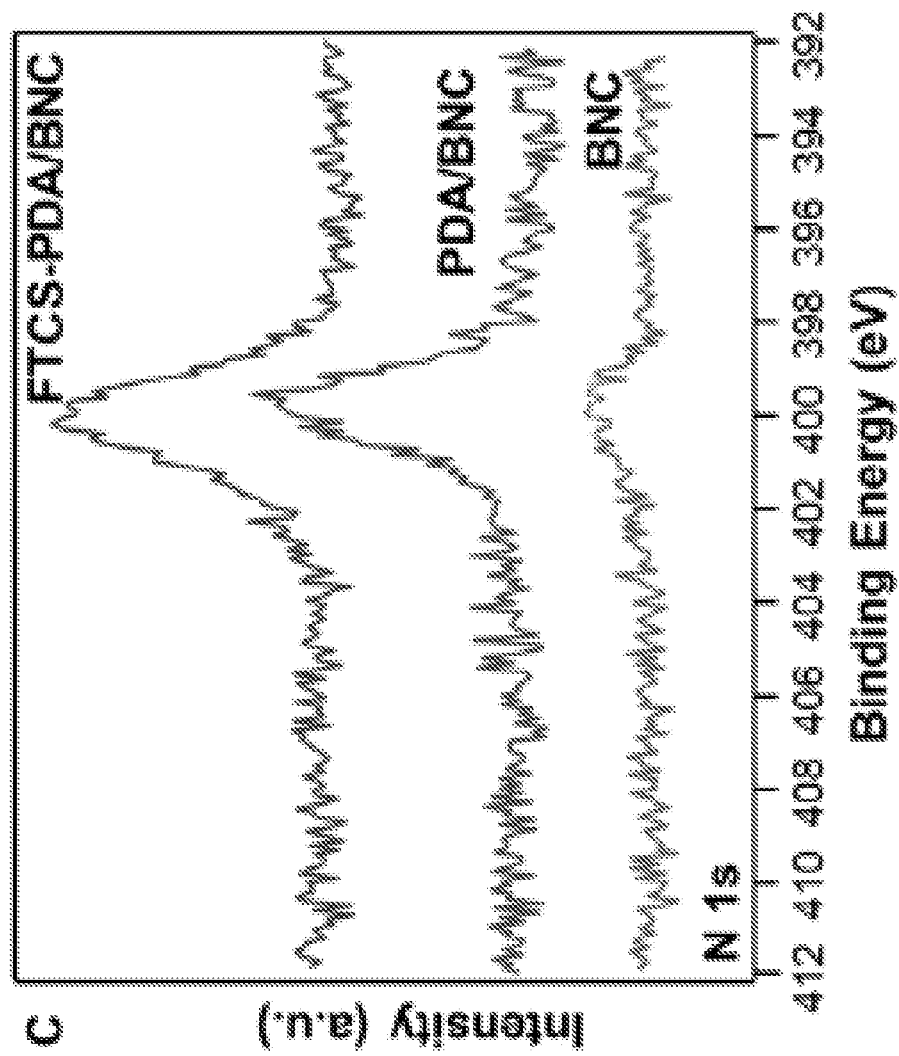
FIG. 53 is an exemplary embodiment XPS spectra of pristine BNC, PDA/BNC, and FTCS-PDA/BNC showing the N 1s peaks in accordance with the present disclosure.
Figure 54:
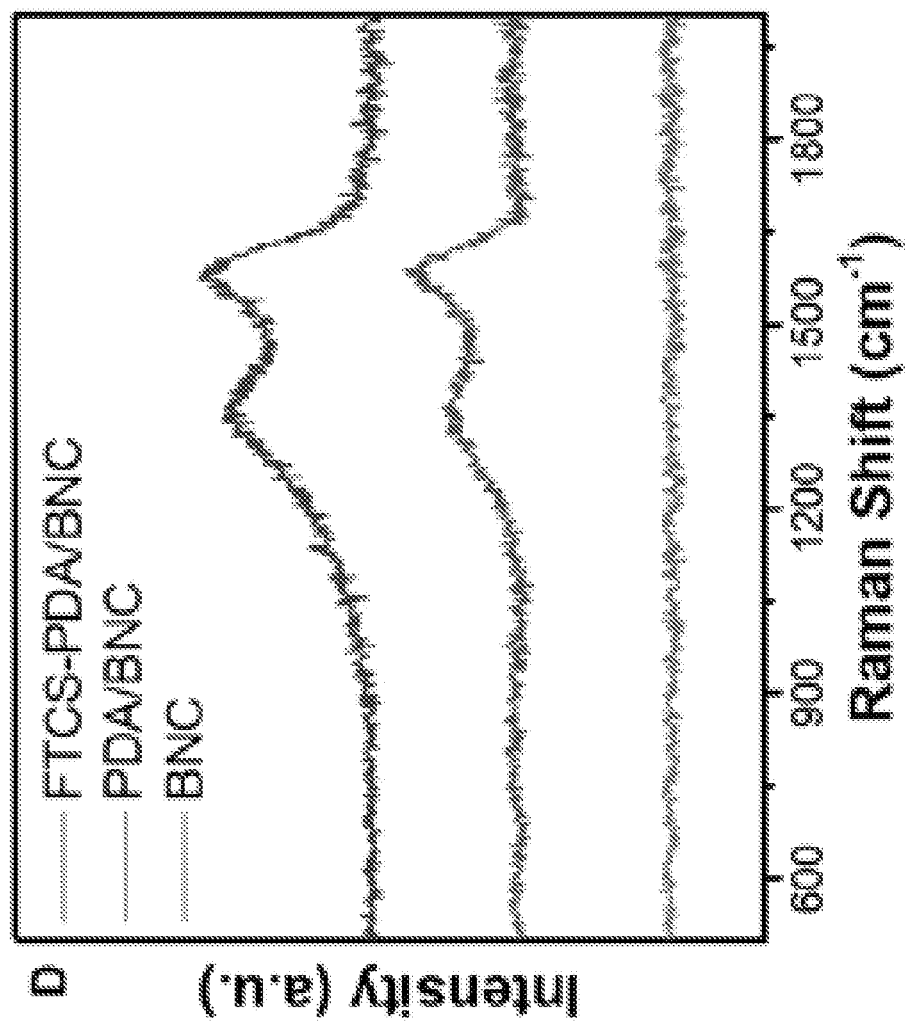
FIG. 54 is an exemplary embodiment Raman spectra of BNC, PDA/BNC, and FTCS-PDA/BNC in accordance with the present disclosure.

To characterize the PDA particles and fluoro-silane coatings on FTCS-PDA/BNC aerogels, XPS and Raman measurements were conducted. The newly appeared C is peaks at 291.4 and 293.6 eV correspond to the —CF2- and —CF3 functional groups respectively in the fluoro-silane coatings (FIG. 51). The F 1s spectrum for each of FTCS-PDA/BNC, PDA/BNC, and BNC is shown in FIG. 52. The increased peak intensity at 399.9 eV in N is indicated the indole or pyrrole N—H bonds from PDA particles (FIG. 53). In Raman spectra (FIG. 54), the two new peaks at 1350 and 1573 cm$^{-1}$ correspond to the stretching and deformation of the catechol groups of PDA, respectively. XPS and Raman results suggest successful loading of PDA particles and fluoro-silane coatings in the FTCS-PDA/BNC aerogels.

Figures 55, 56:
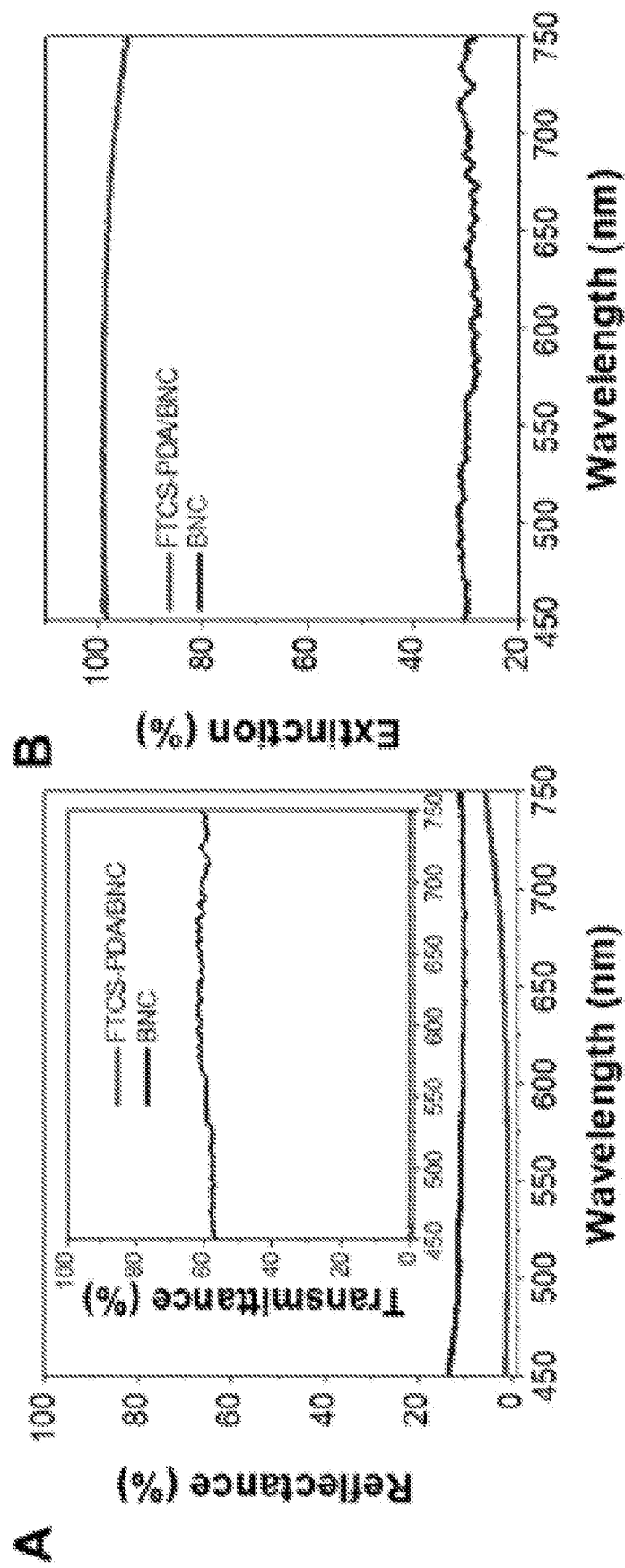
FIG. 55 is an exemplary embodiment of light reflectance and transmittance of a pristine BNC aerogel and a FTCS-PDA/BNC aerogel in accordance with the present disclosure.
FIG. 56 is an exemplary embodiment of light extinction of a pristine BNC aerogel and a FTCS-PDA/BNC aerogel in accordance with the present disclosure.

Optical and Photothermal Conversion Properties of the Bilayered Aerogel. For PMD membranes, the light absorption is essential for light-to-heat conversion. The optical transmittance and reflectance measurements of the pristine BNC and FTCS-PDA/BNC aerogels were carried out in the range of 450-750 nm (FIGS. 55 and 56). The pristine BNC exhibited high light transmittance (59%) and reflection (11%), leading to a low light extinction of 30%. In contrast, after loading PDA particles, FTCS-PDA/BNC showed extremely low light transmittance (0%), and reflectance (2%), which resulted large light extinction (98%) in the visible range. The excellent light extinction of the FTCS-PDA/BNC aerogel, attributed to the light absorption of PDA particles and the concomitant light scattering of the BNC nanofibrils, shows the light-to-heat conversion activity of the bilayered aerogel.

Figure 57:
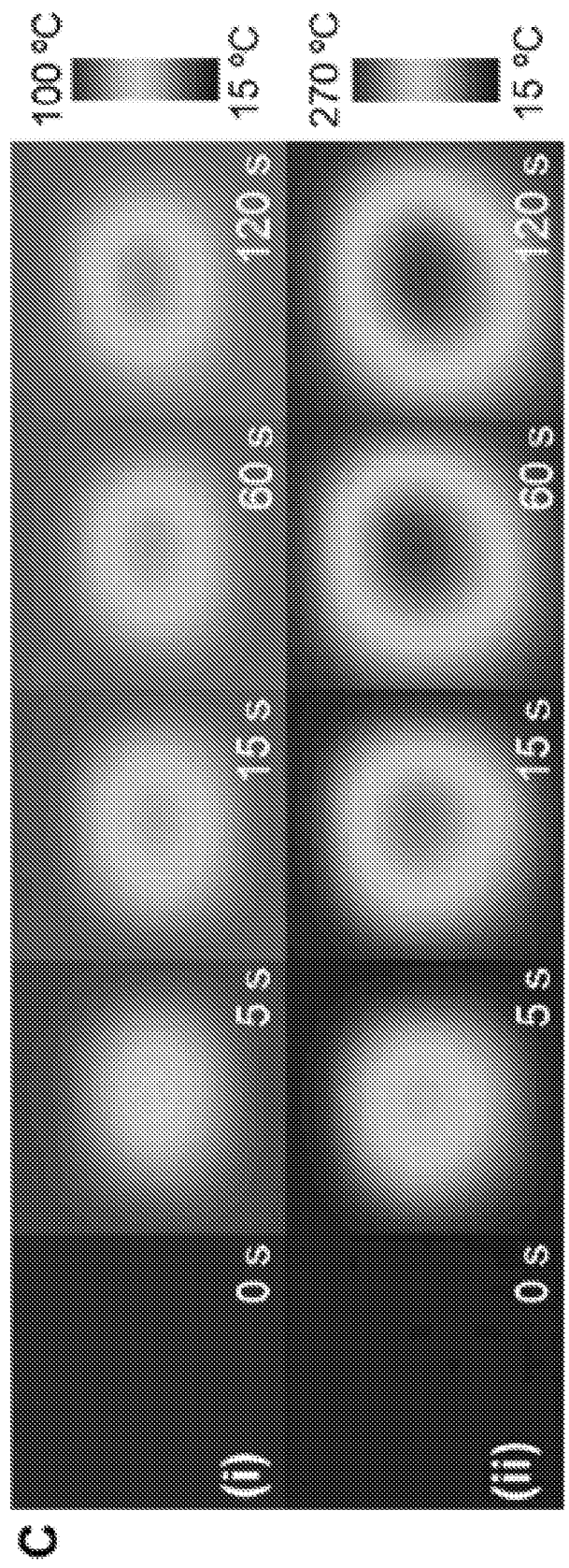
FIG. 57 is an exemplary embodiment of IR camera images of a FTCS-PDA/BNC aerogel in 120 seconds under two light irradiations: 1 kW/m$^2$ (i) and 9 kW/m$^2$ (ii) in accordance with the present disclosure.
Figure 58:
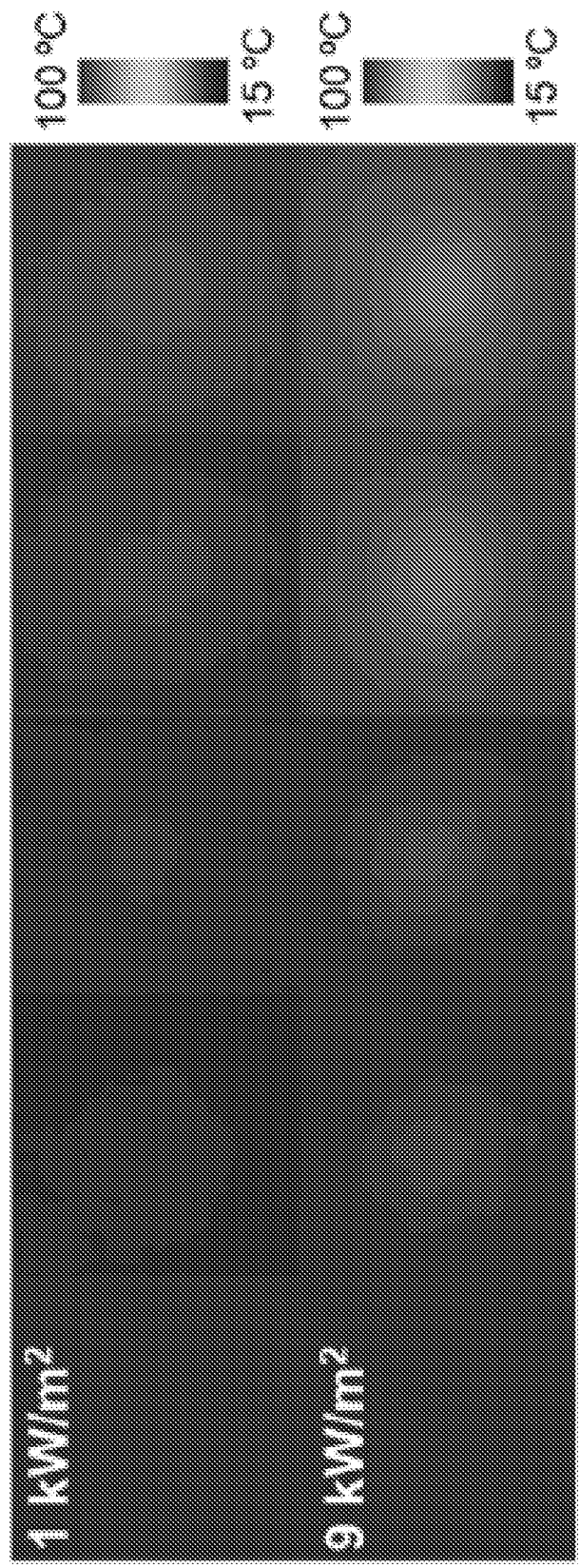
FIG. 58 is an exemplary embodiment of IR result of a pristine BNC under two irradiations: 1 kW/m$^2$ (~1 sun, top) and 9 kW/m$^2$ (~9 sun, bottom) in accordance with the present disclosure.
Figure 59:
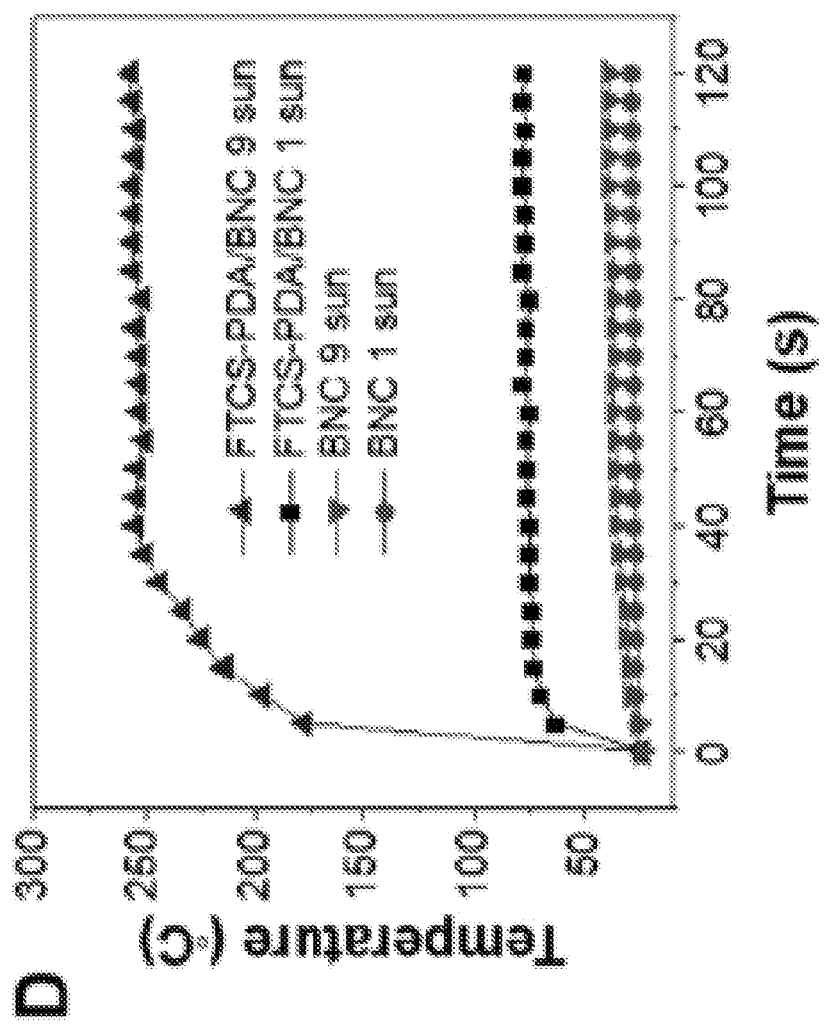
FIG. 59 is an exemplary embodiment of surface temperature of a pristine BNC aerogel and FTCS-PDA/BNC aerogel in accordance with the present disclosure.
Figure 60:
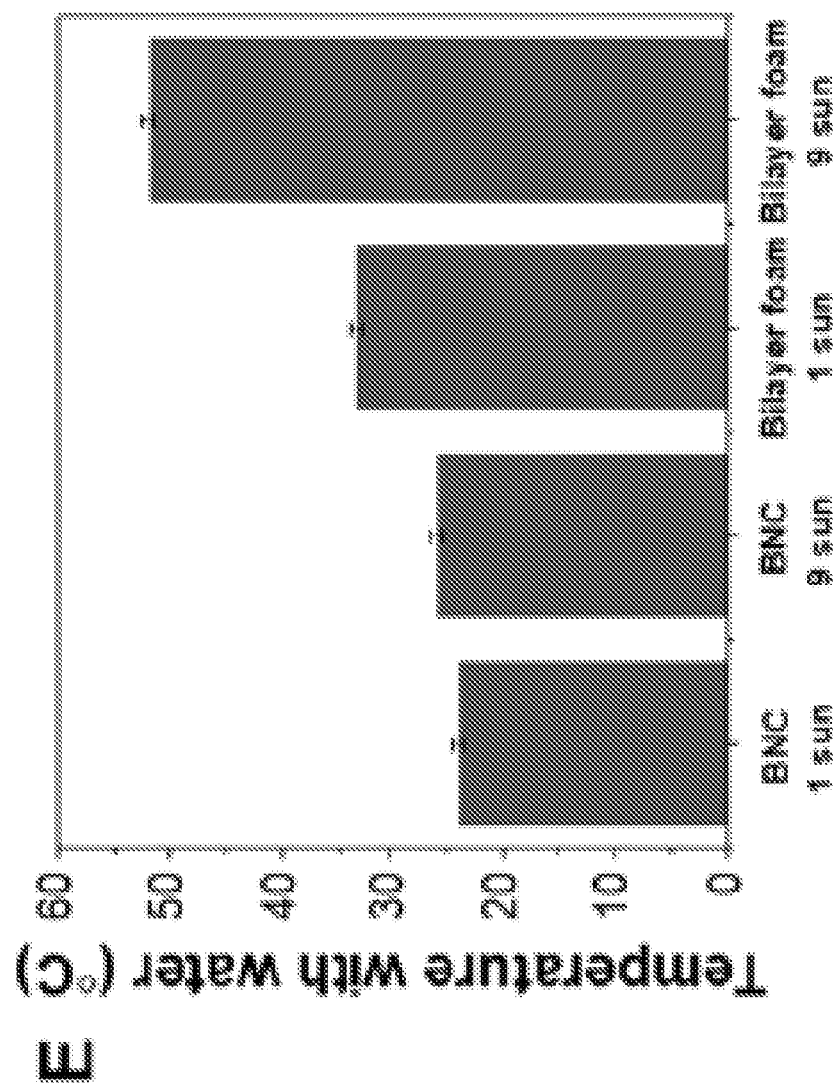
FIG. 60 is an exemplary embodiment of temperature under water of a pristine BNC aerogel and FTCS-PDA/BNC aerogel in accordance with the present disclosure.

Besides the light absorption, the photothermal conversion activity of a photothermal membrane determines its capability to transform direct solar light into thermal energy. To test its photothermal conversion property, the FTCS-PDA/BNC aerogel was exposed to simulated solar light with two illumination intensities: 1 kW m$^{-2}$ (~1 sun) and 9 kW m$^{-2}$ (~9 sun). As indicated by IR images (FIGS. 57 and 58), the surface temperature of FTCS-PDA/BNC aerogel increased from 24° C. rapidly to 78° C. after 10 seconds under 1 sun, and increased to 256° C. after 40 seconds under 9 sun, which also remained constant over the entire 120 seconds duration (FIG. 59). In contrast, the surface temperature of pristine BNC aerogel slowly increased from 24° C. to 29° C. under 1 sun and to 39° C. under 9 sun after 120 seconds. For PMD membranes, the membrane surface temperature increase under water is essential for determining the transmembrane temperature gradient and vapor transport driving force during PMD operation. Therefore, the photothermal conversion activity of FTCS-PDA/BNC aerogel under room temperature water (20° C., 8 mm distance from the membrane surface to the air/water interface) was monitored (FIG. 60). Under water, after 600 seconds of illumination, the pristine BNC aerogel showed surface equilibrium temperature of 24° C. under 1 sun, and 26° C. under 9 sun.

With PDA, the FTCS-PDA/BNC aerogel exhibited much higher surface equilibrium temperatures, with 33° C. under 1 sun, and 52° C. under 9 sun. As comparison, with water on top, PDA coated PVDF membranes only exhibited 26° C. under 0.75 sun and 32° C. under 7 sun. The higher surface temperatures of PDA particles-loaded BNC can be attributed to its significantly higher amount of PDA (56 wt %) than that in the PDA-coated PVDF membranes (10 wt %), which resulted in better light absorption and photothermal conversion properties. The high membrane surface temperatures with water on top suggest that FTCS-PDA/BNC aerogel is capable of providing high transmembrane temperature gradient and vapor transport driving force during solar-driven membrane distillation process.

Figure 61:
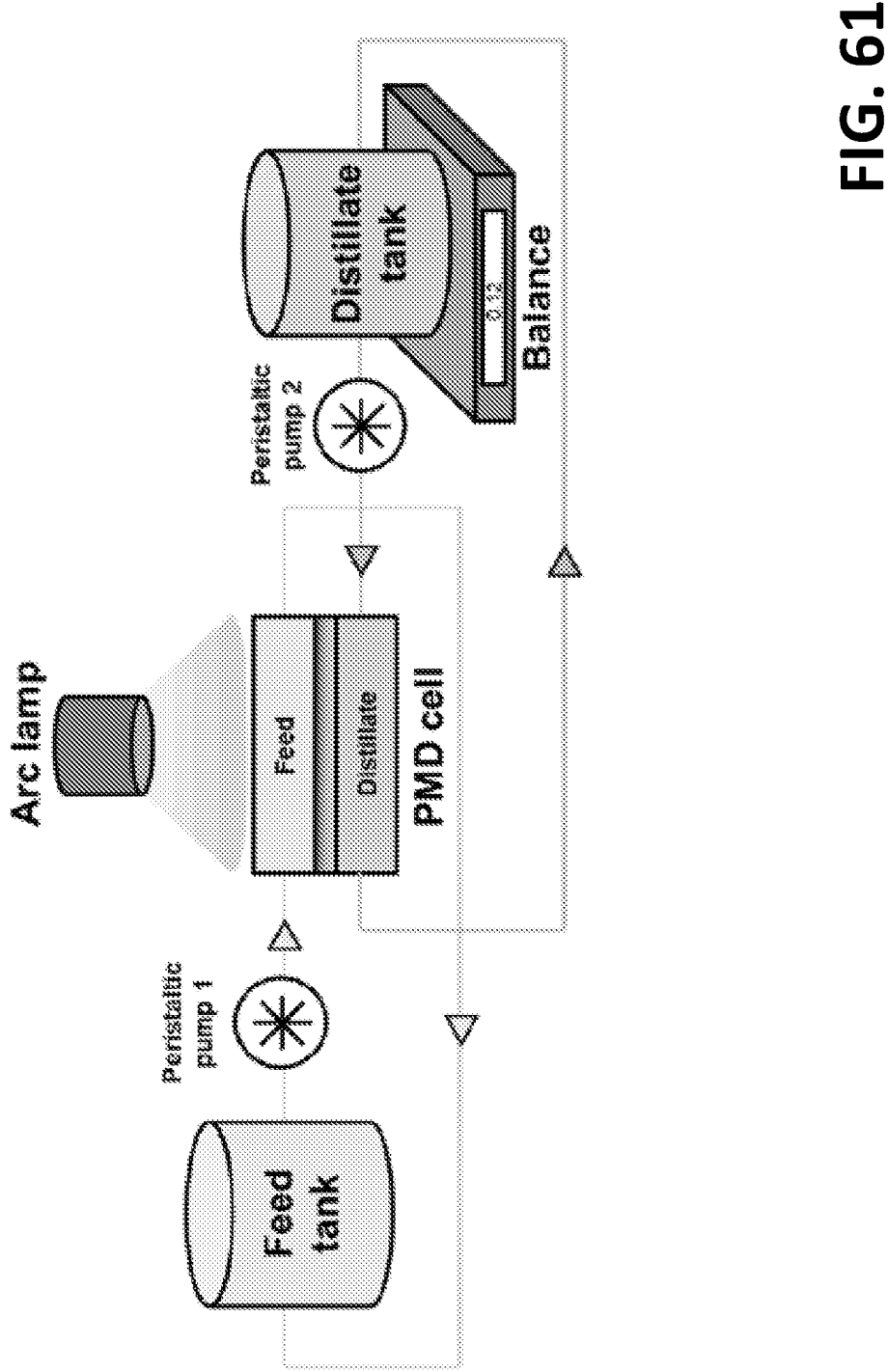
FIG. 61 is an exemplary embodiment of a schematic of a photothermal direct contact membrane distillation system in accordance with the present disclosure.
Figure 62:
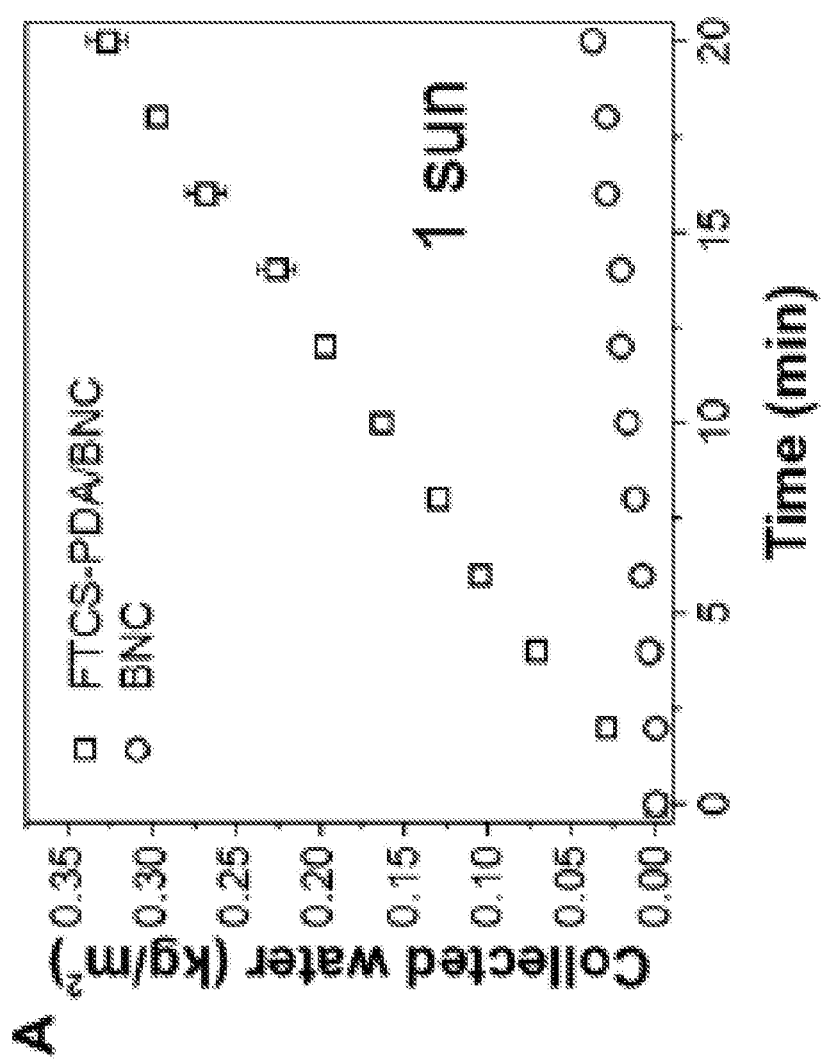
FIG. 62 is an exemplary embodiment of photothermal membrane distillation tests. The PMD performance of a pristine BNC aerogel and a FTCS-PDA/BNC aerogel under 1 kW/m$^2$ light irradiation in accordance with the present disclosure.
Figure 63:
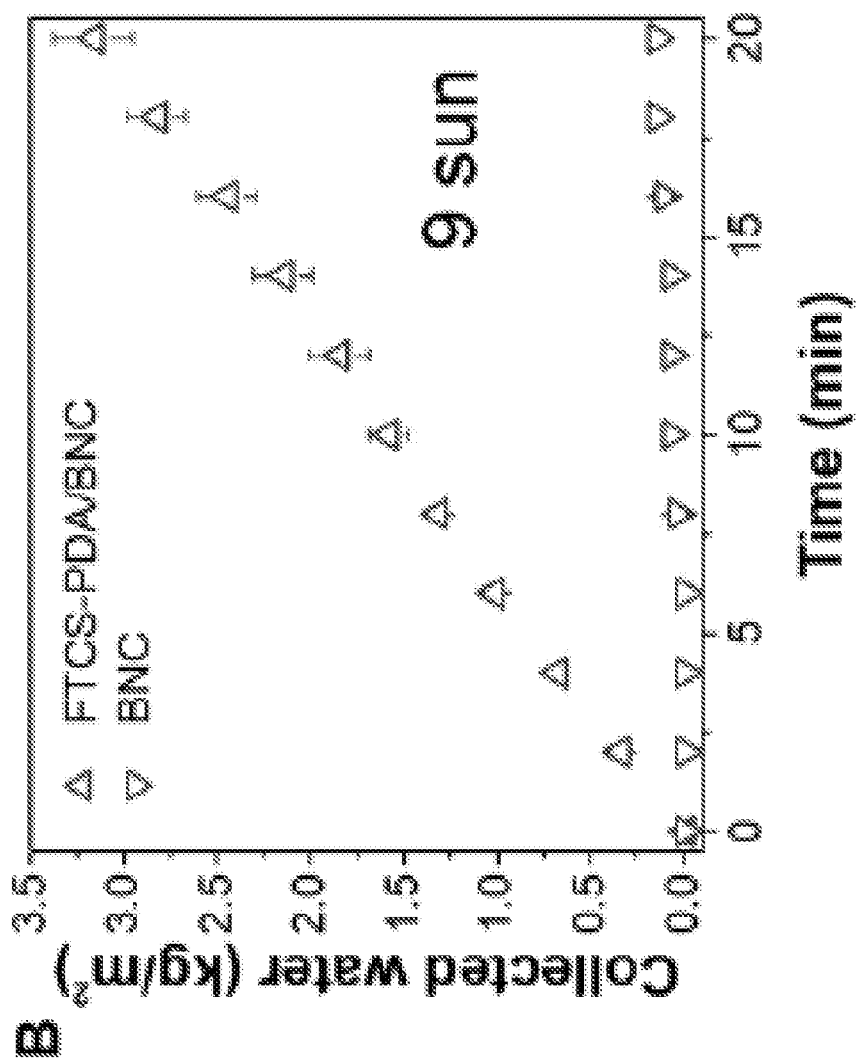
FIG. 63 is an exemplary embodiment of PMD performance of a pristine BNC aerogel and a FTCS-PDA/BNC aerogel under 9 kW/m$^2$ light irradiation in accordance with the present disclosure.
Figure 64:
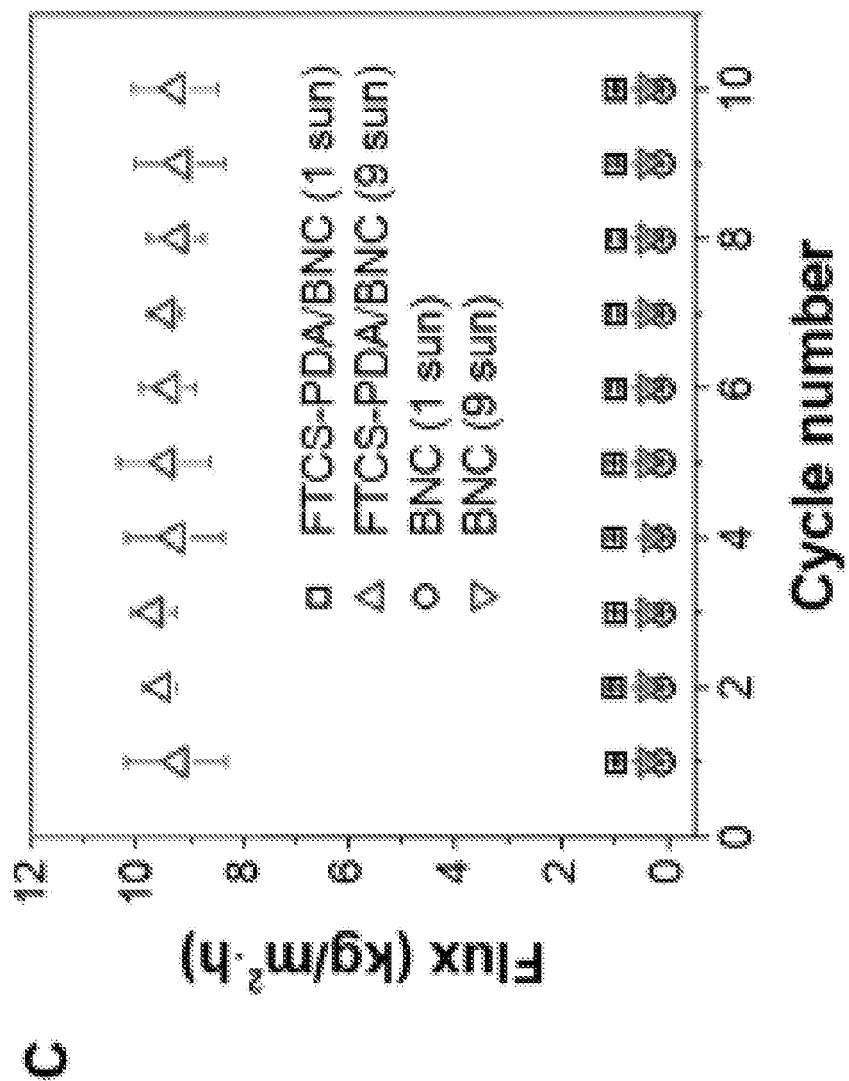
FIG. 64 is an exemplary embodiment of fluxes of a pristine BNC aerogel and a FTCS-PDA/BNC aerogel during 10 cycles of PMD tests (1 cycle=20 minutes) in accordance with the present disclosure.
Figure 65:
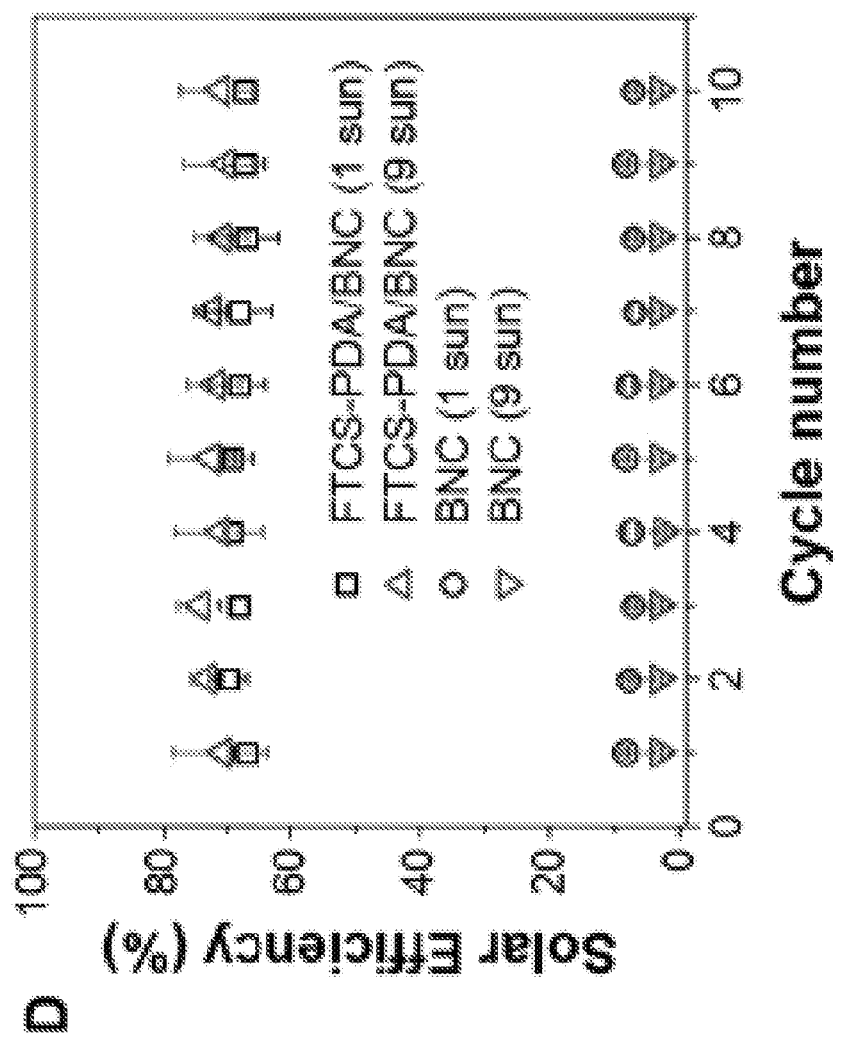
FIG. 65 is an exemplary embodiment of solar conversion efficiencies of a pristine BNC aerogel and a FTCS-PDA/BNC aerogel during 10 cycles of PMD tests (1 cycle=20 minutes) in accordance with the present disclosure.

Photothermal Membrane Distillation. The solar-driven PMD tests were carried out in a DCMD module with a solar simulator (FIG. 61). Room temperature highly saline water (0.5 M NaCl, 20° C.) was used as the feed water and circulated on top of the membrane with a flow rate of 3.6 mL min$^{-1}$. On the other side of the membrane, the distillate (DI water, 20° C.) was circulated with a flow rate of 16.2 mL min$^{-1}$, and the increasing weight of the distillate was measured continuously using a balance to quantify the amount of collected water. Pristine BNC treated with FTCS (FTCS-BNC) was used as the control membrane for comparison. Under 1 sun solar irradiation, the FTCS-PDA/BNC aerogel achieved a water flux of 1.0 kg m$^{-2}$ h$^{-1}$ (FIG. 62), 10 times higher than that of the FTCS-BNC aerogel (0.1 kg m$^{-2}$ h$^{-1}$). With higher light power density (9 sun), the water flux of the FTCS-PDA/BNC aerogel increased to 9.4 kg m$^{-2}$ h$^{-1}$ (FIG. 63), 23 times higher than that of the FTCS-BNC aerogel (0.4 kg m$^{-2}$ h$^{-1}$). The PMD performance of the FTCS-PDA/BNC aerogel was further tested in 10 cycles (20 minutes for each cycle) to show its long term stability. Within 200 minutes, the water permeate fluxes from FTCS-PDA/BNC aerogel remained stable under both solar irradiation conditions (FIG. 64). The solar conversion efficiencies (i) were calculated to be 68% and 72% for FTCS-PDA/BNC aerogel under 1 sun and 9 sun respectively, much higher than those of FTCS-BNC aerogel under identical irradiations (FIG. 65).

The permeate flux (1.0 kg m$^{-2}$ h$^{-1}$), as well as the solar conversion efficiency (68%) of FTCS-PDA/BNC aerogel are significantly higher than previously reported PMD membranes when using cold water as the feed under similar irradiations. For example, PDA coated PVDF membrane achieved a 0.49 kg m$^{-2}$ h$^{-1}$ flux with an efficiency of 45% under 0.75 sun, while carbon black-PVDF composite membrane showed a flux of 0.22 kg m$^{-2}$ h$^{-1}$ and an efficiency of 21% under 0.7 sun.

The higher permeate flux and solar conversion efficiency of FTCS-PDA/BNC aerogel is attributed to three mechanisms: (1) with optimized particle size to allow better light absorption, and with the in situ growth of PDA particles inside BNC matrix to enable higher density of PDA in the membrane surface, FTCS-PDA/BNC aerogel achieved higher membrane top surface temperature under light illumination with water on top owing to stronger light absorption and photothermal conversion activities from the PDA particles; (2) higher vapor permeability of BNC aerogel compared with PVDF membranes—the larger porosity of the BNC aerogel (98%) than those of benchmark PVDF membranes (50-70%) helps to reduce the mass transport resistance and increase the permeability (it has been reported that the intrinsic permeability of BNC is 52% higher than that of a phase-inversion PVDF membrane due to the preferential ordinary molecular diffusion (OMD) transport through the interconnected pore space in a fibrous aerogel; meanwhile, based on the Dusty Gas Model (DGM), an aerogel with 97% porosity would have more than twice the permeability as a commercial membrane with 65% porosity); and, (3) decreased heat conductive loss from membrane top surface to distillate due to the higher porosity and lower thermal conductivity of the BNC aerogel structure. The theoretically calculated thermal conductivity of BNC aerogel (0.027 W m$^{-1}$ K$^{-1}$) is significantly smaller than that of the benchmark PVDF membrane (0.089 W m$^{-1}$ K$^{-1}$). Performance of conventional BNC and PVDF membranes for conventional MD using hot water also indicated that BNC exhibited higher thermal efficiencies (70%-80%) than PVDF membrane (30%-50%) when treating 40° C. or 60° C. feed water. The lower heat conductive loss from heated photothermal membrane top surface to the distillate side helps to maintain high temperature gradient between two sides of the membrane, which facilitates larger vapor pressure difference and mass transport driving force.

Figure 66:
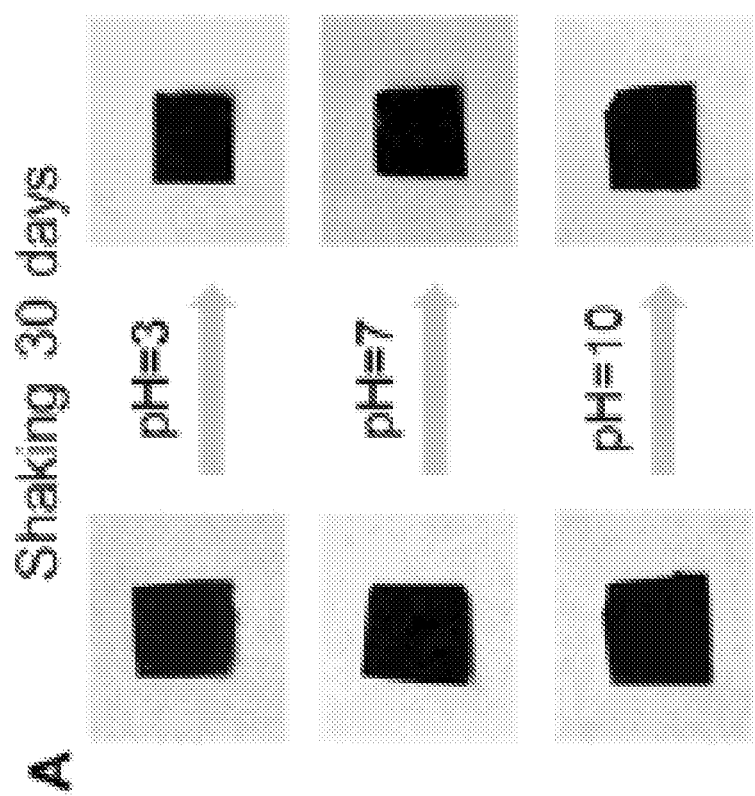
FIG. 66 is an exemplary embodiment of optical images showing a FTCS-PDA/BNC aerogel surface alteration after vigorous shaking for 30 days under 3 pH conditions in accordance with the present disclosure.
Figure 67:
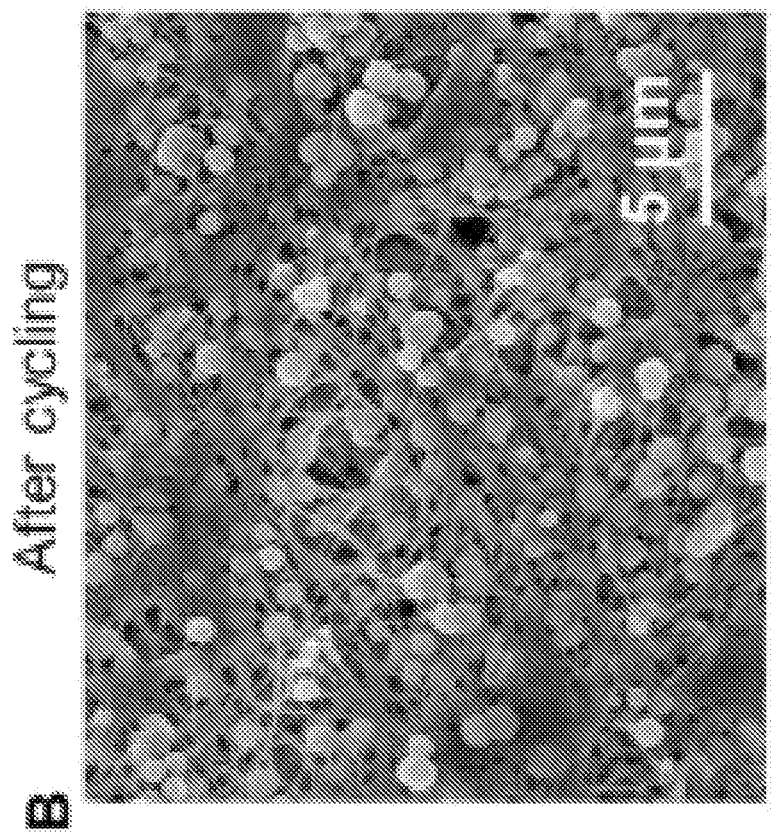
FIG. 67 is an exemplary embodiment of surface morphology of a FTCS-PDA/BNC aerogel after 10 cycles of PMD tests in accordance with the present disclosure.
Figure 68:
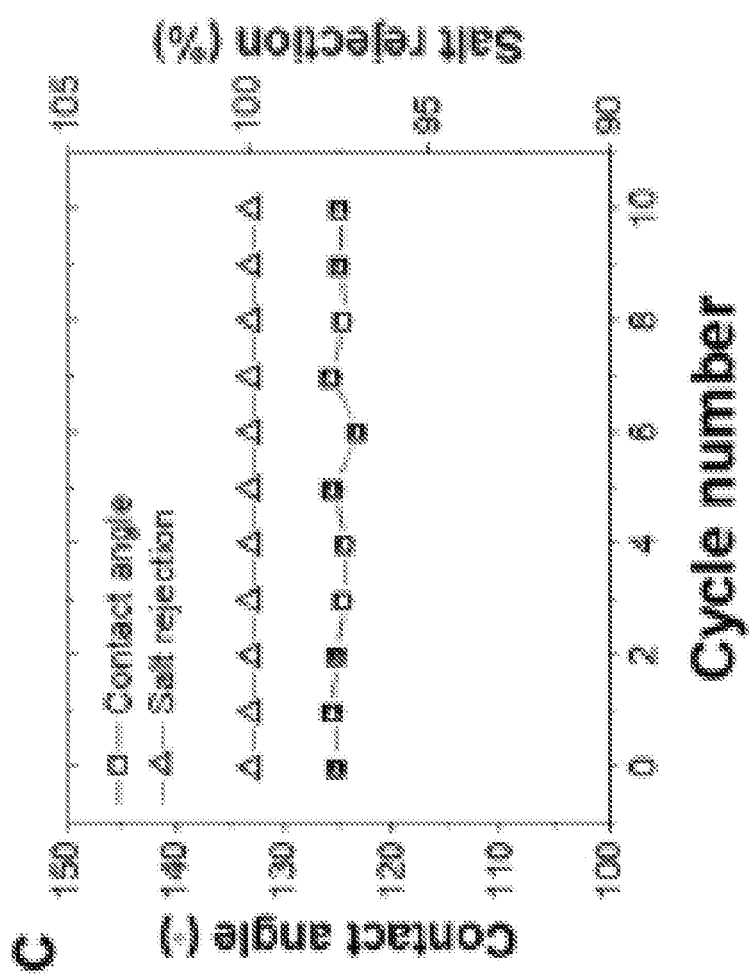
FIG. 68 is an exemplary embodiment of alteration of contact angles and salt rejections of a FTCS-PDA/BNC aerogel during 10 cycles of PMD tests in accordance with the present disclosure.

The chemical and mechanical stability of FTCS-PDA/BNC aerogel was further tested to show its robustness for long term PMD applications. After being exposed to solutions with three pH values (pH 3, 7, and 10) and vigorous shaking for 30 days, the FTCS-PDA/BNC aerogel did not show signs of disintegration or loss of the PDA particles from the surface (FIG. 66). After 10 cycles of PMD tests, the morphology and microstructure of the FTCS-PDA/BNC aerogel remained unaltered, as indicated from SEM observation (FIG. 67). The contact angles of the FTCS-PDA/BNC aerogel remained high and showed less than 2% variation during 10 cycles, confirming the excellent and stable wetting resistance of the aerogel (FIG. 68). The salt rejection was larger than 99.9% over 10 cycles of PMD tests using saline water. Conventional deposition of PDA particles into BNC matrix via vacuum filtration turned out to be unstable under shaking, while the in situ growth strategy has enabled BNC nanofibrils to strongly entangle the PDA particles. The remarkable stability of FTCS-PDA/BNC aerogel lessens the concerns of the possible detachment of photothermal materials from the membrane surface, and has also promised the use of the membrane for long term PMD applications.

Figure 69:
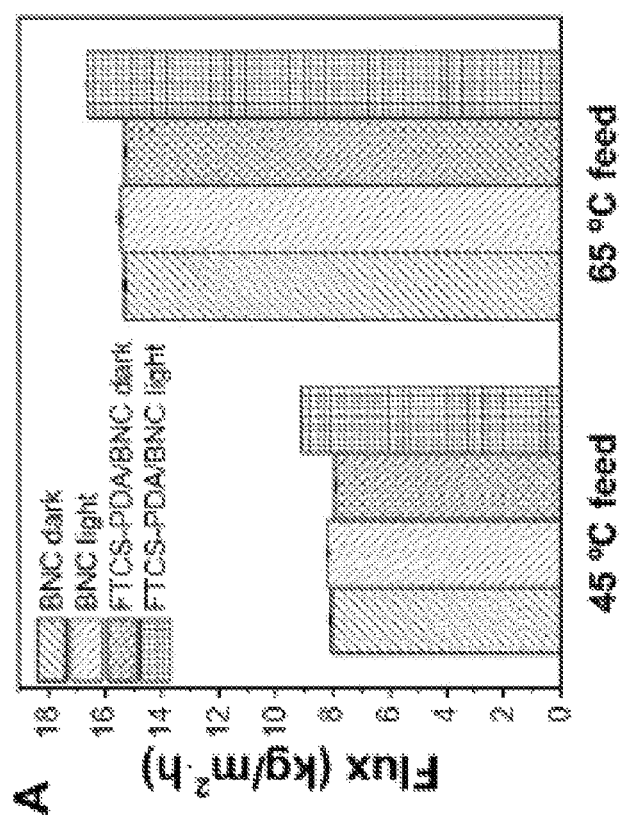
FIG. 69 is an exemplary embodiment of PMD fluxes of a FTCS-PDA/BNC aerogel with hot feed water (0.5 M NaCl, 45° C. and 65° C.) under both dark and light (1 sun) conditions in accordance with the present disclosure.
Figure 70:
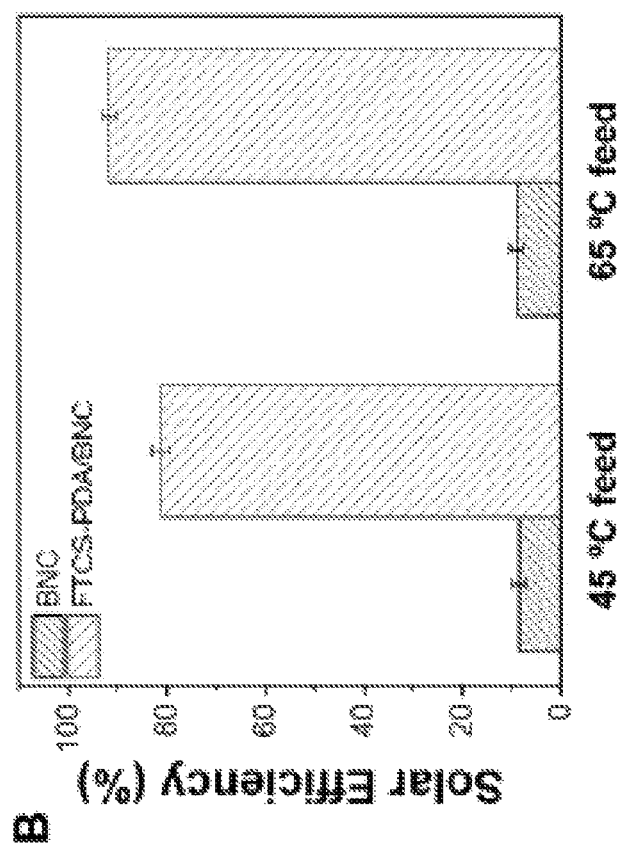
FIG. 70 is an exemplary embodiment of solar conversion efficiencies of a FTCS-PDA/BNC aerogel with hot feed water in accordance with the present disclosure.
Figure 71:
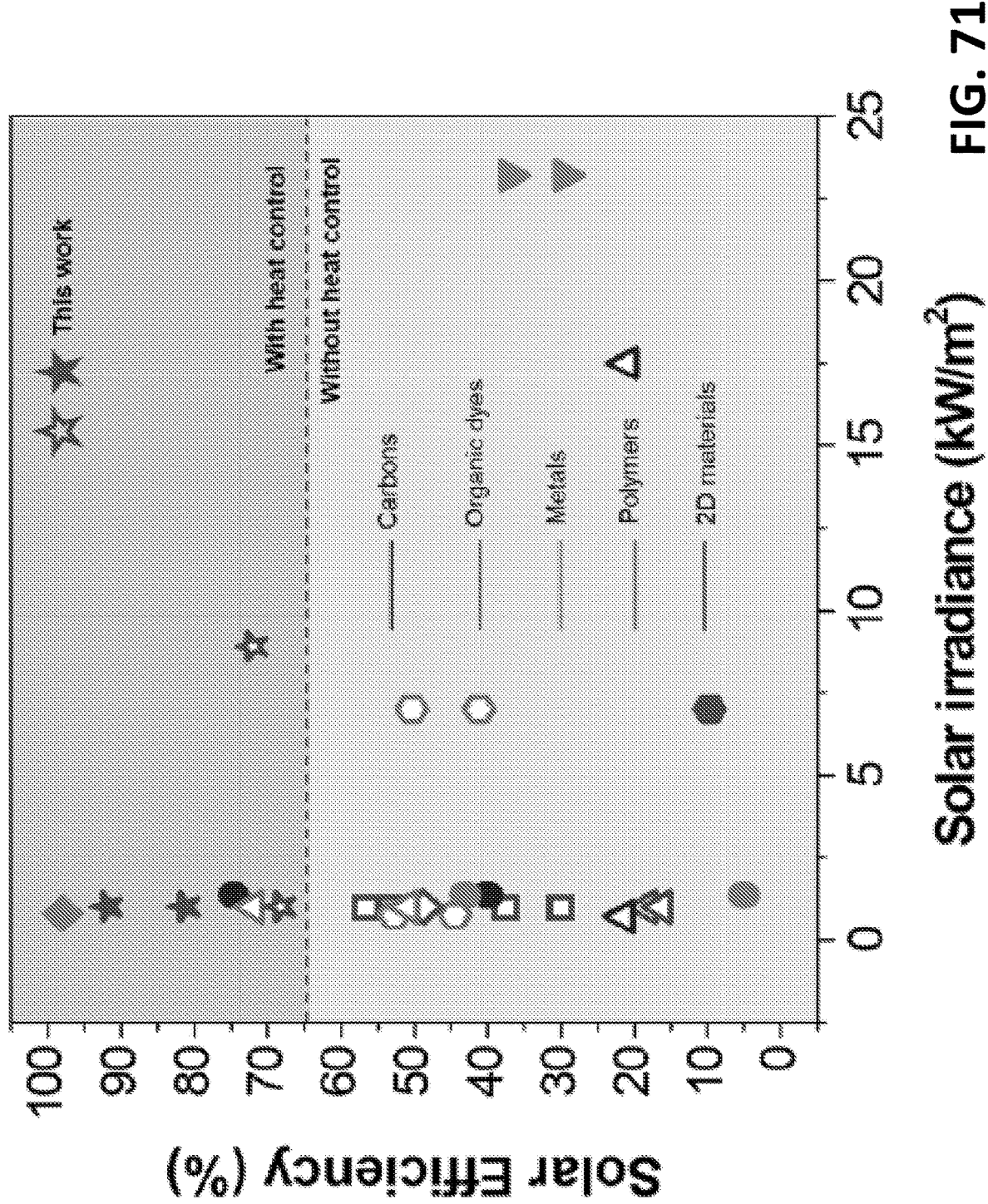
FIG. 71 is an exemplary embodiment of a comparison of solar conversion efficiencies among reported PMD systems in accordance with the present disclosure.

In PMD applications, the combination of photothermal membranes with low grade heat energy sources, such as waste heat from large power plants and oil and gas recovery systems, can further increase PMD's efficiency due to less heat loss from membrane surface to feed water. To simulate these low grade heat energy sources, two hot feed water temperatures, 45° C. and 65° C., were tested in PMD, simulating the temperatures in condenser streams of U.S. power plants, and in produced water from oil and gas recovery systems, respectively. Under dark condition, the FTCS-PDA/BNC aerogel achieved water fluxes of 7.9 kg m$^{-2}$ h$^{-1}$ and 15.3 kg m$^{-2}$ h$^{-1}$ with 45° C. and 65° C. feed water respectively (FIG. 69), slight smaller than those of the FTCS-BNC aerogel (8.1 and 15.4 kg m$^{-2}$ h$^{-1}$). The decreased water fluxes of the FTCS-PDA/BNC aerogel might be due to its smaller porosities, especially in the PDA/BNC layer, compared with the pure BNC membrane. With additional solar irradiation (1 sun), the fluxes of the FTCS-PDA/BNC aerogel increased to 9.1 and 16.7 kg m$^{-2}$ h$^{-1}$ with 45° C. and 65° C. feed water respectively. The higher permeate flux with additional solar light was attributed to the increased membrane surface temperature, which helped to alleviate temperature polarization effects in the boundary layer and increase the transmembrane temperature gradient. The solar conversion efficiencies (η') with hot feed water were calculated using the following equation (equation 3) modified from equation 2:

$$\eta' = \frac{(\dot{m}_{with\ solar} - \dot{m}_{without\ solar}) \cdot Hvap}{I}, \quad (3)$$

where $\dot{m}_{with\ solar}$ and $\dot{m}_{without\ solar}$ are permeate fluxes (kg m$^{-2}$ h$^{-1}$) under solar irradiation and dark conditions. The solar conversion efficiencies of the FTCS-PDA/BNC aerogel were 81.3% and 91.9% with 45° C. and 65° C. hot feed water respectively (FIG. 70), which are among the highest solar efficiencies for PMD systems combined with hot water sources (FIG. 71). As compared with PMD systems using cold feed water, the combination of PMD with low grade heat energy sources further increases the water purification rate and thermal efficiency of PMD, making it more reliable in real applications where these energy sources are available.

Figure 72:
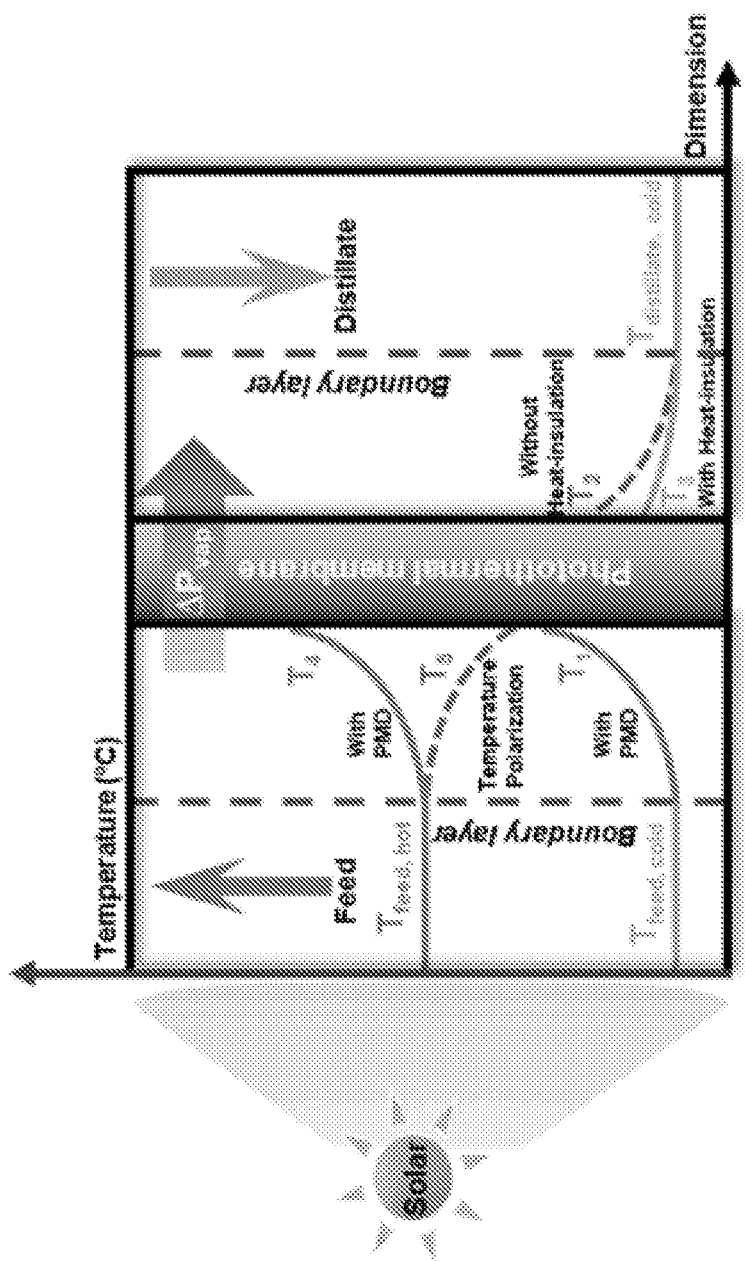
FIG. 72 is an exemplary embodiment of a schematic showing the temperature profile in PMD systems with different categories including the use of cold or hot feed water, and photothermal membranes with or without a heat insulation layer in accordance with the present disclosure.

In PMD systems, the temperature profile at the local membrane surface can be different compared with conventional MD systems. FIG. 72 illustrates the temperature profile in PMD systems, with different categories including the use of cold or hot feed water, and photothermal membranes with or without a heat insulation layer. For PMD using cold feed water, also called as the solar-driven membrane distillation, membrane surface temperature increase (T1) at the feed side only comes from the photothermal activities of the membrane. Therefore, solar energy is the primary energy source for such a configuration. Without a heat insulation layer, the membrane surface temperature at the distillate side (T2) can be close to T1 at the feed side due to conductive heat transport, making the temperature gradient (ΔT), and consequently the vapor pressure gradient (ΔP) between two sides of the membrane to be low. The addition of a heat insulation layer at the bottom of the photothermal layer, however, helps to decrease the conductive heat loss from the feed side to the distillate side, which helps to lower the distillate side's membrane surface temperature (T3) and offers a larger ΔT to facilitate faster vapor transport. For PMD system combined with hot feed water, the membrane surface temperature (T4) is significantly improved from T1 in cold feed system due to less heat loss from the heated photothermal membrane to the feed water.

Figures 73, 74, 75:
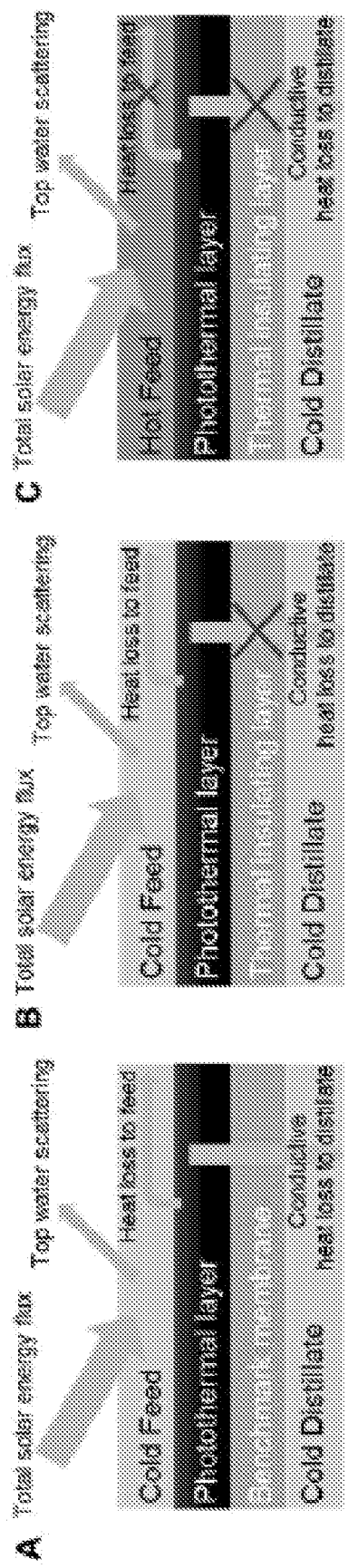
FIG. 73 is an exemplary embodiment of a schematic showing the heat flux chart in a PMD system using room temperature feed and distillate, and benchmark membranes coated with photothermal materials in accordance with the present disclosure.
FIG. 74 is an exemplary embodiment of a schematic showing the heat flux chart in a PMD system using room temperature feed and distillate, and thermal insulating membranes coated with photothermal materials in accordance with the present disclosure.
FIG. 75 is an exemplary embodiment of a schematic showing the heat flux chart in a PMD system using hot feed and room temperature distillate, and thermal insulating membranes coated with photothermal materials in accordance with the present disclosure.

In addition, the increased surface temperature helps to alleviate the temperature polarization effect, which lowers the surface temperature in conventional MD (T5). The thermally engineered strategy of combining the use of hot feed water from waste heat energy sources, which decreases the heat loss from membrane surface to the feed, and the use of a highly porous and low thermal conductive aerogel heat-insulating layer, enables the largest temperature gradient ($\Delta T = T4-T3$) between two sides of the membrane, thus offering high permeate fluxes and significantly increased solar conversion efficiencies (close to 100%). PMD systems using cold/hot feed water, and with/without a heat insulation layer are summarized in FIGS. 73-75. A detailed comparison of solar conversion efficiencies among reported PMD systems is also shown in FIG. 71. Current PMD membranes include photothermal materials such as carbon materials, organic dyes, metals, polymers, and 2D materials. To increase the solar conversion efficiency, various heat control strategies have been used, including (i) combining PMD systems with hot feed water (solid labels) (ii) using heat insulating layer; and (iii) using latent heat recovery systems.

Self-disinfection Activity of the Bilayered Aerogel. For many water purification processes including reverse osmosis and filtration, biofouling causes the decline of membrane performance in the long term. For PMD membranes, it is also possible that the cells in the treated water can deposit onto the membrane and form biofilm, which might later lead to flux decrease. Therefore, to main the longevity of the membrane performance, strategies of inhibiting the biofilm growth on the membrane are needed. The present disclosure demonstrates that the FTCS-PDA/BNC aerogel has the capability to resist biofilm growth during PMD operation, and effectively kills the bacteria on surface under light illumination.

Figure 76:
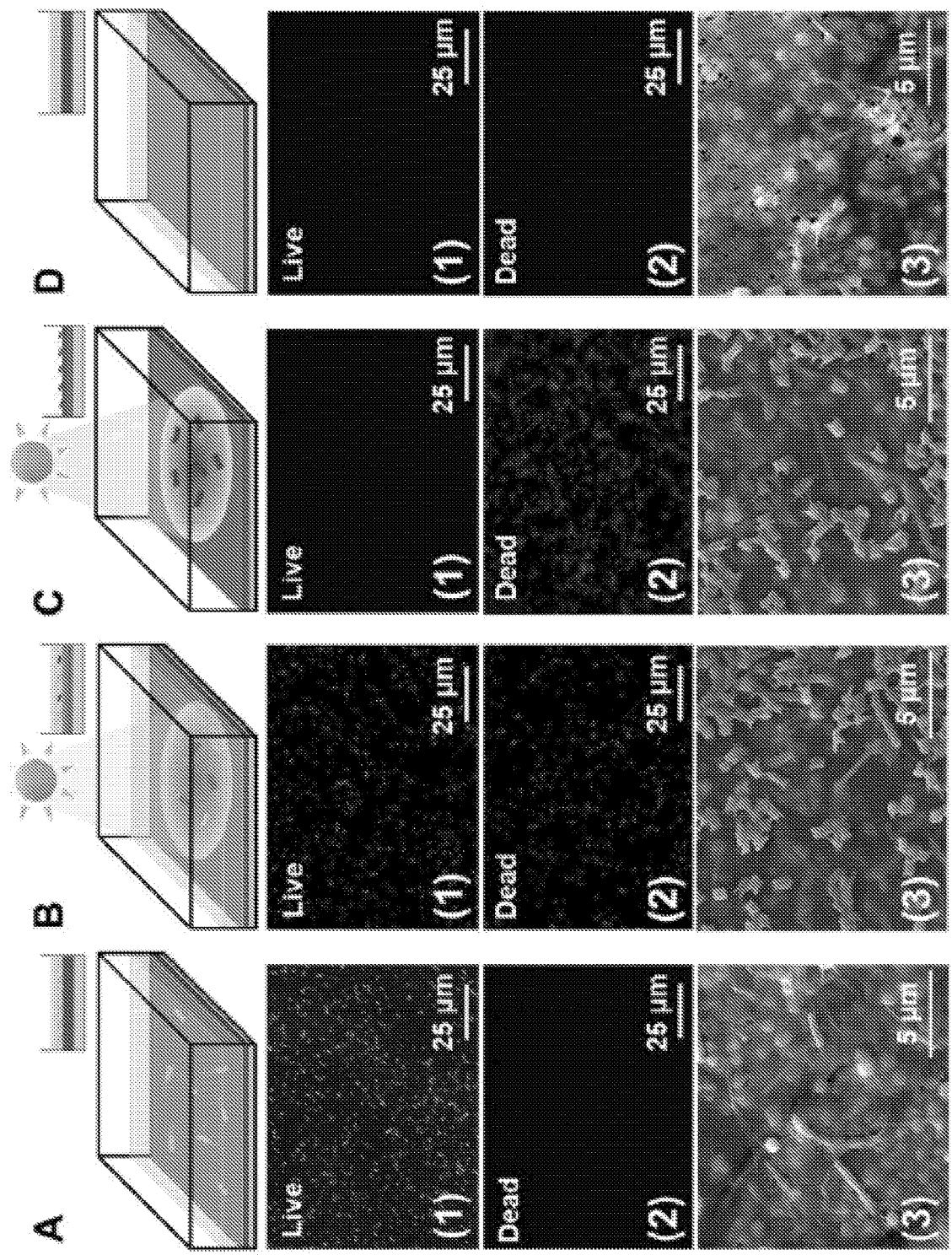
FIG. 76 is an exemplary embodiment of self-disinfection activity measurements for a FTCS-PDA/BNC aerogel in accordance with the present disclosure. Top row shows schematics, rows 1 and 2 show fluorescent images, and row 3 shows SEM images for each of the FTCS-PDA/BNC aerogel after contacting with water contaminated with *E. coli* for 1 hour (column A), FTCS-PDA/BNC aerogel after in situ PMD tests for 1 hour with water contaminated with *E. coli* (column B), FTCS-PDA/BNC aerogel after the water contaminated with *E. coli* drained on top surface and exposed to solar light (1 kW/m$^2$) for 10 minutes (column C), and FTCS-PDA/BNC aerogel after exposure to light and washing process using DI water (column D).

To show the bactericidal ability, the FTCS-PDA/BNC aerogel was first merged into a solution containing *E. coli* bacteria to simulate the situation of membrane contacting with water contaminated by bacteria (FIG. 76, column A). For FIG. 76, the top row shows schematics, rows 1 and 2 show fluorescent images, and row 3 shows SEM images for each of FTCS-PDA/BNC aerogel after contacting with water contaminated with *E. coli* for 1 hour (column A), FTCS-PDA/BNC aerogel after in situ PMD tests for 1 hour with water contaminated with *E. coli* (column B), FTCS-PDA/BNC aerogel after the water contaminated with *E. coli* drained on top surface and exposed to solar light (1 kW m$^{-2}$) for 10 minutes (column C), and FTCS-PDA/BNC aerogel after exposure to light and washing process using DI water (column D). After 1 hour, substantial live bacteria was observed on the membrane surface, as indicated from the green fluorescence (FIG. 76, column A, row 1) and SEM image of the membrane surface (FIG. 76, column A, row 3), and no dead bacteria was observed, as indicated from the absence of red fluorescence (FIG. 76, column A, row 2). Second, after emerging the FTCS-PDA/BNC aerogel into water contaminated with bacteria, light irradiation (1 kW m$^{-2}$) was applied onto the system to simulate in situ PMD operation (FIG. 76, column B). After 1 hour, as compared to conventional systems, smaller number of live bacteria was observed on the membrane (FIG. 76, column B, row 1), while dead bacteria amount increased significantly (FIG. 76, column B, row 2). SEM image indicated the presence of both live bacteria (green arrow) and colloids of dead bacteria (red arrow) on the membrane surface (FIG. 76, column B, row 3). The increase of dead bacteria on membrane surface was attributed to the photothermal activities from PDA particles and the resulted higher local surface temperature under light illumination. It should be noted that not all the bacteria could be killed during in situ PMD, potentially due to the insufficiently high enough membrane surface temperature resulted from the top water interference, or the continuous attachment of live bacteria from water onto the membrane surface. Therefore, to kill the entire biofilm on membrane, a third process is needed (FIG. 76, column C).

Figure 77:
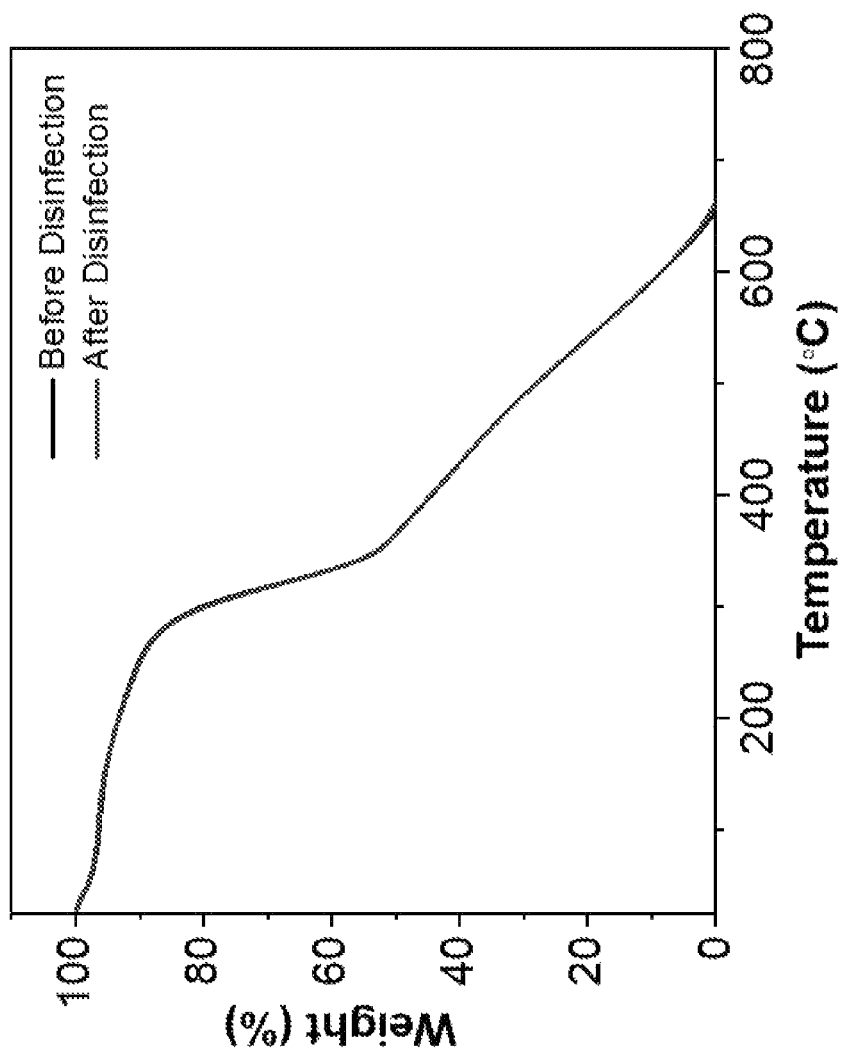
FIG. 77 is an exemplary embodiment of TGA of a FTCS-PDA/BNC before and after self-disinfection tests in accordance with the present disclosure.

After the feed water drained on top, the membrane was further exposed to light irradiation (1 kW m$^{-2}$). After just 10 minutes exposure, the bacteria on the FTCS-PDA/BNC aerogel exhibited predominantly red fluorescence (dead bacteria) and no live bacteria was observable (FIG. 76, column C, rows 1-3), which indicated that the photothermal activity of the FTCS-PDA/BNC aerogel without water on top was sufficient enough to kill all the bacteria on the surface. Lastly, using the same membrane from system C, no live or dead bacteria was detectable on the membrane surface after the washing process by DI water, indicating that the colloids of dead bacteria on membrane surface can be cleaned. TGA results confirmed that the chemical composition of the FTCS-PDA/BNC aerogel did not alter much during the bactericidal treatment (FIG. 77). The excellent anti-biofouling performance of the FTCS-PDA/BNC aerogel upon light exposure during in situ PMD or after PMD has promised its use for long term water purification applications.

Conclusions

In some embodiments, the high performance of the bilayered PDA-BNC aerogel is demonstrated for photothermal membrane distillation. The bilayered PDA-BNC aerogel achieved a permeate flux of 1.0 kg m$^{-2}$ h$^{-1}$ under 1 sun irradiation, with a solar conversion efficiency of 68%, which is the highest efficiency reported for treating room temperature saline water (0.5 M NaCl). The superb optical and photothermal conversion properties of PDA particles loaded inside BNC matrix offers high transmembrane temperature difference and driving force for vapor transport. The thermally engineered strategy of using highly porous, low thermal conductive, and heat insulating BNC microstructure facilitates high vapor permeability and inhibits heat conductive loss from the feed side to the distillate side. The strong chemically bonded fluorosilane functional groups on the aerogel surface allows only vapor transport and high salt rejection (>99.9%). The chemical and mechanical robustness of the bilayered aerogel ensures its stability during long term PMD operation. More importantly, the self-disinfection activity of the bilayered aerogel under solar light effectively resists biofilm growth on the membrane, which helps to increase the longevity of membrane performance and reduce the cost of membrane replacement. Using renewable solar energy as the main energy input, the bilayered aerogel introduced here, with biodegradable materials (both PDA and BNC), scalable syntheses, low electricity input, high thermal efficiency, and salt rejecting capability, provides for stable, scalable, and sustainable water purifications to alleviate water scarcity, especially in decentralized areas including rural areas and developing countries.

Exemplary Materials and Methods

The following materials and methods are exemplary in nature, and the present disclosure is not limited the specific materials and methods described in this section.

Synthesis of FTCS-PDA/BNC bilayered aerogel. FIG. 37 demonstrates the fabrication procedures of a hydrophobic bilayered aerogel using bacterial nanocellulose and polydopamine. *Gluconacetobacter hansenii* was cultured to form a BNC hydrogel and polydopamine (PDA) particles were prepared. By controlling the ratio of ammonia to dopamine monomers, the PDA particle size was optimized to ensure the overlap of PDA optical absorption with the solar spectrum in the visible range. As indicated from scanning electron microscopy (SEM) image, the synthesized PDA particles were in spherical shape with an average diameter of ~1 mm (FIG. 39). PDA particles were then dispersed in bacterial growth medium and added onto the top of the BNC hydrogel. A PDA/BNC layer was formed on top of the prior thick BNC. The bilayer hydrogel was cleaned and freeze-dried to obtain a bilayer PDA/BNC aerogel. To make the aerogel hydrophobic, which is essential for MD membranes, the PDA/BNC aerogel was later exposed to (tridecafluoro-1,1,2,2-tetrahydrooctyl)-trichlorosilane (FTCS) vapor at 70° C. for 6 hours, resulting in a dense coverage of FTCS fluorosilane functional groups. Using a contact angle analyzer (Phoenix 300, Surface Electro Optics Co. Ltd), the water contact angle of FTCS-PDA/BNC bilayered aerogel was measured to be 125.1° (FIG. 40).

To synthesize the BNC hydrogel, #1765 medium (16 ml), containing 2% (w/v) glucose, 0.5% (w/v) yeast extract, 0.5% (w/v) peptone, 0.27% (w/v) disodium phosphate and 0.5% (w/v) citric acid, was used to culture *Gluconacetobacter hansenii* (ATCC®53582) in test tubes at 30° C. under shaking at 250 rpm. The bacterial culture solution (3 ml, incubated 3 days) was added to #1765 medium (15 ml) to make a total 18 ml bacterial growth solution. The solution was subsequently transferred to a petri dish (diameter: 6 cm) and incubated at room temperature without disturbance. After 5 days, a thin BNC hydrogel (~0.2 mm) was obtained.

To synthesize PDA particles with a diameter of 1 µm, ammonia solution ($NH_4OH$, 0.14 ml, 28-30%) was mixed with 31.5 ml of DI water (>18.2 MΩ·cm) and 14 ml of ethanol and the above mixture was shaken for 30 minutes. Dopamine hydrochloride solution (3.5 ml, 0.05 g ml-1) was added into the above solution and then transferred to a petri dish. After 30 hours of mild shaking at room temperature, the PDA particles were collected by centrifugation (7000 rpm, 20 min) and washed with water for three times and dispersed in DI water (40 ml). To synthesize the bilayer PDA/BNC hydrogel, PDA particles in DI water were centrifuged, collected, and dispersed in bacterial growth medium (7 ml) to be added on top of the previously synthesized BNC hydrogel. After 12 hours, PDA particles formed on the BNC hydrogel and excess medium were removed. After another 12 hours, a thin PDA/BNC layer (~30 µm) was formed on top of the prior BNC hydrogel. The bilayered hydrogel was then harvested and washed in boiling water for 2 hours, then dialyzed in DI water for one day. The purified PDA/BNC bilayer was then freeze-dried overnight to obtain the PDA/BNC bilayer aerogel. Lastly, to make the aerogel hydrophobic, the PDA/BNC aerogel was exposed to (tridecafluoro-1,1,2,2-tetrahydrooctyl)-trichlorosilane (FTCS) vapor at 70° C. for 6 hours, resulting in a dense coverage of PDA/BNC aerogel by hydrophobic FTCS fluorosilane functional groups.

Characterization of FTCS-PDA/BNC bilayered aerogel. The FTCS-PDA/BNC aerogel surface and cross-section morphology and microstructure were characterized using a scanning electron microscopy (SEM; OVA NanoSEM 230, FEI). The chemical compositions of PDA and FTCS on BNC were identified using X-ray photoelectron spectroscopy (XPS, PHI 5000 VersaProbe II, Ulvac-PHI) and Raman spectroscopy (inVia Raman Microscope, Renishaw). For XPS measurements, an Al Kα monochromator radiation was used to measure C 1s, F 1s, and N 1s spectra of pure BNC, PDA/BNC, and FTCS-PDA/BNC aerogels. A gravimetric method was used to quantify the porosity (F) of BNC and PDA/BNC aerogels.

Scanning electron microscopy (SEM; OVA NanoSEM 230, FEI) was used to image the morphology and microstructure of the FTCS-PDA/BNC aerogel surface and its cross-section at an acceleration voltage of 10 kV. The chemical composition of PDA and FTCS on the BNC surface were identified using an X-ray photoelectron spectroscopy (XPS, PHI 5000 VersaProbe II, Ulvac-PHI with monochromatic Al Kα radiation (1486.6 eV)) and a Raman spectroscopy (inVia confocal Raman spectroscope, Renishaw, equipped with 514 nm wavelength diode laser). For XPS measurements, an Al Kα monochromator radiation was used to measure the C 1s, F 1s, and N 1s spectra of the FTCS-PDA/BNC aerogel. The gravimetric method was used to quantify the porosity (ε) of the PDA/BNC aerogel. Three 2 cm×2 cm pieces were cut from a PDA/BNC aerogel, weighed dry, and then submerged in DI water for 1 week before being taken out and weighed again wet. The porosity was calculated using the equation below to get the average values for triplicate samples:

$$\varepsilon = \frac{w_2 - w_1}{\rho_w V}, \tag{1}$$

where ε is the porosity (%), $w_2$ (g) is the weight of the wet membrane, $w_1$ (g) is the weight of the dry membrane, $\rho_w$ (g/cm$^3$) is the liquid density (DI water), and V (cm$^3$) is the volume of the membrane. The weight percentage of PDA particles in the bilayered PDA/BNC aerogel was calculated by measuring the weight of pristine BNC ($w_{BNC}$) and PDA/BNC ($w_{PDA/BNC}$) aerogels with the same size (assuming they have similar thickness):

$$PDA \text{ wt }\% = \frac{w_{PDA/BNC} - w_{BNC}}{w_{PDA/BNC}}, \tag{4}$$

The PDA wt % in the PDA/BNC layer of the bilayered PDA/BNC aerogel was calculated using the following equation:

$$PDA \text{ wt }\%' = \frac{w_{PDA/BNC} - w_{BNC}}{w_{PDA/BNC} - \frac{w_{BNC}}{\text{Thickness}_{BNC}} \times \text{Thickness}_{BNC\,Layer}}, \tag{5}$$

where $\text{Thickness}_{BNC}$ is the thickness of the pristine BNC aerogel, and $\text{Thickness}_{BNC\,Layer}$ is the thickness of the BNC layer in PDA/BNC bilayered aerogel. The transmittance and reflectance of the FTCS-PDA/BNC aerogel were measured using a micro-spectrophotometer (QDI 302, CRAIC Technologies) coupled to a Leica microscope (DM 4000M, Leica Microsystems). The surface temperatures of the FTCS-PDA/BNC aerogel were measured by an infrared camera (IR camera, Ti 100, FLUKE) after 600 secs light illumination using a solar simulator (Newport 66921 Arc Lamp) under two irradiations: 1 kW m$^{-2}$ (~1 sun) and 9 kW m$^{-2}$ (~9 sun) as measured by a spectroradiometer (SpectriLight ILT 950). Triplicate 1 cm×1 cm pieces were cut from the membranes of interest and measured. The surface temperature of the membrane with water on top (water thickness=8 mm) was monitored using a benchtop controller thermocouple probe (OMEGA CSI32K-C24, US) with a response time of 5 s and resolution of ±0.5° C.

Optical and Photothermal Conversion Properties Measurements. The transmittance and reflectance of BNC and FTCS-PDA/BNC aerogels were measured using a microspectrophotometer (QDI 302, CRAIC Technologies) coupled to a Leica microscope (DM 4000M, Leica Microsystems). An infrared camera (IR camera, Ti 100, FLUKE) was used to quantify the surface temperature increase of BNC and FTCS-PDA/BNC aerogels within 120 secs under light illumination via a solar simulator (Newport 66921 Arc Lamp). Two light illumination intensities were chosen: 1 kW m$^{-2}$ (~1 sun) and 9 kW m$^{-2}$ (~9 sun), as measured by a spectroradiometer (SpectriLight ILT 950). The aerogel surface temperature increase with water on top (water thickness=8 mm) was monitored using a benchtop controller thermocouple probe (±0.5° C. resolution, OMEGA CSI32K-C24, US).

Photothermal membrane distillation tests. The photothermal membrane distillation performances of BNC and FTCS-PDA/BNC aerogels were tested in a direct contact membrane distillation (DCMD) module. For PMD tests using room temperature feed water (20° C.), 0.5 M NaCl was used to mimic the average salinity of seawater. DI water (20° C.) was used as the distillate. The distillate reservoir was kept on a weighing balance (Sartorius ELT402) to measure the collected permeate amount. During PMD tests, simulated solar light was oriented to the membrane surface, with intensities controlled as 1 kW/m$^2$ (~1 sun) and 9 kW/m$^2$ (~9 sun). For PMD tests combined with hot feed water, the NaCl solution was heated to 45° C. and 65° C. using a hot plate (Thermo Scientific HP131225). A chloride probe (VWR 89231-632) was used to test the salt rejection of aerogels. The solar conversion efficiencies were calculated by equation 2 (or modified solar conversion efficiency calculated by equation 3) as given above.

The photothermal membrane distillation performance of FTCS-PDA/BNC aerogel was tested in a direct contact membrane distillation (DCMD) module. The setup of the system is shown in FIG. 61. The membrane distillation module consists of a 2-mm-thick quartz window with a diameter of 5 cm on the feed side to allow light illumination. A 1-mm-thick aluminum platform was placed in between the feed side and distillate side to support the membrane. The cross-flow velocities in the feed and distillate channels were 3.6 mL/min and 16.2 mL/min, respectively. 0.5 M NaCl aqueous solution (ACS grade, BDH, PA) were used as feed water, stored in a 500-mL Erlenmeyer flask, and DI water was used for the distillate stream at the bottom of the membrane. The 0.5 M salinity was chosen to mimic the average salinity of seawater. The feed and distillate were continuously circulated through the membrane module using two peristaltic pumps respectively (Welco WPX1-F1 and Stenner 85MHP5). The flow rate of the feed water was changed by monitoring the DC supply (Extech 382203) controlling the feed pump. The distillate reservoir was kept on a weighing balance (Sartorius ELT402) to measure the collected permeate at 2 minutes intervals. The distillate reservoir was capped during MD tests to reduce the effects of evaporation. During PMD tests, the light from the solar simulator (Newport 66921 Arc Lamp) was oriented to the membrane surface using a mirror. The light intensities at the membrane surface were measured to be 1 kW/m$^2$ (~1 sun) and 9 kW/m$^2$ (~9 sun, focused using a magnifying lens) by a spectroradiometer (SpectriLight ILT 950). For PMD tests combined with hot feed water, the NaCl feed solution was heated to 45° C. and 65° C. using a hot plate (Thermo Scientific HP131225).

Stability Tests of FTCS-PDA/BNC Aerogel. The chemical and mechanical stability of the FTCS-PDA/BNC aerogel was tested at three pH values (pH 3, 7, and 10), using vigorous shaking for 30 days (VWR Orbital Shaker, Model 3500). These pH values were chosen to mimic natural and engineered aqueous systems. Over 10 cycles of PMD tests (1 cycle=20 minutes), the contact angles, salt rejection, and collected permeate fluxes were monitored. SEM images were further measured for the FTCS-PDA/BNC aerogel after PMD tests to evaluate the morphology and microstructure alteration. Triplicate 1 cm×1 cm pieces were cut from the membrane and measured. The contact angles of the membrane were measured using a contact angle analyzer (Phoenix 300, Surface Electro Optics Co. Ltd) over 10 cycles of PMD tests (1 cycle=20 minutes). A chloride probe (VWR 89231-632) was used to measure the salt concentration in both the feed ($C_{feed}$) and distillate ($C_{distillate}$) during PMD tests, and the salt rejection was calculated using the following equation:

$$\text{Salt rejection \%} = \frac{C_{feed} - C_{distillate}}{C_{feed}}, \quad (6)$$

SEM images were further measured for the FTCS-PDA/BNC aerogel after PMD tests to evaluate the morphology and microstructure alteration.

The solar efficiency was calculated by the following equation:

$$\eta = \frac{\dot{m} H_{vap}}{I}, \quad (2)$$

where η is solar efficiency, n is the permeate flux (kg/m$^2$·h), $H_{vap}$ is the enthalpy change (2,454 kJ/kg) from liquid to vapor, and I is the power density of the incident light (kJ/m$^2$·h).

Self-disinfection property measurement. To identify the self-disinfection property of the FTCS-PDA/BNC aerogel, four conditions were tested to simulate actual PMD processes: (i) membrane contacting with water contaminated by bacteria, (ii) membrane contacting with water contaminated by bacteria during PMD, (iii) light illumination on photothermal membrane after feed water drains on top of the membrane, and (iv) membrane after washing process. The FTCS-PDA/BNC aerogel was merged into solution containing MG 1655 *E. coli* for 1 hour to test condition (i). To test condition (ii), FTCS-PDA/BNC aerogel with *E. coli* contaminated water on top was exposed to simulated sunlight (1 kW/m$^2$) for 1 hour. To test condition (iii), after being merged in *E. coli* contaminated water for 1 hour, FTCS-PDA/BNC aerogel was took out and exposed to simulated sunlight (1 kW m$^{-2}$) for 10 minutes. Condition (iv) was tested by washing FTCS-PDA/BNC aerogel after light illumination same as introduced in condition (iii). In each condition, the FTCS-PDA/BNC aerogel after test was exposed to fluorescent dyes (Molecular Probes Live/Dead Bacterial cell viability kit, Thermo Fisher Scientific) for 30 minutes and then imaged under a Leica microscope (DM 4000M, Leica microsystems) to identify live (blue fluorescent filter, 340-380 nm) and dead (green fluorescent filter, 450-490 nm) cells.

MG 1655 E. coli was grown in Luria-Bertani liquid medium at 37° C. All cultures were in 125 mL baffled shake flasks (25 mL working volume, shaking at 225 rpm). Cells in log phase (>108 live cells/mL) were harvested after 24 h of incubation and then used for bactericidal tests. To identify the self-disinfection property of the FTCS-PDA/BNC aerogel, four conditions were tested to simulate actual PMD processes: (i) membrane contacting with water contaminated by bacteria, (ii) membrane contacting with water contaminated by bacteria during PMD, (iii) light illumination on photothermal membrane after feed water drains on top of the membrane, and (iv) membrane after washing process. The FTCS-PDA/BNC aerogel was merged into solution containing MG 1655 E. coli for 1 hour to test condition (i). To test condition (ii), FTCS-PDA/BNC aerogel with E. coli contaminated water on top was exposed to simulated sunlight (1 kW m$^{-2}$) for 1 hour. To test condition (iii), after being merged in E. coli contaminated water for 1 hour, FTCS-PDA/BNC aerogel was took out and exposed to simulated sunlight (1 kW m$^{-2}$) for 10 minutes. Condition (iv) was tested by washing FTCS-PDA/BNC aerogel after light illumination same as introduced in condition (iii). In each condition, the FTCS-PDA/BNC aerogel after test was exposed to fluorescent dyes (Molecular Probes Live/Dead Bacterial cell viability kit, Thermo Fisher Scientific) for 30 minutes and then imaged under a Leica microscope (DM 4000M, Leica microsystems) to identify live (blue fluorescent filter, 340-380 nm) and dead (green fluorescent filter, 450-490 nm) cells.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

Any non-limiting examples are provided to further illustrate the present disclosure. It should be appreciated by those of skill in the art that the techniques disclosed in the examples represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

What is claimed is:

1. A photothermal membrane comprising tridecafluoro-1,1,2,2-tetrahydrooctyl-trichlorosilane (FTCS) and a polydopamine (PDA) coated, polyvinylidene fluoride (PVDF) membrane.

2. The photothermal membrane of claim 1, wherein the photothermal membrane is hydrophobic.

3. The photothermal membrane of claim 1, wherein the photothermal membrane has a solar efficiency of at least about 10%.

4. The photothermal membrane of claim 1, wherein the photothermal membrane has a permeate flux of at least about 0.40 kg m$^{-2}$h$^{-1}$.

5. A process for synthesizing a photothermal membrane according to claim 1, the process comprising:
   coating a polyvinylidene fluoride (PVDF) membrane with polydopamine (PDA); and
   fluorinating the PDA-coated PVDF membrane by coating the PDA-coated PVDF membrane with tridecafluoro-1,1,2,2-tetrahydrooctyl-trichlorosilane (FTCS).

6. The process of claim 5, wherein the coating is achieved via in situ oxidative polymerization of dopamine or adsorption of pre-synthesized PDA.

7. The process of claim 5, wherein the fluorination of the PDA-coated PVDF membrane is achieved via fluoro-silanization with tridecafluoro-1,1,2,2-tetrahydrooctyl-trichlorosilane (FTCS).

8. A photothermal aerogel membrane comprising a fluorine-containing organic molecule and polydopamine (PDA)-containing bacterial nanocellulose (BNC), wherein the photothermal aerogel membrane is hydrophobic.

9. The photothermal aerogel membrane of claim 8, wherein the photothermal aerogel membrane is a bilayer membrane.

10. The photothermal aerogel membrane of claim 9, wherein the bilayer membrane comprises a photothermal layer and a heat insulating layer.

11. The photothermal aerogel membrane of claim 10, wherein the photothermal layer is a PDA-loaded BNC layer and wherein the heat insulating layer is a pristine BNC layer.

12. The photothermal aerogel membrane of claim 8, wherein the photothermal aerogel membrane is self-disinfecting.

13. The photothermal aerogel membrane of claim 8, wherein the photothermal aerogel membrane has a solar efficiency of at least about 10%.

14. The photothermal aerogel membrane of claim 8, wherein the photothermal aerogel membrane has a permeate flux of at least about 1.0 kg m$^{-2}$h$^{-1}$.

15. A process for synthesizing a photothermal aerogel membrane according to claim 8, the process comprising:
   incorporating polydopamine (PDA) particles into a bacterial nanocellulose (BNC) hydrogel; and
   fluorinating the PDA-containing BNC hydrogel by coating the PDA-containing BNC hydrogel with a fluorine-containing organic molecule.

16. The process of claim 15, wherein the BNC hydrogel is synthesized from a *Gluconacetobacter hansenii* culture.

17. The process of claim 15, wherein the PDA particles are spherical.

18. The process of claim 15, further comprising freeze-drying the PDA-containing BNC hydrogel prior to the fluorination.

19. The process of claim 15, wherein the fluorination is achieved via a fluoro-silanization with tridecafluoro-1,1,2,2-tetrahydrooctyl-trichlorosilane (FTCS).

* * * * *